(12) United States Patent
Suzuki et al.

(10) Patent No.: US 7,502,088 B2
(45) Date of Patent: Mar. 10, 2009

(54) LIQUID CRYSTAL DISPLAY DEVICE HAVING AN ANTIGLARE LAYER

(75) Inventors: Takato Suzuki, Minami-Ashigara (JP); Kenichi Fukuda, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 369 days.

(21) Appl. No.: 11/376,289

(22) Filed: Mar. 16, 2006

(65) Prior Publication Data
US 2006/0215079 A1    Sep. 28, 2006

(30) Foreign Application Priority Data

Mar. 17, 2005  (JP)  .............. 2005-077636
Jul. 6, 2005   (JP)  .............. 2005-197902

(51) Int. Cl.
    G02F 1/1343   (2006.01)
    G02F 1/1335   (2006.01)
(52) U.S. Cl. ................. 349/141; 349/117; 349/96
(58) Field of Classification Search .......... 349/96, 349/141, 117
    See application file for complete search history.

(56) References Cited

U.S. PATENT DOCUMENTS 5,909,314 A *  6/1999 Oka et al. ............. 359/582
6,177,153 B1 * 1/2001 Uchiyama et al. ........... 428/1.1
6,773,121 B2 * 8/2004 Miyatake et al. ........... 359/601
7,037,573 B2 * 5/2006 Miyatake et al. ......... 428/195.1
7,153,552 B2 * 12/2006 Kubo et al. ............. 428/1.31
7,167,222 B2 * 1/2007 Inoue et al. ............... 349/112
7,245,433 B2 * 7/2007 Yano et al. ................ 359/599
7,282,091 B2 * 10/2007 Hashimoto ............. 106/163.01
2003/0164115 A1 * 9/2003 Mukunoki et al. ..... 106/170.47

FOREIGN PATENT DOCUMENTS

JP    10-307291 A    11/1998
JP    3515401 B2     1/2004

* cited by examiner

*Primary Examiner*—Mike Qi
(74) *Attorney, Agent, or Firm*—Buchanan Ingersoll & Rooney PC

(57) ABSTRACT

A liquid crystal display device comprising: a first protective film; a first polarizing film; an optical compensation region; a liquid crystal cell comprising a liquid crystal layer and a pair of substrates sandwiching the liquid crystal layer; a second polarizing film; and a second protective layer, in this order, wherein at a black display, liquid crystal molecules in the liquid crystal layer are aligned in parallel with surfaces of said pair of substrates, an antiglare layer is provided to at least one of the first protective film and the second protective layer, and the antiglare layer has a haze value attributable to internal scattering of from 5 to 35%, and a haze value attributable to surface scattering of from 1 to 10%.

64 Claims, 5 Drawing Sheets

LIQUID CRYSTAL DISPLAY DEVICE HAVING AN ANTIGLARE LAYER

BACKGROUND OF THE INVENTION

1. Field of the Invention

The present invention relates to a liquid crystal display device, more specifically, the present invention relates to a ferroelectric liquid crystal display device, an antiferroelectric liquid crystal display device and an in-plane switching-mode liquid crystal display device where the display is effected by applying a transverse electric field to a nematic liquid crystal aligned in the horizontal direction.

2. Description of the Related Art

As for the liquid crystal display device, a system of interposing a liquid crystal layer comprising a nematic liquid crystal oriented in the twisted alignment between two orthogonal polarizing plates and applying a vertical electric field to the substrate, namely, a so-called TN-mode, is being widely used. In this system, since the liquid crystal stands up with respect to the substrate at the black display, birefringence is generated due to liquid crystal molecules when the screen is viewed from the oblique side, and light leakage occurs. In order to solve this problem, a system of optically compensating the liquid crystal cell by using a film where liquid crystalline molecules are oriented in the hybrid alignment, thereby preventing the light leakage, is being used in practice. However, it is very difficult to optically compensate the liquid crystal cell completely without problem even by using liquid crystal molecules, and there is a problem that gradation reversal cannot be prevented in the down direction of the screen.

For solving such a problem, a so-called in-plane switching (IPS)-mode liquid crystal display device where a transverse electric field is applied to the liquid crystal, or a vertically aligned (VA)-mode liquid crystal display device where a liquid crystal having a negative dielectric anisotropy is vertically aligned and the alignment is divided by a protrusion formed in the panel or a slit electrode, has been proposed and put into practical use. In recent years, development of such a panel is proceeding not only for the monitor use but also for the TV use, and along with this development, the brightness of screen is greatly enhanced. As a result, slight light leakage in the obliquely incident direction with respect to the diagonal position at the black display time, which has been heretofore not a problem in these operation modes, comes to appear as a cause of the reduction in the display grade.

As means for improving the color tone or the viewing angle at the black display time, studies are being made also in the IPS mode to dispose an optical compensation material having birefringence property between the liquid crystal layer and the polarizing plate (see, for example, JP-A-10-307291).

On the other hand, in these liquid crystal display devices, an antiglare film is disposed on the outermost surface of the display to prevent projection of an image due to reflection of outside light, thereby attaching a high added value to the liquid crystal display.

As for the antiglare film, an antiglare film having internal scattering property in addition to surface scattering is known (see, for example, Japanese Patent No. 3,515,401).

In the case of applying an antiglare film to an IPS-mode liquid crystal display device, it has been found from studies by the present inventors that even when optical compensation is made in the liquid crystal display device, if an antiglare film having an insufficient effect of preventing projection of an image due to reflection of outside light is applied, a problem such as reduction in the dark room contrast arises.

SUMMARY OF THE INVENTION

The present invention has been made by taking account of those various problems and an object of the present invention is to provide an IPS-type liquid crystal display device assured of good antireflection performance with minimized reduction of dark room contrast and despite a simple constitution, remarkably improved in not only the display quality but also the viewing angle.

The means for attaining the above-described object are as follows.

(1) A liquid crystal display device comprising: a first protective film; a first polarizing film; an optical compensation region; a liquid crystal cell comprising a liquid crystal layer and a pair of substrates sandwiching the liquid crystal layer; a second polarizing film; and a second protective layer, in this order, wherein at a black display, liquid crystal molecules in the liquid crystal layer are aligned in parallel with surfaces of said pair of substrates, an antiglare layer is provided to at least one of the first protective film and the second protective layer, and the antiglare layer has a haze value attributable to internal scattering of from 5 to 35%, and a haze value attributable to surface scattering of from 1 to 10%.

(2) A liquid crystal display device comprising: a first protective film; a first polarizing film; an optical compensation region; a liquid crystal cell comprising a liquid crystal layer and a pair of substrates sandwiching the liquid crystal layer; a second polarizing film; and a second protective layer, in this order, wherein at a black display, liquid crystal molecules in the liquid crystal layer are aligned in parallel with surfaces of said pair of substrates, an antiglare layer is provided to at least one of the first protective film and the second protective layer, at least one of the first and second protective films having the antiglare layer is an antiglare antireflection film comprising a transparent support, the antiglare layer and a low refractive index layer having a refractive index lower than that of the antiglare layer, the antiglare antireflection film has a haze value attributable to internal scattering of from 5 to 35%, and a haze value attributable to surface scattering of from 1 to 10%.

(3) The liquid crystal display device as described in 1, wherein the haze value attributable to internal scattering of the antiglare layer is from 5 to 20% and the haze value attributable to surface scattering of the antiglare layer is from 1 to 10%.

(4) The liquid crystal display device as described in 2, wherein the haze value attributable to internal scattering of the antiglare antireflection film is from 5 to 20% and the haze value attributable to surface scattering of the antiglare antireflection film is from 1 to 10%.

(5) A liquid crystal display device comprising: a first protective film; a first polarizing film; an optical compensation region; a liquid crystal cell comprising a liquid crystal layer and a pair of substrates sandwiching the liquid crystal layer; a second polarizing film; and a second protective layer, in this order, wherein at a black display, liquid crystal molecules in the liquid crystal layer are aligned in parallel with surfaces of said pair of substrates, an antiglare layer is provided to at least one of the first protective film and the second protective layer, and one(s) having the antiglare layer of the first protective film and the second protective layer has a haze value attributable to internal scattering of from 0 to 5%, and a haze value attributable to surface scattering is from 1 to 30%.

(6) A liquid crystal display device comprising: a first protective film; a first polarizing film; an optical compensation region; a liquid crystal cell comprising a liquid crystal layer and a pair of substrates sandwiching the liquid crystal layer;

a second polarizing film; and a second protective layer, in this order, wherein at a black display, liquid crystal molecules in the liquid crystal layer are aligned in parallel with surfaces of said pair of substrates, at least one of the first and second protective films is an antiglare antireflection film comprising a transparent support, the antiglare layer and a low refractive index layer having a refractive index lower than that of the antiglare layer, and the antiglare antireflection film has a haze value attributable to internal scattering of from 0 to 5%, and a haze value attributable to surface scattering of from 1 to 30%.

(7) The liquid crystal display device as described in any one of 1 to 6, wherein the antiglare layer is formed from a coating composition comprising a light-transparent resin, a light-transparent fine particle and multiple kinds of solvents, and the multiple kinds of solvents comprises a main solvent incapable of dissolving the transparent support and a small amount of a solvent having a hydroxyl group.

(8) The liquid crystal display device as described in any one of 1 to 7, wherein the light-transparent resin mainly comprises a trifunctional or higher functional (meth)acrylate monomer, and the light-transparent particle is a crosslinked poly(meth)acrylate-based polymer having an acryl content of 50 to 100 mass %.

(9) The liquid crystal display device as described in any one of 1 to 7, wherein the light-transparent resin mainly comprises a trifunctional or higher functional (meth)acrylate monomer, and the light-transparent particle is a crosslinked poly(styrene-acryl) copolymer having an acryl content of 50 to 100 mass %.

(10) The liquid crystal display device as described in any one of 1 to 9, wherein the refractive index of the low refractive index layer is from 1.30 to 1.48, the low refractive index layer comprises a fluorine-containing polymer, and the fluorine-containing polymer comprises from 30 to 80 mass % of a fluorine atom.

(11) The liquid crystal display device as described in any one of 1 to 9, wherein the low refractive index layer is formed by coating a composition having heat curability and/or photocurability, the composition mainly comprising a fluorine-containing polymer containing a crosslinking or polymerizable functional group.

(12) The liquid crystal display device as described in any one of 1 to 11, wherein the low refractive index layer is a cured film formed by coating and curing a curable composition comprising (A) at least one said fluorine-containing polymer, (B) at least one inorganic fine particle having an average particle diameter corresponding to 30 to 100% of thickness of the low refractive index layer, and (C) at least one hydrolysate and/or partial condensate of an organosilane represented by formula (1), which is produced in the presence of an acid catalyst:

Formula (1)

(wherein $R^{10}$ represents a substituted or unsubstituted alkyl group or a substituted or unsubstituted aryl group, X represents a hydroxyl group or a hydrolyzable group, and m represents an integer of 1 to 3).

(13) The liquid crystal display device as described in any one of 1 to 12, wherein the antiglare layer and the low refractive index layer each is a cured film formed by coating and curing a curable coating composition comprising a hydrolysate and/or a partial condensate of an organosilane represented by formula (1):

Formula (1)

(wherein $R^{10}$ represents a substituted or unsubstituted alkyl group or a substituted or unsubstituted aryl group, X represents a hydroxyl group or a hydrolyzable group, and m represents an integer of 1 to 3).

(14) The liquid crystal display device as described in any one of 1 to 13, wherein the inorganic fine particle (B) has a hollow structure.

(15) The liquid crystal display device as described in any one of 1 to 14, wherein the low refractive index layer is a cured film formed by coating and curing a curable composition comprising (A) a fluorine-free polymer and (B) an inorganic fine particle having an average particle diameter corresponding to 30 to 100% of thickness of the low refractive index layer and having a hollow structure.

(16) The liquid crystal display device as described in any one of 1 to 15, wherein the optical compensation region comprises at least one retardation region satisfying any one of the following relations (A) to (D).

(A) 100 nm≦Re≦400 nm, and −50 nm≦Rth≦50 nm.
(B) 60 nm≦Re≦200 nm, and 30 nm≦Rth≦100 nm.
(C) 0 nm≦Re≦20 nm, and −400 nm≦Rth≦−50 nm.
(D) 30 nm≦Re≦150 nm, and 100 nm≦Rth≦400 nm.

(wherein Re designates the in-plane retardation and Rth designates the retardation in the thickness direction.)

(17) The liquid crystal display device as described in any one of 1 to 16, wherein the optical compensation region comprises a first retardation region and a second retardation region, the first retardation region has an in-plane retardation Re of from 70 to 330 nm, the first retardation region has a value Nz of from more than 0 to less than 0.5, the second retardation region has an in-plane retardation Re of from 0 to 100 nm, the second retardation region has a retardation Rth in thickness direction of from 10 to 140 nm, and a transmission axis of the first polarizing film is parallel to a slow axis direction of the liquid crystal molecules at the black display.

(18) The liquid crystal display device as described in 17, wherein the first polarizing film, the first retardation region, the second retardation region and the liquid crystal cell are disposed in this order, and a slow axis of the first retardation region is substantially orthogonal to the transmission axis of the first polarizing film.

(19) The liquid crystal display device as described in 17, wherein the first polarizing film, the second retardation region, the first retardation region and the liquid crystal cell are disposed in this order, and a slow axis of the first retardation region is substantially parallel to the transmission axis of the first polarizing film.

(20) The liquid crystal display device as described in any one of 1 to 16, wherein the optical compensation region comprises a first retardation region and a second retardation region, the first retardation region has an in-plane retardation Re of from 20 to 150 nm, the first retardation region has a value Nz of from 1.5 to 7, the second retardation region has an in-plane retardation Re of from 0 to 50 nm, the second retardation region has a retardation Rth in thickness direction of from −80 to −400 nm, and a transmission axis of the first polarizing film is parallel to a slow axis direction of the liquid crystal molecules at the black display.

(21) The liquid crystal display device as described in 20, wherein the first polarizing film, the first retardation region, the second retardation region and the liquid crystal cell are disposed in this order, and a slow axis of the first retardation region is substantially parallel to the transmission axis of the first polarizing film.

(22) The liquid crystal display device as described in 20, wherein the first polarizing film, the second retardation region, the first retardation region and the liquid crystal cell are disposed in this order, and a slow axis of the first retardation region is substantially orthogonal to the transmission axis of the first polarizing film.

(23) The liquid crystal display device as described in any one of 20 to 22, wherein the second retardation region comprises a retardation layer comprising a rod-like liquid crystal compound oriented substantially in vertical alignment.

(24) The liquid crystal display device as described in any one of 1 to 23, wherein the liquid crystal display device comprises a protective film between the second polarizing film and the substrate, and the protective film has a retardation Rth of 40 to −50 nm in thickness direction.

(25) The liquid crystal display device as described in any one of 1 to 24, wherein the liquid crystal display device comprises a protective film between the second polarizing film and the substrate, and the protective film is a cellulose acylate film or a norbornene-based film.

Figure 1:
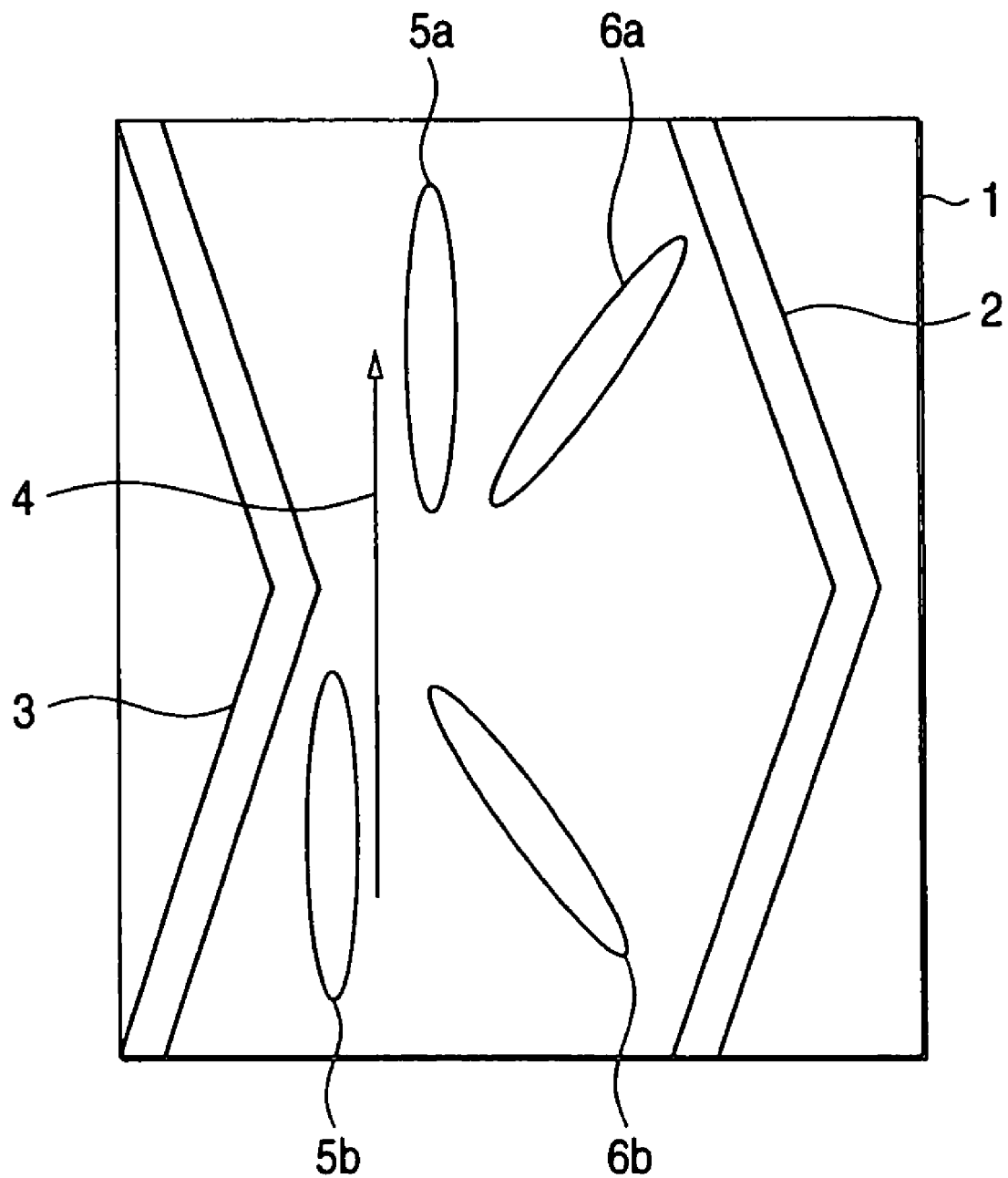
FIG. 1 is a schematic view showing an example of the pixel region in the liquid crystal display device of the present invention.

1 denotes a pixel region of liquid crystal device; 2, 3 denotes an electrode; 4 denotes a rubbing direction; 5a, 5b denote director of liquid crystal compound in black display; 6a, 6b denote director of liquid crystal compound in white display; 7a denotes a first protective film; 7b denotes a protective film; 8 denotes a first Polarizing film; 9 denotes a transmission axis; 10 denotes a first retardation region; 11 denotes a slow axis; 12 denotes a second retardation region; 13 denotes a substrate; 14, 18 denotes a rubbing treatment direction; 15 denotes a liquid crystal layer; 16 denotes a slow axis; 17 denotes a substrate; 19a denotes a protective film; 19b denotes a second protective Film; 20 denotes a second polarizing film; and 21 denotes a transmission axis.

DETAILED DESCRIPTION OF THE INVENTION

In the following, embodiments of the liquid crystal display device of the present invention and constituent members thereof are described in sequence. Incidentally, the term "from (numerical value A) to (numerical value B)" as used in the present invention for expressing a numerical value range means that the numerical values A and B are included in the range as the lower limit and the upper limit, respectively.

In the present invention, the terms "parallel" and "orthogonal" each means the range of (exact angle ±less than 10°). In this range, the error from the exact angle is preferably ±less than 5°, more preferably ±less than 2°. the terms "substantially parallel", "substantially orthogonal" and "substantially vertical" have the same meaning as the above. The term "slow axis" means the direction where the refractive index becomes maximum. Also, unless otherwise indicated, the refractive index and the retardation are a value measured at a wavelength λ=590 nm in the visible region.

Furthermore, unless otherwise indicated, the term "polarizing plate" as used in the present invention includes both a lengthy polarizing plate and a polarizing plate cut into a size proper for the incorporation into a liquid crystal display device (the "cut" as used in the present invention includes, for example, "punch" and "cut out"). Also, in the present invention, the "polarizing film" is used in distinction from the "polarizing plate", and the "polarizing plate" means a laminated body comprising a "polarizing film" having on at least one surface thereof a transparent protective film for protecting the polarizing film.

In the present invention, the term "(meth)acrylate" means "at least either one of acrylate and methacrylate". The same applies to "(meth)acrylic acid" and the like.

In the present specification, Re and Rth each represent the retardation within the plane and that in the thickness direction at a certain wavelength λ nm. Re is measured with KOBRA 21ADH (a product of Oji Scientific Instruments) by letting the λ nm wavelength light impinge the sample in the direction normal to the film plane. KOBRA 21ADH calculates Rth based on the retardation values measured in three directions, i.e., the aforementioned Re, and the retardation value measured with λ nm wavelength light irradiated from the direction +40° oblique to the direction normal to the film plane around the slow axis within the plane (which is judged by KOBRA 21ADH) as the slanted axis (rotational axis), and the retardation value measured with λ nm wavelength light irradiated from the direction −40° oblique to the direction normal to the film plane around the slow axis within the plane as the slanted axis (rotational axis), an assumed value for average refractive index, and the inputted thickness value. Here, as the assumed value for average refractive index, those set forth in Polymer Handbook (John Wiley & Sons, Inc.), and the catalogue values of various optical films can be adopted. As for the materials for which the average refractive index is unknown, one can measure it with an Abbe's refractometer. The average refractive index values of main optical films are shown below:

Cellulose acylate (1.48)
Cycloolefinic polymer (1.52)
Polycarbonate (1.59)
Poly(methyl methacrylate) (1.49), and
Polystyrene (1.59)

By inputting such an assumed value for the average refractive index and the film thickness, KOBRA 21ADH calculates nx, ny and nz. From these calculated values, Nz=(nz−nz)/(nx−ny) is further calculated. By way of precaution, in the present specification, the measuring wavelength is always 590 nm and the value is measured at 25° C., 60% RH, if otherwise defined.

[Liquid Crystal Display Device]

The liquid crystal display device of the present invention comprises an antiglare layer having an optical compensation region and specified optical properties, and a liquid crystal cell in which the liquid crystal molecules are aligned parallel to the support at the black display.

More specifically, the liquid crystal display device of the invention is one comprising at least a first protective film, a first polarizing film, an optical compensation region, a liquid crystal cell having a liquid crystal layer and a pair of supports sandwiching and holding the liquid crystal cell, a second polarizing film and a second protective film arranged in this order, wherein the liquid crystal molecules are aligned parallel to the surface of the aforementioned pair of supports at the black display. Moreover, on at least one of the first and second protective films, an antiglare layer is provided by coating. It is characterized that: the haze value due to the internal scattering of the antiglare layer is 5 to 35% and the haze value due to surface scattering is 1 to 10%; or the haze value due to the internal scattering of the antiglare layer is 0 to 5% and the haze value due to surface scattering is 1 to 30%

Explanation will now be given on the optical compensation region of the invention. The optical compensation region of the invention preferably contains at least one retardation region that satisfies one of the following relations (A) to (D).

(A) 100 nm≦Re≦400 nm, and −50 nm≦Rth≦50 nm.
(B) 60 nm≦Re≦200 nm, and 30 nm≦Rth≦100 nm.
(C) 0 nm≦Re≦20 nm, and −400 nm≦Rth≦−50 nm.
(D) 30 nm≦Re≦150 nm, and 100 nm≦Rth≦400 nm.

(wherein Re designates the retardation within the plane and Rth the retardation in the thickness direction.)

The retardation region satisfying relation (A) preferably has Nz of 0.45 to 0.55, and particularly preferably 0.48 to 0.52.

Among the aforementioned optical compensation regions, the one to be described in the following first or second embodiment is more preferred, and the one in the second embodiment is particularly preferred.

First Embodiment

Figure 2:
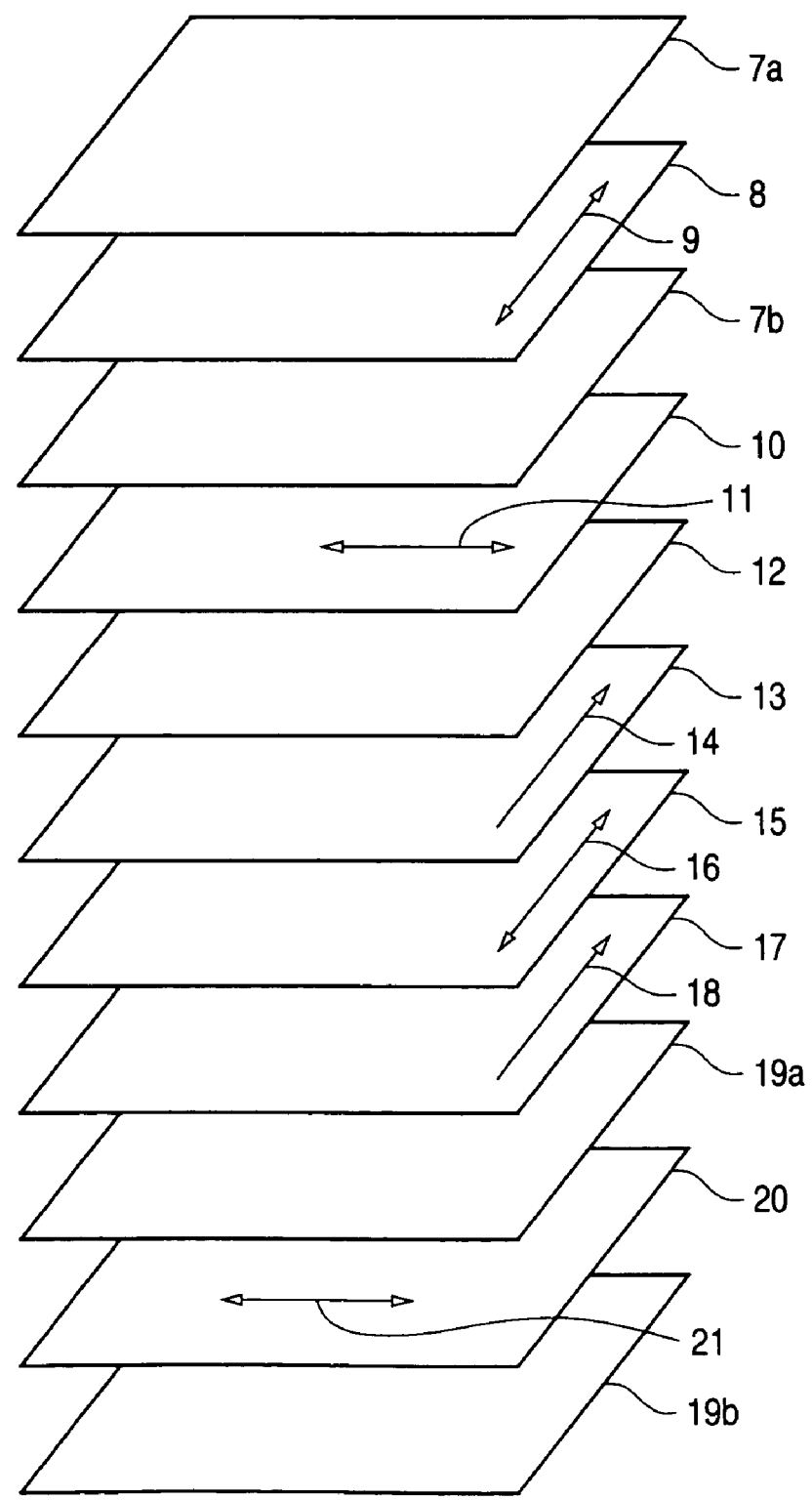
FIG. 2 is a schematic view showing a first embodiment of the liquid crystal display device of the present invention.
Figure 3:
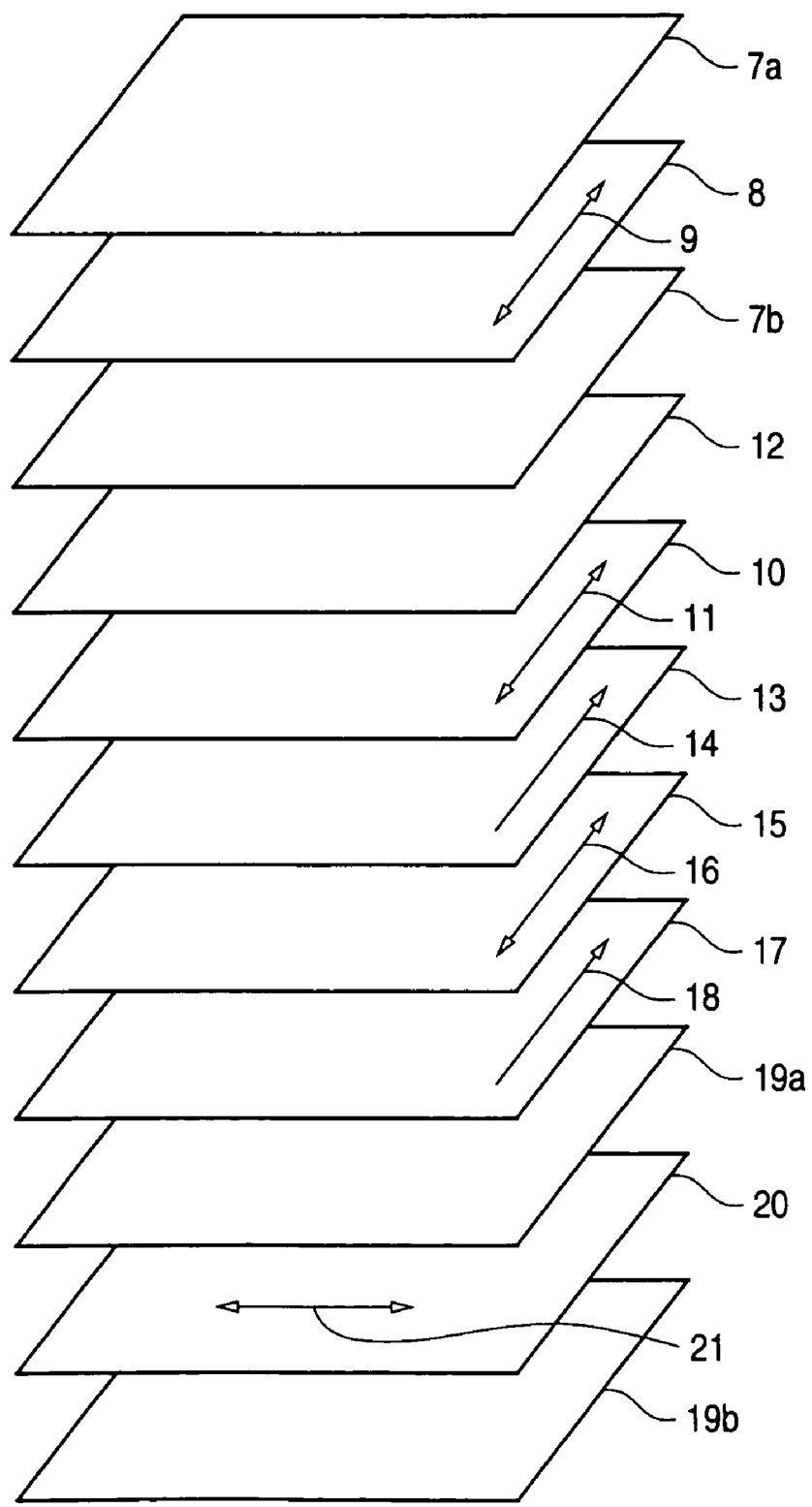
FIG. 3 is a schematic view showing a first embodiment of the liquid crystal display device of the present invention.

The embodiment of the present invention is described in detail below by referring to the drawings. FIG. 1 is a schematic view showing an example of the pixel region in the liquid crystal display device of the present invention. FIGS. 2 and 3 each is a schematic view showing the first embodiment of the liquid crystal display device of the present invention.

The liquid crystal display device shown in FIG. 2 comprises polarizing films 8 and 20, a first retardation region 10, a second retardation region 12, and a liquid crystal cell comprising a pair of substrates 13 and 17 and a liquid crystal layer 15 interposed therebetween. The polarizing films 8 and 20 are each sandwiched by protective films 7a and 7b and by protective films 19a and 19b, respectively.

In the invention, protective film 7a is the first protective film, Protective Film 19b is the second protective film, whereby either of the first and second protective films is provided with an antiglare layer by coating. In case where the antiglare layer is coated on First Protective Film 7a, First Protective Film 7a constitutes the viewing side, while Second Protective Film 19b constitutes the rear side. In case where the antiglare layer is coated on Second Protective Film 19b, Second Protective Film 19b constitutes the viewing side, while First Protective Film 7a constitutes the rear side.

In the liquid crystal display device shown in FIG. 2, the liquid crystal cell comprises substrates 13 and 17, and a liquid crystal layer 15 interposed therebetween. In the case of an IPS type not having a twisted structure, the product Δn·d of the thickness d (μm) and the refractive index anisotropy Δn of the liquid crystal layer has an optimal value in the range from 0.2 to 0.4 μm in the transmissive mode. Within this range, high white display brightness and small black display brightness are yielded and therefore, a bright display device with high contract can be obtained. On the surfaces of the substrates 13 and 17, which are in contact with the liquid crystal layer 15, an alignment film (no shown) is formed to align the liquid crystal molecules nearly in parallel with the surfaces of the substrates. At the same time, the alignment direction of the liquid crystal molecules in the state of not applying a voltage or applying a low voltage is controlled, for example, by the rubbing treatment directions 14 and 18 applied to the alignment films, whereby the direction of the slow axis 16 is determined. Furthermore, on the inner surface of the substrate 13 or 17, an electrode (not shown in FIG. 2) capable of applying a voltage to the liquid crystal molecules is formed.

In FIG. 1, the alignment of the liquid crystal molecules in one pixel region of the liquid crystal layer 15 is schematically shown. FIG. 1 is a schematic view showing the alignment of liquid crystal molecules in a region having a very small area corresponding to one pixel of the liquid crystal layer 15, together with the rubbing direction 4 of the alignment films formed on the inner surfaces of the substrates 13 and 17, and electrodes 2 and 3 capable of applying a voltage to the liquid crystal molecules, which are formed on the inner surfaces of the substrates 13 and 17. In the case where active driving is performed by using a nematic liquid crystal having a positive dielectric anisotropy as the field effect-type liquid crystal, the alignment direction of the liquid crystal molecules in the state of not applying a voltage or applying a low voltage is shown by 5a and 5b and at this time, a black display is obtained. When a voltage is applied between the electrodes 2 and 3, the liquid crystal molecules change the alignment direction to the 6a and 6b directions according to the voltage. Usually, a bright display is obtained in this state.

The liquid crystal cell for use in the present invention is not limited to the IPS mode, and any liquid crystal display device may be suitably used as long as the liquid crystal molecules are aligned at the black display substantially in parallel with the surfaces of the pair of substrates. Examples of such a liquid crystal display include a ferroelectric liquid crystal display device, an antiferroelectric liquid crystal display device and an ECB-type liquid crystal display device.

Again, in FIG. 2, the transmission axis 9 of the polarizing film 8 is arranged to be orthogonal to the transmission axis 21 of the polarizing film 20. Also, the first retardation region 10 is disposed to arrange the slow axis 11 thereof to be orthogonal to the transmission axis 9 of the polarizing film 8. Furthermore, the transmission axis 9 of the polarizing film 8 is parallel to the slow axis 16 of the liquid crystal molecule in the liquid crystal layer 14 at the black display, that is, the slow axis 11 of the first retardation region 10 is orthogonal to the slow axis 16 of the liquid crystal layer 14 at the liquid crystal black display. In this embodiment, the first retardation region 10 showing specific optical properties described later is disposed in this way and at the same time, the second retardation region having specific optical properties described later is disposed between the first retardation region 10 and the liquid crystal cell, whereby the viewing angle properties of the liquid crystal cell are improved.

The liquid crystal display device shown in FIG. 2 has a constitution such that the polarizing film 8 is sandwiched by two protective films 7a and 7b, but the protective film 7b may not be disposed. However, in the case of not disposing the protective film 7b, the first retardation region 10 must have not only specific optical properties described later but also a function of protecting the polarizing film 8. In the case of disposing the protective film 7b, the retardation Rth in the thickness direction of this protective film is preferably 40 nm or less. Furthermore, the polarizing film 20 is also sandwiched by two protective films 19a and 19b, but the protective film 19a on the side closer to the liquid crystal layer 15 may not be disposed. In the case of disposing the protective film 19a, the preferred range of the retardation Rth in the thickness direction of this protective film is the same as that of the protective film 7b. The protective film 7b and the protective film 19a each preferably has a small thickness, specifically, a thickness of 60 μm or less.

In the embodiment of FIG. 2, the first retardation region 10 and the second retardation region 12 may be disposed between the liquid crystal cell and the polarizing film 8 or between the liquid crystal cell and the polarizing film 20, based on the position of the liquid crystal cell. In either case, the second retardation region 12 is disposed to come closer to the liquid crystal cell.

FIG. 3 shows another embodiment of the present invention. In FIG. 3, the same members as in FIG. 2 are indicated by the same numerical references and are not described in detail here. In the liquid crystal display device shown in FIG. 3, the positions of the first retardation region 10 and the second retardation region 12 are switched, and the first retardation region 10 is disposed at the position distant from the polarizing film 8 as compared with the second retardation region 12, that is, at the position closer to the liquid crystal cell. Also, in the embodiment shown in FIG. 3, the first retardation region 10 is disposed to arrange the slow axis 11 thereof to be parallel to the transmission axis 9 of the polarizing film 8. Furthermore, the transmission axis 9 of the polarizing film 8 is parallel to the slow axis 16 of the liquid crystal molecule in the liquid crystal layer 14 at the black display, that is, the slow axis 11 of the first retardation region 10 is parallel to the slow axis 16 of the liquid crystal layer 14 at the liquid crystal black display. In this embodiment, the first retardation region 10 showing specific optical properties described later is disposed in this way and at the same time, the second retardation region having specific optical properties described later is disposed between the first retardation region 10 and the polarizing film 8, whereby the viewing angle properties of the liquid crystal cell are improved.

Also in the liquid crystal display device of FIG. 3, similarly to the aforementioned case, 7a is the first protective film, 19b is the second protective film whereby either of the first and second protective films is provided with an antiglare layer by coating. And the protective film coated with the antiglare layer constitutes the viewing side, while the other protective film constitutes the rear side. In addition, Protective Film 7b or Protective Film 19b may be omitted. However, in the case of not disposing the protective film 7b, the second retardation region 12 must have not only specific optical properties described later but also a function of protecting the polarizing film 8. In the case of disposing the protective film 7b, the retardation Rth in the thickness direction of this protective film is preferably 40 nm or less. Furthermore, the polarizing film 20 is also sandwiched by two protective films 19a and 19b, but the protective film 19a on the side closer to the liquid crystal layer 15 may not be disposed. In the case of disposing the protective film 19a, the preferred range of the retardation Rth in the thickness direction of this protective film is the same as that of the protective film 7b. The protective film 7b and the protective film 19a each preferably has a small thickness, specifically, a thickness of 60 μm or less.

In the embodiment of FIG. 3, the first retardation region 10 and the second retardation region 12 may be disposed between the liquid crystal cell and the polarizing film 8 on the viewing side or between the liquid crystal cell and the polarizing film 20 on the rear side, based on the position of the liquid crystal cell. In either case, the first retardation region 10 is disposed to come closer to the liquid crystal cell.

The liquid crystal display device of the present invention is not limited to the constitutions shown in FIGS. 1 to 3 and may contain other members. For example, a color filter may be disposed between the liquid crystal layer and the polarizing film. Also, an antireflection treatment or a hard coat may be applied to the surface of the protective film of the polarizing film, or a member imparted with electrical conductivity may be used for the constituent member. In the case of using the liquid crystal display device as a transmissive type, a cold or hot cathode fluorescent tube or a backlight using a light-emitting diode, a field emission element or an electroluminescent element as the light source may be disposed on the rear side. In this case, the backlight may be disposed on the upper side or the lower side of FIGS. 2 and 3, but the backlight is preferably disposed on the lower side. Furthermore, a reflective polarizing or diffusing plate, a prism sheet or a light guide plate may be disposed between the liquid crystal layer and the backlight. As described above, the liquid crystal display device of the present invention may also be a reflective type and in this case, only one polarizing plate may be disposed on the observation side while a reflection film is disposed on the rear of the liquid cell or on the inner surface of the lower substrate of the liquid crystal cell. Of course, a front light using the above-described light source may be provided on the observation side of the liquid crystal cell.

The liquid crystal display device of the present invention includes an image direct viewing type, an image projection type and a light modulation type. In a particularly effective mode, the present invention is applied to an active matrix liquid crystal display device using a three- or two-terminal semiconductor element such as TFT or MIM. Of course, a mode of applying the present invention to a passive matrix liquid crystal display device called time-division driving is also effective.

Preferred optical properties of various members usable in the liquid crystal display device of the present invention, materials used for the members, production methods thereof, and the like are described in detail below.

[First Retardation Region]

In one embodiment of the liquid crystal display device of the present invention, as shown in FIG. 2, the first retardation region is disposed at a position father from the liquid crystal cell as compared the second retardation region. In this embodiment, the in-plane retardation Re of the first retardation region is from 70 to 330 nm. For effectively reducing the light leakage in the oblique direction, the Re of the first retardation region is preferably from 90 to 250 nm, more preferably from 110 to 190 nm. Also, Nz is from more than 0 to less than 0.5, and for effectively reducing the light leakage in the oblique direction, Nz of the first retardation region is preferably from 0.1 to less than 0.4. If this value exceeds 0.5, the Re value necessary for enhancing the contrast becomes large, as a result, lamination accuracy with a significantly high precision polarizing plate is required. Furthermore, a large Rth is necessary for the second retardation region and this is not preferred.

Incidentally, in the liquid crystal display device of this embodiment, the first retardation region is disposed to arrange the slow axis thereof to be orthogonal to the transmission axis of the polarizing film disposed at a position closer to the first retardation region and the slow axis of the liquid crystal layer at the black display.

In another embodiment of the liquid crystal display device of the present invention, as shown in FIG. 3, the first retardation region is disposed at a position closer to the liquid crystal cell as compared with the second retardation region. In this embodiment, the in-plane retardation Re of the first retardation region is from 70 to 330 nm, preferably from 80 to 230 nm. For effectively reducing the light leakage in the oblique direction, the Re of the first retardation region is more preferably from 100 to 210 nm, still more preferably from 110 to 190 nm. Also, Nz is from more than 0 to less than 0.5, preferably from more than 0 to less than 0.4. For effectively reducing the light leakage in the oblique direction, Nz of the first retardation region is more preferably from 0.1 to less than 0.35. If this value exceeds 0.5, the Re value necessary for enhancing the contrast becomes large, as a result, lamination accuracy with a significantly high precision polarizing plate is required. Furthermore, a large Rth is necessary for the second retardation region and this is not preferred.

Incidentally, in the liquid crystal display device of this embodiment, the first retardation region is disposed to arrange the slow axis thereof to be parallel to the transmission axis of the polarizing film disposed at a position closer to the first retardation region and the slow axis of the liquid crystal layer at the black display.

In the present invention, the first retardation region is not particularly limited in its material and form as long as it has the above-described optical properties. For example, a retardation film comprising a birefringent polymer film, a film formed by coating and then heating a polymer compound on a transparent support, or a retardation film having a retardation layer formed by coating or transferring a low or high molecular liquid crystalline compound on a transparent support, may be used. Also, each film may be used as a laminate of films.

The birefringent polymer film is preferably a polymer film excellent in the controllability of birefringence properties as well as in the transparency and heat resistance, and having a small optical elasticity. In this case, the polymer material used is not particularly limited as long as the polymer can achieve uniform biaxial orientation, but a polymer material capable of forming a film by a solution casting method or an extrusion molding system is preferred. Examples thereof include an aromatic polymer such as norbornene-based polymer, polycarbonate-based polymer, polyallylate-based polymer, polyester-based polymer and polysulfone, a polyolefin such as polypropylene, a cellulose acylate, and a polymer comprising a mixture of two or more of these polymers.

The biaxial orientation of the film may be performed by producing a film according to an appropriate system such as extrusion molding system or cast film-forming system, and stretching the film, for example, according to a longitudinal stretching system using a roll or a transverse or biaxial stretching system using a tenter. The birefringent polymer film may also be obtained by, for example, a method of uniaxially or biaxially stretching the film in the plane direction and stretching it also in the thickness direction, thereby controlling the refractive index in the thickness direction, or a method of bonding a heat-shrinkable film to a high molecular polymer film and bringing out the action of the shrinkage force thereof under heating, thereby stretching and/or shrinking the polymer film and effecting orientation (see, for example, JP-A-5-157911, JP-A-11-125716 and JP-A-2001-13324). In the case of the longitudinal stretching system using a roll, an appropriate heating method such as a method using a heating roller, a method of heating the atmosphere or a combination use of these methods, may be employed. In the case of the biaxial stretching system using a tenter, an appropriate method such as a simultaneous biaxial stretching method by an all-tenter system or a sequential biaxial stretching method by a roll-tenter system, may be employed.

This retardation film preferably has less unevenness in the orientation or retardation. The thickness thereof may be appropriately determined according to the retardation and the like but generally in view of thinning, the thickness is preferably from 1 to 300 μm, more preferably from 10 to 200 μm, still more preferably from 20 to 150 μm.

[Second Retardation Region]

In one embodiment of the liquid crystal display device of the present invention, as shown in FIG. 2, the second retardation ration is disposed at a position closer to the liquid crystal cell as compared with the first retardation region. In this embodiment, it is preferred that the in-plane refractive indices nx and ny of the second retardation region are substantially the same. The difference therebetween is preferably 0.05 or less, more preferably 0.02 or less, still more preferably 0.01 or less. Also, the in-plane retardation Re of the second retardation region is preferably 100 nm or less, more preferably 50 nm or less, still more preferably 20 nm or less. Furthermore, the retardation Rth in the thickness direction of the second retardation region is from 10 to 140 nm, preferably from 30 to 130 nm, more preferably from 60 to 110 nm.

In this embodiment, the arrangement of the slow axis of the second retardation region is not particularly limited, but when the Re of the second retardation region exceeds 20 nm, the second retardation region is preferably disposed to arrange the slow axis thereof to be parallel to the transmission axis of the polarizing film disposed at a closer position. When the second retardation region is disposed in such a way, the thickness of, for example, the first retardation region can be made small.

More specifically, when the Nz value of the first retardation region is as large as about 0.4, the Rth of the second retardation region is preferably from 30 to 100 nm, whereas when the Nz value of the first retardation region is as small as about 0.1, the Rth of the second retardation region is preferably from 80 to 120 nm. When the Nz value of the first retardation region is intermediate therebetween and is about 0.25, the Rth of the second retardation region is preferably from 60 to 100 nm. Here, these preferred ranges are values preferred when the liquid crystal display device of this embodiment has at least one protective film between the liquid crystal cell and the polarizing film so as to protect the polarizing film and the retardation Rth in the thickness direction of the protective film is from 40 to −100 nm.

In another embodiment of the liquid crystal display device of the present invention, as shown in FIG. 3, the second retardation region is disposed at a position distant from the liquid crystal cell as compared with the first retardation region. In this embodiment, the in-plane retardation Re of the second retardation region is preferably 100 nm or less, more preferably 50 nm or less, still more preferably 20 nm or less. Furthermore, the retardation Rth in the thickness direction is from 10 to 140 nm, preferably from 20 to 120 nm, more preferably from 25 to 100 nm, still more preferably from 30 to 80 nm.

In this embodiment, the arrangement of the slow axis of the second retardation region is not particularly limited, but when the Re of the second retardation region exceeds 20 nm, the second retardation region is preferably disposed to arrange the slow axis thereof to be orthogonal to the transmission axis of the polarizing film disposed at a closer position. When the second retardation region is disposed in such a way, the thickness of, for example, the first retardation region can be made small.

More specifically, when the Nz value of the first retardation region is as large as about 0.4, the Rth of the second retardation region described later is preferably from 30 to 40 nm, whereas when the Nz value of the first retardation region is as small as about 0.1, the Rth of the second retardation region is preferably from 70 to 80 nm. When the Nz value of the first retardation region is intermediate therebetween and is about 0.25, the Rth of the second retardation region is preferably from 50 to 70 nm. Here, these preferred ranges are values preferred when the liquid crystal display device of this embodiment has at least one protective film between the liquid crystal cell and the polarizing film so as to protect the polarizing film and the retardation Rth in the thickness direction of the protective film is from 40 to −50 nm.

The second retardation region is not particularly limited in its material as long as it has the above-described optical properties. For example, a retardation film comprising a birefringent polymer film, or a retardation film having a retardation layer formed by coating or transferring a low or high molecular liquid crystalline compound on a transparent support, may be used. Also, each film may be used as a laminate of films.

The retardation film comprising a birefringent polymer film having the above-described optical properties can be easily produced also by uniaxially or biaxially stretching a polymer film (see, for example, JP-A-2002-139621 and JP-A-2002-146045). Furthermore, cellulose acylates capable of expressing these optical properties only by casting without stretching can be suitably used. As for such a cellulose acylate, those described in JP-A-2000-275434, JP-A-2001-166144, JP-A-2002-161144 and JP-A-2002-90541 may be used. The material used for the polymer film is generally a synthetic polymer (e.g., polycarbonate, polysulfone, polyethersulfone, polyacrylate, polymethacrylate, norbornene resin, cellulose acylate).

The retardation layer formed of a liquid crystalline compound having the above-described optical properties can be formed by coating a rod-like cholesteric liquid crystalline composition containing a chiral structural unit on a support or a temporary support, aligning the helical axis to be nearly vertical to the substrate, and fixing it. When the retardation layer is formed on a temporary support, the retardation layer can be produced by transferring it onto a support. Furthermore, a retardation layer produced by horizontally aligning a discotic liquid crystalline compound having a negative birefringence (director is vertical to substrate) and fixing it, or a retardation layer produced by casting and fixing a polyimide polymer on a substrate, may be similarly used. Not only one sheet of a retardation layer but also a plurality of stacked retardation layers may constitute the second retardation region having the above-described optical properties. In addition, the second retardation region may be constituted such that the stacked body as a whole of the support and the retardation layer satisfies the optical properties.

The second retardation region containing a retardation layer formed of a discotic liquid crystalline compound may be formed by coating a coating solution containing a discotic liquid crystalline compound, a polymerizable initiator, an air-interface horizontally aligning agent (see, for example, Japanese Patent Application No. 2003-388308) and other additives described above, on a horizontal alignment film formed on a support. With respect to the alignment film for horizontally aligning a discotic liquid crystal layer, a polymer alignment film such as polyvinyl alcohol, polyimide, polyamide and acryl, where the content of solids (e.g., organic acid, salt) is less than 0.1 mass %, can be used.

Other than these, as for examples of the usable discotic liquid crystalline compound, examples of the solvent used for the preparation of a coating solution, examples of the coating method, other materials such as polymerizable initiator and polymerizable monomer, and the support used for the formation of the retardation layer, those described in Japanese Patent Application No. 2004-37835 may be used similarly.

Second Embodiment

Figure 4:
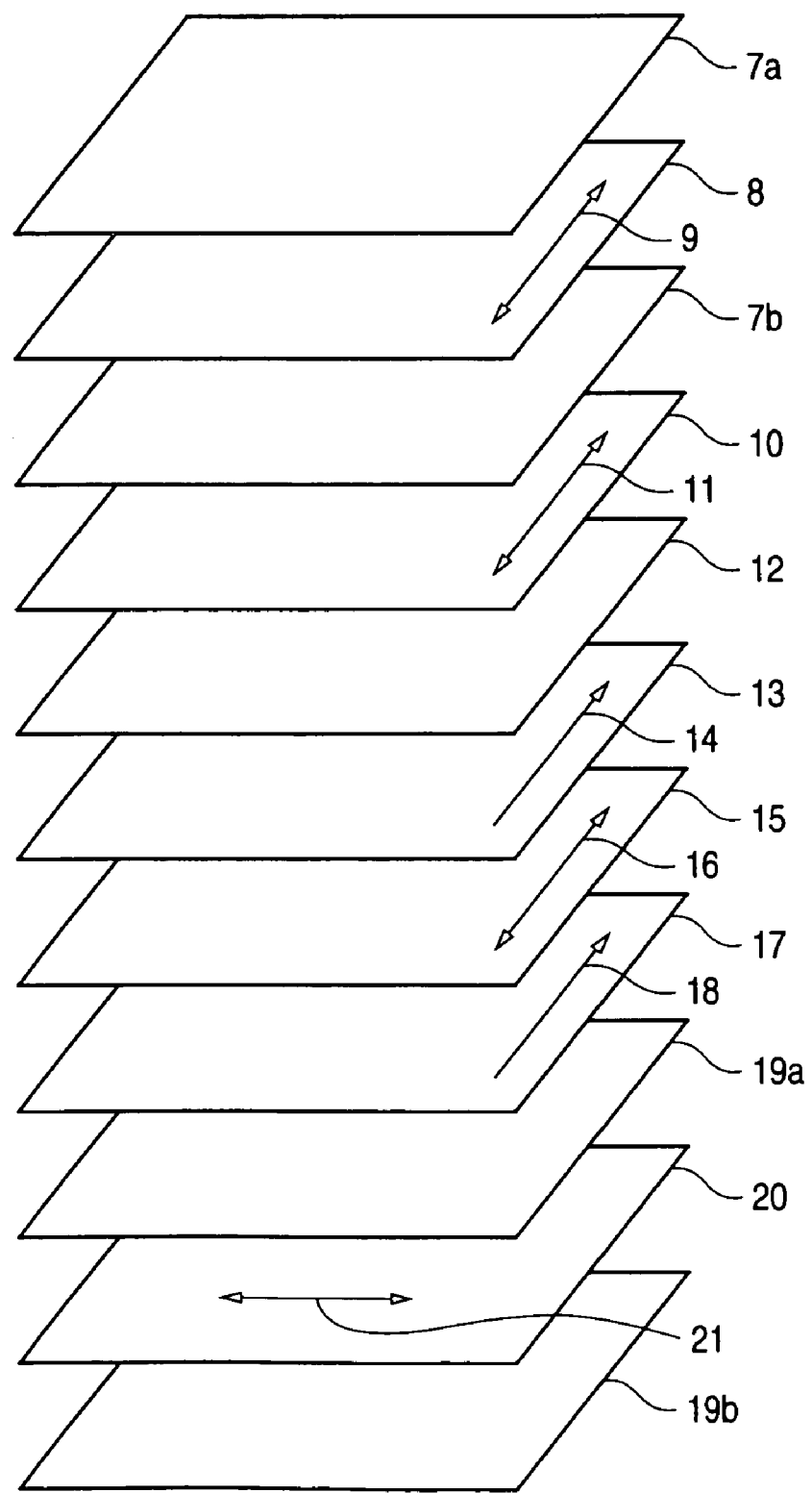
FIG. 4 is a schematic view showing a second embodiment of the liquid crystal display device of the present invention.
Figure 5:
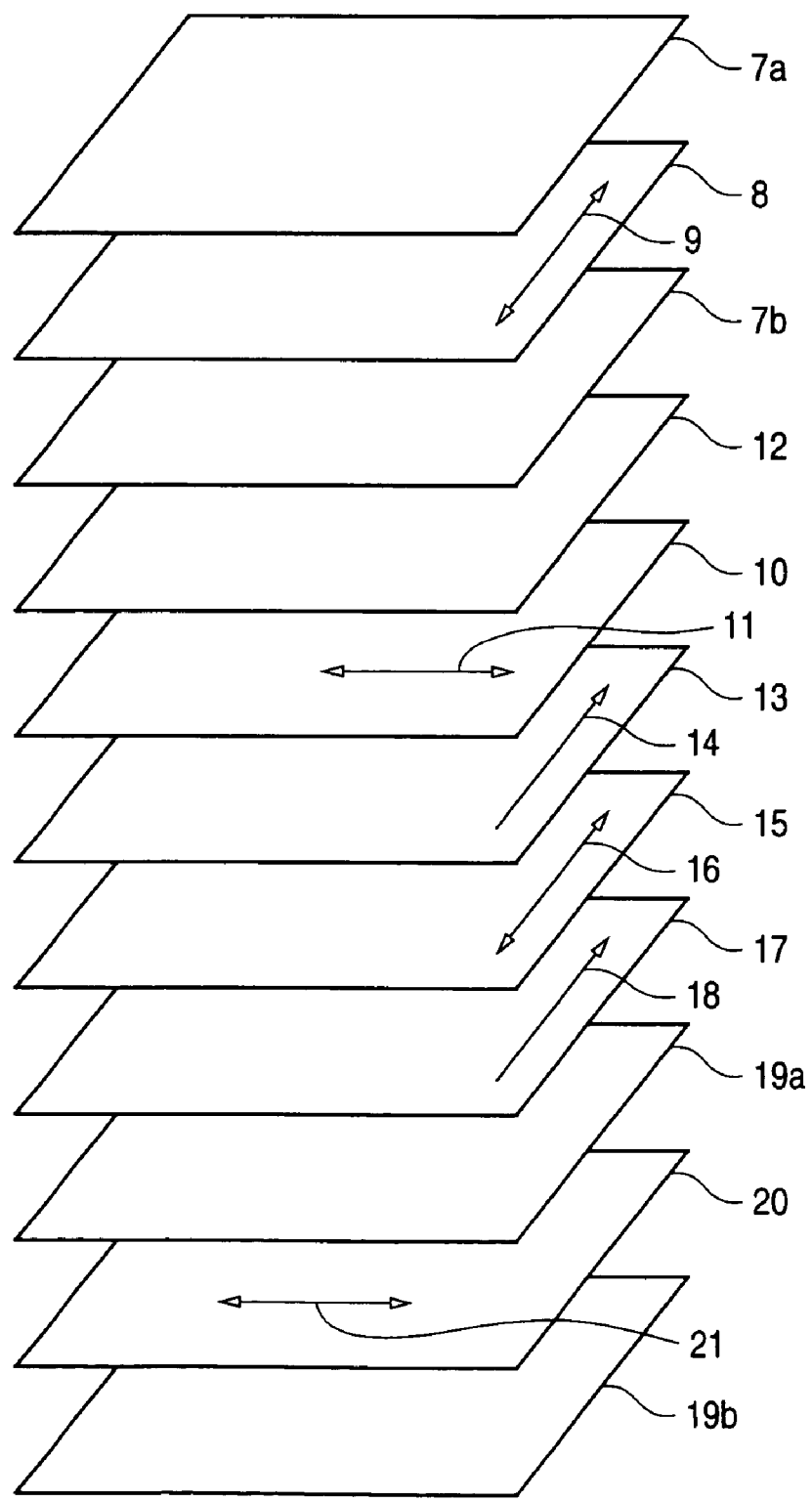
FIG. 5 is a schematic view showing a second embodiment of the liquid crystal display device of the present invention.

The second embodiment of the present invention is described in detail below by referring to the drawings. FIGS. 4 and 5 each is a schematic view showing the liquid crystal display device in the second embodiment of the present invention.

The liquid crystal display device shown in FIG. 4 comprises polarizing films 8 and 20, a first retardation region 10, a second retardation region 12, substrates 13 and 17, and a liquid crystal layer 15 interposed between the substrates. The constitution of the liquid crystal cell and the aligned state of the liquid crystal molecules in one pixel region of the liquid crystal layer 15 are the same as those in the first embodiment of the liquid crystal display device of the present invention.

The polarizing films 8 and 20 are each sandwiched by protective films 7a and 7b and by protective films 19a and 19b, respectively. The transmission axis 9 of the polarizing film 8 is arranged to be orthogonal to the transmission axis 21 of the polarizing film 20. The slow axis 11 of the first retardation region 10 is parallel to the transmission axis 9 of the polarizing film 8 and the slow axis direction 16 of the liquid crystal molecule in the liquid crystal layer 15 at the black display.

The liquid crystal display device shown in FIG. 4 has a constitution such that the polarizing film 8 is sandwiched by two protective films 7a and 7b, but the protective film 7b may not be disposed. Furthermore, the polarizing film 20 is also sandwiched by two protective films 19a and 19b, but the protective film 19a on the side closer to the liquid crystal layer 15 may not be disposed. Incidentally, in the embodiment of FIG. 4, the first retardation region and the second retardation region may be disposed, based on the rear side of the liquid crystal cell, between the liquid crystal cell and the polarizing film on the viewing side (the case where an antiglare layer is provided on the first protective film) or between the liquid crystal cell and the polarizing film on the rear side (the case where an antiglare layer is provided on the second protective film). In either case, the second retardation region is disposed to come closer to the liquid crystal cell in this embodiment.

Again, in the second embodiment, Protective Film 7a is the first protective film, and Protective Film 19b is the second protective film whereby either of the first and second protective films is provided with an antiglare layer by coating. And the protective film coated with the antiglare layer constitutes the viewing side, while the other protective film constitutes the rear side.

FIG. 5 shows another embodiment of the present invention. In the liquid crystal display device shown in FIG. 5, the second retardation region 12 is disposed between the polarizing film 8 and the first retardation region 10. In the liquid crystal display device in FIGS. 5, 7a is the first protective film, and 19b is the second protective film whereby either of the first and second protective films is provided with an antiglare layer by coating. And the protective film coated with the antiglare layer constitutes the viewer side, while the other protective film constitutes the backlight side. In the liquid crystal display device shown in FIG. 5, the protective film 7b or the protective film 19a may not be disposed. In the embodiment of FIG. 5, the first retardation region 10 is disposed to arrange the slow axis 11 thereof to be orthogonal to the transmission axis 9 of the polarizing film 8 and the slow axis direction 16 of the liquid crystal molecule in the liquid crystal layer 15 at the black display. Incidentally, in the embodiment of FIG. 5, the first retardation region and at the second retardation region may be disposed, based on the position of the liquid crystal cell, between the liquid crystal cell and the polarizing film on the viewing side (the case where an antiglare layer is provided on the first protective film) or between the liquid crystal cell and the polarizing film on the rear side (the case where an antiglare layer is provided on the second protective film). In either case, the first retardation region is disposed to come closer to the liquid crystal cell in this embodiment.

In FIG. 5, an embodiment of the transmissive-mode display device comprising an upper polarizing plate and a lower polarizing plate is shown, but the present invention may be a reflective mode comprising only one polarizing plate. In this case, the light path within the liquid crystal cell becomes 2 times and in turn, the optimal $\Delta n \cdot d$ value becomes about ½ of the value described above.

The liquid crystal display device of the present invention is not limited to the constitutions shown in FIGS. 4 and 5 and may contain other members. For example, a color filter may be disposed between the liquid crystal layer and the polarizing film. Also, an antireflection treatment or a hard coat may be applied to the surface of the protective film of the polarizing film. The antiglare antireflection film of the present invention is preferably used. A member imparted with electrical conductivity may also be used for the constituent member. In the case of using the liquid crystal display device as a transmissive type, a cold or hot cathode fluorescent tube or a backlight using a light-emitting diode, a field emission element or an electroluminescent element as the light source may be disposed on the rear side. In this case, the backlight may be disposed on the upper side or the lower side of FIGS. 2 and 3. Furthermore, a reflective polarizing or diffusing plate, a prism sheet or a light guide plate may be disposed between the liquid crystal layer and the backlight. As described above, the liquid crystal display device of the present invention may also be a reflective type and in this case, only one polarizing plate may be disposed on the observation side while a reflection film is disposed on the rear of the liquid cell or on the inner surface of the lower substrate of the liquid crystal cell. Of course, a front light using the above-described light source may be provided on the observation side of the liquid crystal cell.

The liquid crystal display device of the present invention includes an image direct viewing type, an image projection type and a light modulation type. In a particularly effective mode, the present invention is applied to an active matrix liquid crystal display device using a three- or two-terminal semiconductor element such as TFT or MIM. Of course, a mode of applying the present invention to a passive matrix liquid crystal display device called time-division driving is also effective.

Preferred optical properties of various members usable in the liquid crystal display device of the present invention, materials used for the members, production methods thereof, and the like are described in detail below.

[First Retardation Region]

In the second embodiment of the present invention, the in-plane retardation Re of the first retardation region is from 20 to 150 nm. For effectively reducing the light leakage in the oblique direction, the Re of the first retardation region is preferably from 40 to 115 nm, more preferably from 60 to 95 nm. Also, Nz is from 1.5 to 7, and for effectively reducing the light leakage in the oblique direction, Nz of the first retardation region is preferably from 2.0 to 5.5, more preferably from 2.5 to 4.5.

Fundamentally, the first retardation region is not particularly limited in its material and form as long as it has the above-described optical properties. For example, a retardation film comprising a birefringent polymer film, a film formed by coating and then heating a polymer compound on a transparent support, or a retardation film having a retardation layer formed by coating or transferring a low or high molecular liquid crystalline compound on a transparent support, may be used. Also, each film may be used as a laminate of films.

The birefringent polymer film is preferably a polymer film excellent in the controllability of birefringence properties as well as in the transparency and heat resistance. In this case, the polymer material used is not particularly limited as long as the polymer can achieve uniform biaxial orientation, but a conventionally known polymer material capable of forming a film by a solution casting method or an extrusion molding system is preferred. Examples thereof include an aromatic polymer such as norbornene-based polymer, polycarbonate-based polymer, polyallylate-based polymer, polyester-based polymer and polysulfone, a cellulose acylate, and a polymer comprising a mixture of two or more of these polymers.

The biaxial orientation of the film may be achieved by producing a film comprising a thermoplastic resin according to an appropriate system such as extrusion molding system or cast film-forming system, and stretching the film, for example, according to a longitudinal stretching system using a roll or a transverse or biaxial stretching system using a tenter. In the case of the longitudinal stretching system using a roll, an appropriate heating method such as a method using a heating roller, a method of heating the atmosphere or a combination use of these methods, may be employed. In the case of the biaxial stretching system using a tenter, an appropriate method such as a simultaneous biaxial stretching method by an all-tenter system or a sequential biaxial stretching method by a roll-tenter system, may be employed.

This retardation film preferably has less unevenness in the orientation or retardation. The thickness thereof may be appropriately determined according to the retardation and the like but in view of thinning, the thickness is generally from 1 to 300 μm, preferably from 10 to 200 μm, more preferably from 20 to 150 μm.

The norbornene-based polymer is a polymer of a monomer mainly comprising a norbornene-based monomer such as norbornene or a derivative thereof, tetracyclododecene or a derivative thereof, dicyclopentadiene or a derivative thereof, and methanotetrahydrofluorene or a derivative thereof, and examples thereof include a ring-opened polymer of a norbornene-based monomer, a ring-opened copolymer of a norbornene-based monomer and another monomer ring-opening copolymerizable therewith, an addition polymer of a norbornene-based monomer, an addition copolymer of a norbornene-based monomer and another monomer copolymerizable therewith, and a hydrogenated product thereof. Among these, for example, in view of heat resistance and mechanical strength, a hydrogenated ring-opened polymer of a norbornene-based monomer is most preferred. The molecular weight of the norbornene-based polymer, monocyclic olefin polymer or cyclic conjugated diene polymer is appropriately selected according to the intended use but in terms of the polyisoprene- or polystyrene-reduced weight average molecular weight as measured by gel permeation chromatography with a cyclohexane solution (when the polymer resin is not dissolved, a toluene solution), the molecular weight is usually from 5,000 to 500,000, preferably from 8,000 to 200,000, more preferably from 10,000 to 100,000, and within this range, the film (A) is advantageously assured of high balance between mechanical strength and shaping processability.

The acyl group of the cellulose acylate is not particularly limited and may be an aliphatic group or an allyl group. Examples thereof include an alkyl carbonyl ester of cellulose, an alkenylcarbonyl ester of cellulose, an aromatic carbonyl ester of cellulose, and an aromatic alkylcarbonyl ester of cellulose, and these groups each may further have a substituted group. An ester group having a total carbon number of 22 or less is preferred. Preferred examples of the cellulose acylate include an acyl group with the ester moiety having a total carbon number of 22 or less (e.g., acetyl, propionyl, butyroyl, valel, heptanoyl, octanoyl, decanoyl, dodecanoyl, tridecanoyl, hexadecanoyl, octadecanoyl), an arylcarbonyl group (e.g., acryl, methacryl), an allylcarbonyl group (e.g., benzoyl, naphthaloyl), and a cinnamoyl group. Among these, preferred are a cellulose acetate, a cellulose acetate propionate, a cellulose acetate butyrate, a cellulose acetate stearate and a cellulose acetate benzoate. In the case of a mixed ester, the ratio thereof is not particularly limited, but it is preferred that an acetate occupies 30 mol % or more of all esters.

In particular, a cellulose acylate is preferred, and a photographic grade cellulose acylate is more preferred. The photographic grade cellulose acylate is available on the market, which satisfies the quality such as viscosity average polymerization degree and the substitution degree. Examples of the manufacturer of the photographic grade cellulose triacetate include Daicel Chemical Industries, Ltd. (e.g., LT-20, 30, 40, 50, 70, 35, 55, 105), Eastman Kodak Co., Ltd. (e.g., CAB-551-0.01, CAB-551-0.02, CAB-500-5, CAB-381-0.5, CAB-381-02, CAB-381-20, CAB-321-0.2, CAP-504-0.2, CAP-482-20, CA-398-3), Courtaulds Co., Ltd., and Hoechst Co., Ltd., and a photographic grade cellulose acylate produced by any of these manufactures may be used. Also, for the purpose of controlling the mechanical or optical properties of the film, a plasticizer, a surfactant, a retardation adjusting agent, a UV absorbent and the like may be mixed (see, JP-A-2002-277632 and JP-A-2002-182215).

With respect to the method for shaping the transparent resin into a sheet or film form, for example, a heat-melt molding method and a solution casting method both may be used. The heat-melt molding method can be classified, in more detail, into an extrusion molding method, a press molding method, an inflation molding method, an injection molding method, a blow molding method and a stretch molding method. Among these methods, for obtaining a film excellent in mechanical strength, surface precision and the like, an extrusion molding method, an inflation molding method and a press molding method are preferred, and an extrusion molding method is most preferred. The molding conditions are appropriately selected according to the intended use or molding method, but in the case of a heat-melt molding method, the cylinder temperature is appropriately set in the range preferably from 100 to 400° C., more preferably from 150 to 350° C. The thickness of the sheet or film is preferably from 10 to 300 μm, more preferably from 30 to 200 μm.

Assuming that the glass transition temperature of the transparent resin is Tg, the sheet or film is stretched at a temperature in the range preferably from (Tg−30° C.) to (Tg+60° C.), more preferably from (Tg−10° C.) to (Tg+50° C.), at least in one direction preferably at a stretching ratio of 1.01 to 2. The stretching direction may be sufficient if the sheet or film is stretched at least in one direction, but in the case of a sheet obtained by extrusion molding, the stretching direction is preferably the mechanical flow direction (extrusion direction) of the resin, and the stretching method is preferably, for example, a free shrinkage uniaxial stretching method, a width fixed uniaxial stretching method or a biaxial stretching method. The optical properties can be controlled by controlling the stretching ratio and the heating temperature.

[Second Retardation Region]

In the liquid crystal display device according to the second embodiment of the present invention, the in-plane refractive indices $n_x$ and $n_y$ of the second retardation region are substantially the same, and the retardation Rth in the thickness direction of the second retardation region is from −80 to −400 nm. The preferred range of Rth of the second retardation region varies depending on the optical properties of other optical members and in particular, greatly varies according to Rth of the protective film (for example, triacetyl cellulose film) protecting the polarizing film located at a closer position. For effectively reducing the light leakage in the oblique direction, the Rth of the second retardation region is preferably from −100 to −340 nm, more preferably from −120 to −270 nm. On the other hand, $n_x$ and $n_y$ of the second retardation region are substantially the same as described above, and Re becomes a value in the vicinity of 0. More specifically, the in-plane retardation Re is preferably from 0 to 50 nm, more preferably from 0 to 20 nm, even more preferably from 0 to 10 nm and most preferably from 0 to 5 nm.

The second retardation region is not particularly limited in its material and form as long as it has the above-described optical properties. For example, a retardation film comprising a birefringent polymer film, or a retardation film having a retardation layer formed by coating or transferring a low or high molecular liquid crystalline compound on a transparent support, may be used. Also, each film may be used as a laminate of films.

The retardation film comprising a birefringent polymer film having the above-described optical properties can be easily produced by a method of stretching a polymer film in the thickness direction or a method of coating an drying a vinyl carbazole-based polymer (see, JP-A-2001-091746). Examples of the retardation layer formed from a liquid crystalline compound having the above-described optical properties include a layer formed by coating a cholesteric discotic liquid crystal compound or composition containing a chiral structural unit, aligning the helical axis to be nearly vertical to the substrate, and fixing it; and a layer formed by aligning a rod-like liquid crystal compound or composition having a positive refractive index anisotropy to be nearly vertical to the substrate, and fixing it (see, for example, JP-A-6-331826 and Japanese Patent No. 2,853,064). The rod-like liquid crystal compound may be a low molecular compound or a polymer compound. Furthermore, not only one sheet of a retardation layer but also a plurality of stacked retardation layers may constitute the second retardation region having the above-described optical properties. In addition, the second retardation region may be constituted such that the stacked body as a whole of the support and the retardation layer satisfies the optical properties. As for the rod-like liquid crystal compound, a compound taking a nematic liquid crystal phase, smectic liquid crystal phase or lyotropic crystal phase state in the temperature range of fixing the alignment is suitably used. A liquid crystal showing a smectic A phase or B phase in which uniform vertical alignment can be obtained without fluctuation, is preferred. Particularly, in the case of a rod-like liquid crystalline compound which yields the above-described liquid crystal state at an appropriate alignment temperature in the presence of an additive, the layer may be also preferably formed by using a composition containing the additive and the rod-like liquid crystalline compound.

<Rod-Like Liquid Crystalline Compound>

The second retardation region of the present invention may be formed of a composition containing a rod-like liquid crystalline compound. Preferred examples of the rod-like liquid crystalline compound include azomethines, azoxys, cyanobiphenyls, cyanophenyl esters, benzoic esters, phenyl cyclohexanecarboxylates, cyano-phenylcyclohexanes, cyano-substituted phenylpyridines, alkoxyl-substituted phenylpyridines, phenyldioxanes, tolanes and alkenylcyclohexylbenzonitriles. Not only these low molecular liquid crystalline molecules but also a polymer liquid crystalline molecule may be used. A liquid crystalline molecule having a partial structure capable of causing a polymerization or crosslinking reaction by the effect of actinic ray, electron beam or heat is suitably used. The number of the partial structures is from 1 to 6, preferably from 1 to 3.

In the case where the second retardation region contains a retardation layer formed by fixing a rod-like liquid crystalline compound in the aligned state, a retardation layer formed by aligning the rod-like liquid crystalline compound substantially in the vertical alignment and fixing this state, is preferably used. The term "substantially vertical" means that the angle made by the film plane and the director of the rod-like liquid crystalline compound is from 70 to 90°. Such a liquid crystalline compound may be obliquely aligned or may be aligned so that the tilt angle can gradually change (hybrid alignment). In either case of oblique alignment or hybrid alignment, the average tilt angle is preferably from 70 to 90°, more preferably from 80 to 90° C., and most preferably from 85 to 90°.

The retardation layer formed of a rod-like liquid crystalline compound can be formed by coating a coating solution comprising a rod-like liquid crystalline compound and, if desired, containing the following polymerizable initiator or air-interface vertically aligning agent and other additives on a vertical alignment film formed on a support, thereby effecting vertical alignment, and fixing the aligned state. When the retardation layer is formed on a temporary support, the retardation layer can be produced by transferring it onto a support. Not only one retardation layer but also a plurality of stacked retardation layers may constitute the second retardation region having the above-described optical properties. In addition, the second retardation region may be constituted such that the stacked body as a whole of the support and the retardation layer satisfies the optical properties.

The solvent used for the preparation of the coating solution is preferably an organic solvent. Examples of the organic solvent include an amide ((e.g., N,N-dimethylformamide), a sulfoxide (e.g., dimethylsulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone) and an ether (e.g., tetrahydrofuran, 1,2-dimethoxyethane). Among these, an alkyl halide and a ketone are preferred. Two or more organic solvents may be used in combination. The coating solution can be coated by a known method (e.g., extrusion coating, direct gravure coating, reverse gravure coating, die coating).

The vertically aligned liquid crystalline compound is preferably fixed while maintaining the aligned state. The fixing is preferably performed by a polymerization reaction of a polymerizable group (P) introduced into the liquid crystalline compound. The polymerization reaction includes a thermal polymerization reaction using a thermal polymerization initiator and a photopolymerization reaction using a photopolymerization initiator. A photopolymerization reaction is preferred. Examples of the photopolymerization initiator include an α-carbonyl compound (those described in U.S. Pat. Nos. 2,367,661 and 2,367,670), an acyloin ether (those described in U.S. Pat. No. 2,448,828), an α-hydrocarbon-substituted aromatic acyloin compound (those described in U.S. Pat. No. 2,722,512), a polynuclear quinone compound (those described in U.S. Pat. Nos. 3,046,127 and 2,951,758), a combination of a triarylimidazole dimer and a p-aminophenyl ketone (those described in U.S. Pat. No. 3,549,367), an acridine or phenazine compound (those described in JP-A-60-105667 and U.S. Pat. No. 4,239,850), and an oxadiazole compound (those described in U.S. Pat. No. 4,212,970).

The amount of the photopolymerization initiator used is preferably from 0.01 to 20 mass %, more preferably from 0.5 to 5 mass %, based on the solid content of the coating solution. The light irradiation for the polymerization of rod-like liquid crystalline molecules is preferably performed by using an ultraviolet ray. The irradiation energy is preferably from 20 $mJ/cm^2$ to 50 $J/cm^2$, more preferably from 100 to 800 $mJ/cm^2$. In order to accelerate the photopolymerization reaction, the light irradiation may be performed under heating. The thickness of the first retardation region including the optically anisotropic layer is preferably from 0.1 to 10 μm, more preferably from 0.5 to 5 μm, and most preferably from 1 to 5 μm.

<Vertical Alignment Film>

For vertically aligning the liquid crystalline compound on the alignment film side, it is important to reduce the surface energy of the alignment film. More specifically, the surface energy of the alignment film is decreased by the functional group of the polymer, and this brings about a state that the liquid crystalline compound is standing up. As for the functional group of decreasing the surface energy of the alignment film, a fluorine atom and a hydrocarbon group having 10 or more carbon atoms are effective. In order to cause a fluorine atom or a hydrocarbon group to be present on the alignment film surface, a fluorine atom or a hydrocarbon group is preferably introduced into the side chain of the polymer rather than into the main chain. The fluorine-containing polymer preferably contains a fluorine atom at a proportion of 0.05 to 80 mass %, more preferably from 0.1 to 70 mass %, still more preferably from 0.5 to 65 mass %, and most preferably from 1 to 60 mass %. The hydrocarbon group is an aliphatic group, an aromatic group or a combination thereof. The aliphatic group may be cyclic, branched or linear. The aliphatic group is preferably an alkyl group (may be a cycloalkyl group) or an alkenyl group (may be a cycloalkenyl group). The hydrocarbon group may have a substituent not exhibiting strong hydrophilicity like hydrogen atom. The number of carbon atoms in the hydrocarbon group is preferably from 10 to 100, more preferably from 10 to 60, and most preferably from 10 to 40. The main chain of the polymer preferably has a polyimide structure or a polyvinyl alcohol structure.

The polyimide is generally synthesized by a condensation reaction of a tetracarboxylic acid and a diamine. A polyimide corresponding to a copolymer may also be synthesized by using two or more kinds of tetracarboxylic acids or two or more kinds of diamines. The fluorine atom or hydrocarbon group may be present in the repeating unit originated in the tetracarboxylic acid, may be present in the repeating unit originated in the diamine, or may be present in both repeating units. In the case of introducing a hydrocarbon group into a polyimide, it is particularly preferred to form a steroid structure in the main or side chain of the polyimide. The steroid structure present in the side chain corresponds to a hydrocarbon group having 10 or more carbon atoms and has a function of vertically aligning the liquid crystalline compound. The term "steroid structure" as used in the present invention means a cyclopentanohydrophenanthrene ring structure or a ring structure resulting from conversion of a part of bonds in the cyclopentanohydrophenanthrene ring into a double bond within the aliphatic ring range (the range of not forming an aromatic ring).

As for the means of vertically aligning the liquid crystalline compound, a method of mixing an organic acid in a polymer such as polyvinyl alcohol, modified polyvinyl alcohol and polyimide can be suitably used. The acid mixed is suitably a carboxylic acid, a sulfonic acid or an amino acid. Out of the air-interface aligning agents described later, those showing acidity may also be used. Furthermore, quaternary ammonium salts can also be suitably used. The amount mixed is preferably from 0.1 to 20 mass %, more preferably from 0.5 to 10 mass %, based on the polymer.

The saponification degree of the polyvinyl alcohol is preferably from 70 to 100%, more preferably from 80 to 100%, and the polymerization degree of the polyvinyl alcohol is preferably from 100 to 5,000.

In the case of aligning a rod-like liquid crystalline compound, the alignment film preferably comprises a polymer having a hydrophobic group as a functional group in the side chain. The kind of the functional group is specifically determined according to the kind of the liquid crystalline molecule and the required alignment state. For example, the modifying group for the modified polyvinyl alcohol can be introduced by copolymerization modification, chain transfer modification or block polymerization modification. Examples of the modifying group include a hydrophilic group (e.g., carboxylic acid group, sulfonic acid group, phosphonic acid group, amino group, ammonium group, amide group, thiol group), a hydrocarbon group having a carbon number of 10 to 100, a fluorine atom-substituted hydrocarbon group, a thioether group, a polymerizable group (e.g., unsaturated polymerizable group, epoxy group, aziridinyl group), and an alkoxysilyl group (e.g., trialkoxy, dialkoxy, monoalkoxy). Specific examples of such a modified polyvinyl alcohol compound include those described in JP-A-2000-155216 (paragraphs [0022] to [0145]), and JP-A-2002-62426 (paragraphs [0018] to [0022]).

When an alignment film is formed by using a polymer having a side chain containing a crosslinking functional group bonded to the main chain or a polymer having in the side chain a crosslinking functional group having a function of aligning liquid crystalline molecules and a retardation film is formed thereon by using a composition containing a polyfunctional monomer, the polymer in the alignment film can be copolymerized with the polyfunctional monomer in the retardation film formed thereon. As a result, a covalent bond is formed not only between the polyfunctional monomers but also between the alignment film polymers and between the polyfunctional monomer and the alignment film polymer, so that the alignment film and the retardation film can be firmly bonded. Accordingly, by using a polymer having a crosslinking functional group for the formation of an alignment film, the strength of the optical compensation sheet can be remarkably improved. The crosslinking functional group of the alignment film polymer preferably contains a polymerizable group, similarly to the polyfunctional monomer. Specific examples thereof include those described in JP-A-2000-155216 (paragraphs [0080] to [0100]).

The alignment film polymer may be also crosslinked by using a crosslinking agent, separately from the above-described crosslinking functional group. Examples of the crosslinking agent include an aldehyde, an N-methylol compound, a dioxane derivative, a compound of exerting activity resulting from activation of a carboxyl group, an active vinyl compound, an active halogen compound, an isoxazole, and a dialdehyde starch. Two or more kinds of crosslinking agents may be used in combination. Specific examples thereof include the compounds described in JP-A-2002-62426 (paragraphs [0023] to [024]). An aldehyde having high reaction activity is preferred, and glutaraldehyde is more preferred.

The amount of the crosslinking agent added is preferably from 0.1 to 20 mass %, more preferably from 0.5 to 15 mass %, based on the polymer. The amount of the unreacted crosslinking agent remaining in the alignment film is preferably 1.0 mass % or more, more preferably 0.5 mass % or more. By adjusting in this way, even when the alignment film is used in a liquid crystal display device for a long time or is left standing in a high-temperature high-humidity atmosphere for a long time, good durability free from generation of reticulation can be achieved.

The alignment film can be formed fundamentally by a method where a composition containing the above-described polymer as the alignment film-forming material and a crosslinking agent is coated on a transparent support and dried (crosslinked) under heat and the formed film is subjected to rubbing. As described above, the crosslinking reaction may be performed at an arbitrary timing after coating the composition on a transparent support. In the case of using a water-soluble polymer such as polyvinyl alcohol as the alignment film-forming material, the coating solution is preferably prepared by using a mixed solvent of an organic solvent having defoaming activity (e.g., methanol) and water. The ratio of water:methanol is, in terms of the mass ratio, preferably from 0:100 to 99:1, more preferably from 0:100 to 91:9. With the ratio in this range, generation of bubbles can be prevented and the defects on the surface of the alignment film and in turn the retardation layer are greatly decreased.

The alignment film is preferably coated by a spin coating method, a dip coating method, a curtain coating method, an extrusion coating method, a rod coating method or a roll coating method, more preferably by a rod coating method. The thickness after drying is preferably from 0.1 to 10 μm. The drying under heat may be performed at 20 to 110° C. For forming satisfactory crosslinking, the drying time is preferably from 60 to 100° C., more preferably from 80 to 100° C. The drying time may be from 1 minute to 36 hours but is preferably from 1 to 30 minutes. The pH is also preferably set to a value optimal to the crosslinking agent used. In the case of using glutaraldehyde, the pH is preferably from 4.5 to 5.5, more preferably 5.

The alignment film is preferably provided on a transparent support. The alignment film is used as described above by crosslinking the polymer layer. The vertical alignment of the rod-like liquid crystalline compound is preferably not subjected to the rubbing treatment. Incidentally, after the liquid crystalline compound is aligned by using the alignment film and the liquid crystalline compound in the aligned state is fixed as it is to form a retardation layer, only the retardation layer may be transferred onto a polymer film (or a transparent support).

<Air-Interface Vertically Aligning Agent>

Usually, the liquid crystalline compound has a property to align atilt on the air-interface side and for obtaining a uniformly and vertically aligned state, the liquid crystalline compound needs to be controlled to vertically align on the air-interface side. For this purpose, a retardation film is preferably formed by using a liquid crystal coating solution having incorporated therein a compound which is locally present on the air-interface side and exerts a function of vertically aligning the liquid crystalline compound by the excluded volume effect or electrostatic effect.

As for the air-interface aligning agent, the compounds described in JP-A-2002-20363 and JP-A-2002-129162 may be used. Also, the matters described in Japanese Patent Application Nos. 2002-212100 (paragraphs [0072] to [0075]), 2002-262239 (paragraphs to [0039]), 2003-91752 (paragraphs [0071] to [0078]), 2003-119959 (paragraphs to [0054], [0065], [0066] and [0092] to [0094]), 2003-330303 (paragraphs [0028] to [0030]), and 2004-003804 (paragraphs [0087] to [0090]) may be appropriately applied to the present invention. By virtue of blending such a compound, the coatability is improved and the generation of unevenness or repelling is suppressed.

The amount of the air-interface aligning agent used in the liquid crystal coating solution is preferably from 0.05 to 5 mass %. In the case of using a fluorine-based air-interface aligning agent, the amount used thereof is preferably 1 mass % or less.

<Other Materials in Retardation Layer>

In combination with the liquid crystalline compound, a plasticizer, a surfactant, a polymerizable monomer and the like may be used, for example, to enhance the coatability of coating film, the strength of film, or the aligning property of liquid crystalline compound. These materials preferably have compatibility with the liquid crystalline compound and cause no inhibition of the alignment.

The polymerizable monomer includes a radical polymerizable or cationic polymerizable compound and is preferably a polyfunctional radical polymerizable monomer. The polyfunctional radical polymerizable monomer is preferably copolymerizable with the above-described polymerizable group-containing liquid crystal compound. Examples thereof include those described in JP-A-2002-296423 (paragraphs [0018] to [0020]). The amount of this compound added is generally from 1 to 50 mass %, preferably from 5 to 30 mass", based on the discotic liquid crystalline molecule.

The surfactant includes conventionally known compounds and is preferably a fluorine-based compound. Specific examples thereof include the compounds described in JP-A-2001-330725 (paragraphs [0028] to [0056]) and Japanese Patent Application No. 2003-295212 (paragraphs [0069] to [0126]).

The polymer used together with the liquid crystalline compound preferably has the capability of thickening the coating solution. Examples of the polymer include a cellulose ester. Preferred examples of the cellulose ester include those described in JP-A-2000-155216 (paragraph [0178]). In order not to inhibit the alignment of the liquid crystalline compound, the amount of the polymer added is preferably from 0.1 to 10 mass %, more preferably from 0.1 to 8 mass %, based on the liquid crystalline molecule.

[Protective Film for Polarizing Film]

The liquid crystal display device of the present invention may have a protective film for polarizing film so as to protect the polarizing film. The protective film for polarizing film is preferably a film having no absorption in the visible region, having a light transmittance of 80% or more, and giving small retardation based on the birefringence. More specifically, the in-plane Re is preferably from 0 to 30 nm, more preferably from 0 to 15 nm, and most preferably from 0 to 5 nm. In the embodiment where the first retardation is disposed at a position closer to the liquid crystal cell as compared with the second retardation region, for example, in the embodiment shown in FIG. 2, the Rth of the protective film disposed on the liquid crystal cell side (for example, 7b and 19a in FIG. 2) is preferably 40 nm or less, more preferably from 40 to −100 nm, still more preferably from 40 to −50 nm, yet still more preferably from 20 to −20 nm. Also, in the embodiment where the second retardation is disposed at a position closer to the liquid crystal cell as compared with the first retardation region, for example, in the embodiment shown in FIG. 3, the Rth of the protective film disposed on the liquid crystal cell side (for example, 7b and 19a in FIG. 3) is preferably 40 nm or less, more preferably from 40 to −50 nm, still more preferably from 20 to −20 nm. The other protective film (for example, 7a and 19b in FIGS. 2 and 3) is not particularly limited in its optical properties.

From the standpoint of reducing the Rth, the thickness of the protective film, particularly, the thickness of the protective film disposed on the liquid crystal cell side, is preferably 60 μm or less, more preferably 50 μm or less, still more preferably 40 μm or less. However, when the protective film comprises a plurality of layers so as to satisfy the above-described optical properties, the preferred thickness is not limited to this range.

Any film may be used for the protective film as long as it satisfies those optical properties, but in view of durability of the polarizing film, the protective film preferably contains a cellulose acylate or norbornene-based film.

The norbornene-based polymer is a polymer of a monomer mainly comprising a norbornene-based monomer such as norbornene or a derivative thereof, tetracyclododecene or a derivative thereof, dicyclopentadiene or a derivative thereof, and methanotetrahydrofluorene or a derivative thereof, and examples thereof include a ring-opened polymer of a norbornene-based monomer, a ring-opened copolymer of a norbornene-based monomer and another monomer ring-opening copolymerizable therewith, an addition polymer of a norbornene-based monomer, an addition copolymer of a norbornene-based monomer and another monomer copolymerizable therewith, and a hydrogenated product thereof. Among these, for example, in view of heat resistance and mechanical strength, a hydrogenated ring-opened polymer of a norbornene-based monomer is most preferred. The molecular weight of the norbornene-based polymer, monocyclic olefin polymer or cyclic conjugated diene polymer is appropriately selected according to the intended use but in terms of the polyisoprene- or polystyrene-reduced weight average molecular weight as measured by gel permeation chromatography with a cyclohexane solution (when the polymer resin is not dissolved, a toluene solution), the molecular weight is usually from 5,000 to 500,000, preferably from 8,000 to 200,000, more preferably from 10,000 to 100,000, and within this range, the film is advantageously assured of high balance between mechanical strength and shaping processability.

The acyl group of the cellulose acylate is not particularly limited and may be an aliphatic group or an allyl group. Examples thereof include an alkyl carbonyl ester of cellulose, an alkenylcarbonyl ester of cellulose, an aromatic carbonyl ester of cellulose, and an aromatic alkylcarbonyl ester of cellulose, and these groups each may further have a substituted group. An ester group having a total carbon number of 22 or less is preferred. Preferred examples of the cellulose acylate include an acyl group with the ester moiety having a total carbon number of 22 or less (e.g., acetyl, propionyl, butyroyl, valel, heptanoyl, octanoyl, decanoyl, dodecanoyl, tridecanoyl, hexadecanoyl, octadecanoyl), an arylcarbonyl group (e.g., acryl, methacryl), an allylcarbonyl group (e.g., benzoyl, naphthaloyl), and a cinnamoyl group. Among these, preferred are a cellulose acetate, a cellulose acetate propionate, a cellulose acetate butyrate, a cellulose acetate stearate and a cellulose acetate benzoate. In the case of a mixed ester, the ratio thereof is not particularly limited, but it is preferred that an acetate occupies 30 mol % or more of all esters.

In particular, a cellulose acylate is preferred, and a photographic grade cellulose acylate is more preferred. The photographic grade cellulose acylate is available on the market, which satisfies the quality such as viscosity average polymerization degree and the substitution degree. Examples of the manufacturer of the photographic grade cellulose triacetate include Daicel Chemical Industries, Ltd. (e.g., LT-20, 30, 40, 50, 70, 35, 55, 105), Eastman Kodak Co., Ltd. (e.g., CAB-551-0.01, CAB-551-0.02, CAB-500-5, CAB-381-0.5, CAB-381-02, CAB-381-20, CAB-321-0.2, CAP-504-0.2, CAP-482-20, CA-398-3), Courtaulds Co., Ltd., and Hoechst Co., Ltd., and a photographic grade cellulose acylate produced by any of these manufactures may be used. Also, for the purpose of controlling the mechanical or optical properties of the film, a plasticizer, a surfactant, a retardation adjusting agent, a UV absorbent and the like may be mixed (see, JP-A-2002-277632 and JP-A-2002-182215).

With respect to the method for shaping the transparent resin into a sheet or film form, for example, a heat-melt molding method and a solution casting method both may be used. The heat-melt molding method can be classified, in more detail, into an extrusion molding method, a press molding method, an inflation molding method, an injection molding method, a blow molding method and a stretch molding method. Among these methods, for obtaining a film excellent in mechanical strength, surface precision and the like, an extrusion molding method, an inflation molding method and a press molding method are preferred, and an extrusion molding method is most preferred. The molding conditions are appropriately selected according to the intended use or molding method, but in the case of a heat-melt molding method, the cylinder temperature is appropriately set in the range preferably from 100 to 400° C., more preferably from 150 to 350° C. The thickness of the sheet or film is preferably from 10 to 300 μm, more preferably from 30 to 200 μm.

Assuming that the glass transition temperature of the transparent resin is Tg, the sheet or film is stretched at a temperature in the range preferably from (Tg−30° C.) to (Tg+60° C.), more preferably from (Tg−10° C.) to (Tg+50° C.), at least in one direction preferably at a stretching ratio of 1.01 to 2. The stretching direction may be sufficient if the sheet or film is stretched at least in one direction, but in the case of a sheet obtained by extrusion molding, the stretching direction is preferably the mechanical flow direction (extrusion direction) of the resin, and the stretching method is preferably, for example, a free shrinkage uniaxial stretching method, a width fixed uniaxial stretching method or a biaxial stretching method. The optical properties can be controlled by controlling the stretching ratio and the heating temperature.

In order to reduce the Rth of the cellulose acylate film, a method of mixing a non-planar structure compound in the film is effective. Examples thereof include the methods described in JP-A-11-246704, JP-A-2001-247717 and Japanese Patent Application No. 2003-379975. The Rth can be also made smaller by decreasing the thickness of the cellulose acylate film.

The protective film for polarizing plate, having optical properties such that the Rth is negative, can be easily formed by a method of stretching a polymer film in the film thickness direction (see, for example, JP-A-2000-162436) or a method of coating and crying a vinyl carbazole-based polymer (see, for example, JP-A-2001-091746). The protective film may also contain a liquid crystal material and may be formed, for example, as a retardation layer from a liquid crystalline compound having optical properties of the Rth being negative. Examples of the retardation layer include a layer formed by coating a cholesteric discotic liquid crystal compound or composition containing a chiral structural unit, aligning the helical axis to be nearly vertical to the substrate, and fixing it; and a layer formed by aligning a rod-like liquid crystal compound or composition having a positive refractive index anisotropy to be nearly vertical to the substrate, and fixing it (see, for example, JP-A-6-331826 and Japanese Patent No. 2,853,064). The rod-like liquid crystal compound may be a low molecular compound or a polymer compound. Furthermore, not only one retardation layer but also a plurality of stacked retardation layers may constitute the protective film having the optical properties of the Rth being negative. In addition, the protective layer may be constituted such that the stacked body as a whole of the support and the retardation layer satisfies the optical properties of the Rth being negative. As for the rod-like liquid crystal compound, a compound taking a nematic liquid crystal phase, smectic liquid crystal phase or lyotropic crystal phase state in the temperature range of fixing the alignment is suitably used. A liquid crystal showing a smectic A phase or B phase in which uniform vertical alignment can be obtained without fluctuation, is preferred. Particularly, in the case of a rod-like liquid crystalline compound which yields the above-described liquid crystal state at an appropriate alignment temperature in the presence of an additive, the layer may be also preferably formed by using a composition containing the additive and the rod-like liquid crystalline compound.

In order to improve the adhesion between the protective film and a layer provided thereon (adhesive layer, alignment film or retardation layer), the film may be subjected to a surface treatment (e.g., glow discharge treatment, corona discharge treatment, ultraviolet (UV) treatment, flame treatment). Also, an adhesive layer (undercoat layer) may be provided on the transparent support. For imparting slipperiness in the transportation step or preventing sticking of the back surface to the front surface when the film is taken up, the transparent support or lengthy transparent support is preferably formed by coating a polymer layer in which an inorganic particle having an average particle diameter of approximately from 10 to 100 nm is mixed at a weight ratio of 5 to 40% as the solid content, on one side of the support or co-casting the polymer layer and the support.

[Antiglare Antireflection Film]

In the antiglare antireflection film of the present invention, the following known layer constructions can be used.

Representative examples of the layer construction include:
transparent support/antiglare layer,
transparent support/antiglare layer/low refractive index layer, and
transparent support/antiglare layer/medium refractive index layer/high refractive index layer/low refractive index layer.

Examples of the layer which may be provided between the transparent support and a layer on the surface side include an antistatic layer (when the reduction of surface resistivity from the display side is required or when attachment of dusts to the surface or the like becomes a problem), a moisture-proof layer, an adhesion improving layer, and a rainbow unevenness (interference unevenness)-preventing layer. Also, when an antiglare layer is used on a transparent support and the hardness is insufficient only by the antiglare layer, a hard coat layer may be provided between the transparent support and the antiglare layer.

The antistatic layer may be provided at a position other than between the transparent support and a layer thereon.

As for the rainbow unevenness (interference unevenness)-preventing layer, when a low refractive index layer is formed on the antiglare layer to a thickness of around ¼ of the light wavelength, the surface reflection can be reduced by the thin-film interference principle.

The antiglare antireflection film in the preferred embodiment of the present invention comprises a transparent support, an antiglare layer formed on the transparent support, and a low refractive index layer formed on the antiglare layer. When a low refractive index layer is formed on the antiglare layer to a thickness of around ¼ of the light wavelength, the surface reflection can be reduced by the thin-film interference principle.

The antiglare layer comprises a light-transparent resin and a light-transparent fine particle dispersed in the light-transparent resin.

In the present invention, the refractive indexes of the layers constituting the antiglare antireflection film having an antireflection layer preferably satisfy the following relationship:

refractive index of antiglare layer>refractive index of transparent support>refractive index of low refractive index layer.

The antiglare layer having antiglare property preferably has both the antiglare property and the hard coat property. In this embodiment, the antiglare layer shown comprises one layer but may comprise a plurality of layers, for example, from 2 to 4 layers. Furthermore, the antiglare layer may be provided directly on the transparent support as seen in this embodiment but may also be provided through another layer such as antistatic layer or moisture-proof layer.

The antiglare antireflection film of the present invention is preferably designed to have a surface irregularity shape such that the centerline average roughness Ra is from 0.08 to 0.30 μm, the 10-point average roughness Rz is 10 times or less of Ra, the average peak-to-trough distance Sm is from 1 to 100 μm, the standard deviation of the protrusion height from the deepest portion of irregularities is 0.5 μm or less, the standard deviation of the average peak-to-trough distance Sm based on the centerline is 20 μm or less, and the plane at a tilt angle of 0 to 5° occupies 10% or more, because satisfactory antiglare property and visually uniform matted feeling are achieved. If the Ra is less than 0.08, sufficiently high antiglare property may not be obtained, whereas if it exceeds 0.30, there arises a problem such as glaring or whitening of the surface when outside light is reflected.

Also, when the color tint of reflected light under a C light source has a* value of −2 to 2 and b* value of −3 to 3 in the CIE 1976 L*a*b* color space and the ratio of minimum reflectance to maximum reflectance in the range of 380 to 780 nm is from 0.5 to 0.99, the reflected light gives a neutral color tint and this is preferred. Furthermore, the b* value of transmitted light under a C light source is preferably adjusted to 0 to 3, because yellow tinting of white display at the application to a display device is decreased.

Also, in the optical characteristics of the antiglare antireflection film of the present invention, the haze attributable to internal scattering (hereinafter referred to as an "internal haze") is preferably from 5 to 35%, more preferably from 5 to 30%, still more preferably from 5 to 20%. If the internal haze is less than 5%, the combination of usable materials is limited and the cost rises, whereas if the internal scattering exceeds 35%, the dark room contrast is greatly worsened. Also, the haze attributable to surface scattering (hereinafter referred to as "surface haze") is preferably from 1 to 10%, more preferably from 2 to 7%, and the transmitted image clarity with a comb width of 0.5 mm is preferably from 5 to 30%, because both sufficiently high antiglare property and improvement of image blurring and reduction of dark room contrast can be satisfied. If the surface haze is less than 1%, the antiglare property is insufficient, whereas if it exceeds 10%, there arises a problem such as whitening of the surface when outside light is reflected. Furthermore, the mirror reflectance is preferably 2.5% or less and the transmittance is preferably 90% or more, because the reflection of outside light can be suppressed and the visibility is enhanced.

Also, when the internal haze is reduced to 5% or less, worsening of the dark room contrast can be minimized and this is preferred, though the cost arises. At this time, the surface haze is preferably from 1 to 30%, more preferably from 1 to 20%, and the transmitted image clarity with a comb width of 0.5 mm is preferably from 5 to 30%, because both sufficiently high antiglare property and improvement of image blurring and reduction of dark room contrast can be satisfied.

The antiglare layer is described below.

<Antiglare Layer>

The antiglare layer is formed for the purpose of imparting an antiglare property by the effect of surface scattering to the film and also preferably imparting a hard coat property for enhancing the scratch resistance of the film. Accordingly, the antiglare layer preferably comprises, as essential components, a light-transparent resin capable of imparting a hard coat property, a light-transparent fine particle for imparting an antiglare property, and a solvent.

<Light-Transparent Fine Particle>

The average particle diameter of the light-transparent fine particle is preferably from 0.5 to 10 μm, more preferably from 2.0 to 6.0 μm. If the average particle diameter is less than 0.5 μm, the scattering angle distribution of light expands to a wide angle and this disadvantageously brings about letter blurring of the display, whereas if it exceeds 10 μm, the thickness of the antiglare layer needs to be large and there arises a problem such as increased curing or rising of the material cost.

Specific preferred examples of the light-transparent fine particle include a resin particle such as poly((meth)acrylate) particle, a crosslinked poly((meth)acrylate) particle, polystyrene particle, crosslinked polystyrene particle, crosslinked poly(acryl-styrene) particle, melamine resin particle and benzoguanamine resin particle. Among these, a crosslinked polystyrene particle, a crosslinked poly((meth)acrylate) particle and a crosslinked poly(acryl-styrene) particle are preferred. By adjusting the refractive index of the light-transparent resin according to the refractive index of the light-transparent fine particle selected from these particles, the internal haze, surface haze and centerline average roughness of the present invention can be achieved. More specifically, a combination of a light-transparent resin (refractive index after curing: 1.50 to 1.53) mainly comprising a trifunctional or greater functional (meth)acrylate monomer which is preferably used in the antiglare layer described later of the present invention, and a light-transparent fine particle comprising a crosslinked poly(meth)acrylate polymer having an acryl content of 50 to 100 wt %, is preferred, and a combination of the above-described light-transparent resin and a light-transparent fine particle (refractive index: 1.48 to 1.54) comprising a crosslinked poly(styrene-acryl) copolymer is more preferred.

Also, two or more kinds of light-transparent fine particles differing in the particle diameter may be used in combination. In this case, an antiglare property can be imparted by virtue of a light-transparent fine particle having a larger particle diameter and the surface roughness can be reduced by virtue of a light-transparent fine particle having a smaller particle diameter.

The light-transparent fine particle is blended such that the content thereof in the formed antiglare layer becomes from 3 to 30 mass %, more preferably from 5 to 20 mass %, based on the entire solid content of the antiglare layer. If the light-transparent fine particle content is less than 3 mass %, the antiglare property is insufficient, whereas if it exceeds 30 mass %, there arises a problem such as image blurring, white turbid surface or glaring.

The density of the light-transparent fine particle is preferably from 10 to 1,000 mg/m$^2$, more preferably from 100 to 700 mg/m$^2$.

The refractive index of the light-transparent resin and light-transparent fine particle for use in the present invention is preferably from 1.45 to 1.70, more preferably from 1.48 to 1.65. The refractive index in this range can be attained by appropriately selecting the kind and amount ratio of the light-transparent resin and the light-transparent fine particle. The kind and amount ratio to be selected can be easily known in advance by an experiment.

Also, in the present invention, the difference in the refractive index between the light-transparent resin and the light-transparent fine particle (refractive index of light-transparent fine particle−refractive index of light-transparent resin) is preferably, in terms of the absolute value, from 0.001 to 0.030, more preferably from 0.001 to 0.020, still more preferably from 0.001 to 0.015. If this difference exceeds 0.030, there arises a problem such as film letter burring, reduction of dark room contrast or surface whitening.

Here, the refractive index of the light-transparent resin may be quantitatively evaluated by directly measuring the refractive index with an Abbe refractometer or by measuring a spectral reflection spectrum or a spectral ellipsometry. The refractive index of the light-transparent fine particle is determined by dispersing light-transparent fine particles in an equal amount in solvents prepared by changing the mixing ratio of two kinds of solvents differing in the refractive index and thereby varied in the refractive index, measuring the turbidity, and reading the refractive index of the solvent on giving a minimum turbidity by an Abbe refractometer.

The thickness of the antiglare layer is preferably from 1 to 10 μm, more preferably from 1.2 to 8 μm. If the thickness is too small, the hard property is insufficient, whereas if it is too large, curling or fragility may deteriorate to decrease the processability. Therefore, the thickness is preferably in this range.

<Light-Transparent Resin>

The light-transparent resin is preferably a binder polymer having a saturated hydrocarbon chain or a polyether chain as the main chain, more preferably a binder polymer having a saturated hydrocarbon chain as the main chain. Also, the binder polymer preferably has a crosslinked structure.

The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups.

In order to elevate the refractive index of the binder polymer, a high refractive index monomer containing, in the monomer structure, an aromatic ring or at least one atom selected from a halogen atom except for fluorine, a sulfur atom, a phosphorus atom and a nitrogen atom, or a monomer having a fluorene skeleton within the molecule, may also be selected.

Examples of the monomer having two or more ethylenically unsaturated groups include an ester of a polyhydric alcohol and a (meth)acrylic acid [e.g., ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate]; an ethylene oxide or caprolactone modified product of this ester; a vinylbenzene or a derivative thereof [e.g., 1,4-divinylbenzene, 2-acryloylethyl 4-vinylbenzoate, 1,4-divinylcyclohexanone]; a vinylsulfone (e.g., divinylsulfone); an acrylamide (e.g., methylenebisacrylamide); and a methacrylamide. These monomers may be used in combination of two or more thereof.

Specific examples of the high refractive index monomer include fluorene skeleton-containing (meth)acrylates, a bis(4-methacryloylthiophenyl)sulfide, a vinylnaphthalene, a vinylphenyl sulfide and a 4-methacryloxyphenyl-4'-methoxyphenylthioether. These monomer may also be used in combination of two or more thereof.

The polymerization of such a monomer having an ethylenically unsaturated group may be performed by the irradiation of ionizing radiation or under heat in the presence of a photoradical initiator or a thermal radical initiator.

Accordingly, the antiglare layer can be formed by preparing a coating solution containing a monomer for forming the light-transparent resin, such as ethylenically unsaturated monomer described above, a photoradical or thermal radical initiator, a light-transparent fine particle and if desired, an inorganic filler described later, applying the coating solution to a transparent support, and curing the coating film through a polymerization reaction by the effect of ionizing radiation or heat.

Examples of the photoradical polymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borates, active esters, active halogens, an inorganic complex and coumarins.

Examples of the acetophenones include 2,2-dimethoxyacetophenone, 2,2-diethoxyacetophenone, p-dimethylacetophenone, 1-hydroxydimethyl phenyl ketone, 1-hydroxydimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)-butanone, 4-phenoxydichloroacetophenone and 4-tert-butyldichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether.

Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone (Michler's ketone) and 3,3',4,4'-tetra(tert-butylperoxycarbonyl)benzophenone.

Examples of the phosphine oxides include 2,4,6-trimethylbenzoyldiphenylphosphine oxide.

Examples of the active esters include 1,2-octanedione, 1-[4-(phenylthio)-2-(O-benzoyloxime)], sulfonic acid esters and cyclic active ester compounds.

Examples of the onium salts include an aromatic diazonium salt, an aromatic iodonium salt and an aromatic sulfonium salt.

Examples of the borate include ion complexes with a cationic coloring matter.

As for the active halogens, an S-triazine compound and an oxathiazole compound are known, and examples thereof include 2-(p-methoxyphenyl)-4,6-bis(trichloromethyl)-s-triazine, 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl)-4,6-bis(trichloromethyl)-s-triazine and 2-trihalomethyl-5-(p-methoxyphenyl)-1,3,4-oxadiazole.

Examples of the inorganic complex include bis-($\eta^5$-2,4-cyclopentadien-1-yl)-bis(2,6-difluoro-3-(1H-pyrrol-1-yl)-phenyl)titanium.

Examples of the coumarins include 3-ketocoumarin.

One of these initiators may be used alone or a mixture thereof may be used.

Various examples are described in *Saishin UV Koka Gijutsu* (*Latest UV Curing Technologies*), page 159, Technical Information Institute Co., Ltd. (1991), and these are useful in the present invention.

Preferred examples of the commercially available photo-radical polymerization initiator of photo-cleavage type include Irgacure (e.g., 651, 184, 819, 907, 1870 (7/3 mixed initiator of CGI-403/Irg 184), 500, 369, 1173, 2959, 4265, 4263, OXE01) produced by Ciba Specialty Chemicals; Kayacure (e.g., DETX-S, BP-100, BDMK, CTX, BMS, 2-EAQ, ABQ, CPTX, EPD, ITX, QTX, BTC, MCA) produced by Nippon Kayaku Co., Ltd.; and Esacure (e.g., KIP100F, KB1, EB3, BP, X33, KT046, KT37, KIP150, TZT) produced by Sartomer Company Inc.

The photopolymerization initiator is preferably used in an amount of 0.1 to 15 parts by mass, more preferably from 1 to 10 parts by mass, per 100 parts by mass of the polyfunctional monomer.

In addition to the photopolymerization initiator, a photosensitizer may be used. Specific examples of the photosensitizer include n-butylamine, triethylamine, tri-n-butylphosphine, Michler's ketone and thioxanthone.

Furthermore, one or more auxiliary agent such as azide compound, thiourea compound and mercapto compound may be used in combination.

Examples of the commercially available photosensitizer include Kayacure (e.g., DMBI, EPA) produced by Nippon Kayaku Co., Ltd.

As for the thermal radical initiator, an organic or inorganic peroxide, an organic azo or diazo compound, or the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzenediazonium.

The polymer containing a polyether as the main chain is preferably a ring-opened polymer of a polyfunctional epoxy compound. The ring-opening polymerization of a polyfunctional epoxy compound may be performed by the irradiation of ionizing radiation or under heating in the presence of a photoacid generator or a thermal acid generator.

Accordingly, the light-diffusing layer can be formed by preparing a coating solution containing a polyfunctional epoxy compound, a photoacid or thermal acid generator, a light-transparent fine particle and an inorganic filler, coating the coating solution on a transparent support, and then curing it through a polymerization reaction by the effect of ionizing radiation or heat.

A crosslinked structure may be introduced into the binder polymer by using a crosslinking functional group-containing monomer in place of or in addition to the monomer having two or more ethylenically unsaturated groups to introduce the crosslinking functional group into the polymer, and reacting the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. In addition, a vinylsulfonic acid, an acid anhydride, a cyanoacrylate derivative, a melamine, an etherified methylol, an ester, a urethane, and a metal alkoxide (e.g., tetramethoxysilane) may also be utilized as the monomer for introducing a crosslinked structure. A functional group which exhibits a crosslinking property as a result of decomposition reaction, such as block isocyanate group, may also be used. That is, in the present invention, the crosslinking functional group may be a functional group which exhibits reactivity not directly but as a result of decomposition.

The binder polymer having such a crosslinking functional group can form a crosslinked structure under heating after coating.

In addition to the light-transparent fine particle, the antiglare layer may contain an inorganic filler comprising an oxide of at least one metal selected from silicon, titanium, zirconium, aluminum, indium, zinc, tin and antimony, and having an average particle diameter of 0.2 μm or less, preferably 0.1 μm or less, more preferably 0.06 μm or less, for adjusting the refractive index of the antiglare layer and thereby decreasing the haze value attributable to the internal scattering. Such an inorganic filler generally has a specific gravity higher than that of an organic material and can increase the density of the coating composition and therefore, there is provided an effect of decreasing the precipitation rate of the light-transparent fine particle.

The surface of the filler particle for use in the antiglare layer is preferably subjected to a silane coupling treatment or a titanium coupling treatment, and a surface treating agent having a functional group capable of reacting with the binder species on the filler surface is preferred.

In the case of using an inorganic filler, the amount added thereof is preferably from 10 to 90%, more preferably from 20 to 80%, still more preferably from 30 to 75%, based on the entire mass of the antiglare layer.

Incidentally, such an inorganic filler has a particle diameter sufficiently smaller than the wavelength of light and therefore, causes no scattering, and the dispersion obtained by dispersing this filler in the binder polymer behaves as an optically uniform substance.

Also, an organosilane compound may be used in the antiglare layer. The amount added of the organosilane compound is preferably from 0.001 to 50 mass %, more preferably from 0.01 to 20 mass %, still more preferably from 0.05 to 10 mass %, yet still more preferably from 0.1 to 5 mass %, based on the entire solid content of the layer containing the compound (layer to which the compound is added).

<Surfactant for Antiglare Layer>

In the antiglare layer of the present invention, either one or both of a fluorine-containing surfactant and a silicone-containing surfactant is(are) preferably added to the coating composition for the formation of a light-diffusing layer so as to ensure surface state uniformity such as coating unevenness, drying unevenness and point defect. In particular, a fluorine-containing surfactant is preferred because the effect of improving surface state failure of the antireflection film of the present invention, such as coating unevenness, drying unevenness and point defect, is brought out with a smaller amount added.

The surfactant is added for the purpose of increasing the productivity by imparting suitability for high-speed coating while enhancing the surface state uniformity.

Preferred examples of the fluorine-containing surfactant include a fluoroaliphatic group-containing copolymer (sometimes simply referred to as a "fluorine-based polymer"), and this fluorine-based polymer is preferably a fluoroaliphatic group-containing copolymer containing a repeating unit corresponding to the monomer of (i) below and a repeating unit corresponding to the monomer of (ii) below.

(i) Fluoroaliphatic group-containing monomer represented by the following formula x:

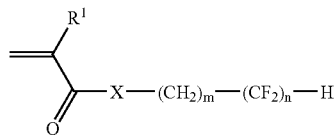

Formula x:

In formula x, $R^1$ represents a hydrogen atom or a methyl group, X represents an oxygen atom, a sulfur atom or —N($R^{12}$)—, m represents an integer of 1 to 6, and n represents an integer of 2 to 4. n is preferably 3. $R^{12}$ represents a hydrogen atom or an alkyl group having a carbon number of 1 to 4, specifically, a methyl group, an ethyl group, a propyl group or a butyl group. $R^{12}$ is preferably a hydrogen atom or a methyl group. X is preferably an oxygen atom.

(ii) Monomer represented by the following formula y, which is copolymerizable with monomer of (i)

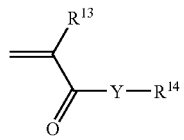

Formula y:

In formula y, $R^{13}$ represents a hydrogen atom or a methyl group, Y represents an oxygen atom, a sulfur atom or —N($R^{15}$)—, and $R^{15}$ represents a hydrogen atom or an alkyl group having a carbon number of 1 to 4, specifically, a methyl group, an ethyl group, a propyl group or a butyl group. Y is preferably an oxygen atom, —N(H)— or —N($CH_3$)—.

$R^{14}$ represents a linear, branched or cyclic alkyl group having a carbon number of 4 to 20, which may have a substituent. Examples of the substituent for the alkyl group of $R^{14}$ include, but are not limited to, a hydroxyl group, an alkylcarbonyl group, an arylcarbonyl group, a carboxyl group, an alkylether group, an arylether group, a halogen atom (e.g., fluorine, chlorine, bromine), a nitro group, a cyano group and an amino group. Suitable examples of the linear, branched or cyclic alkyl group having a carbon number of 4 to 20 include a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group and an eicosanyl group, which all may be linear or branched; a monocyclic cycloalkyl group such as cyclohexyl group and cycloheptyl group; and a polycyclic cycloalkyl group such as bicycloheptyl group, bicyclodecyl group, tricycloundecyl group, tetracyclododecyl group, adamantyl group, norbornyl group and tetracyclodecyl group.

In the fluorine-based polymer for use in the present invention, the fluoroaliphatic group-containing monomer represented by formula x is used in an amount of 10 mass % or more, preferably from 20 to 80 mass %, more preferably from 35 to 70 mass %, based on each monomer of the fluorine-based polymer.

The mass average molecular weight of the fluorine-based polymer for use in the present invention is preferably from 3,000 to 100,000, more preferably from 5,000 to 50,000, and most preferably from 8,000 to 30,000.

Furthermore, the amount added of the fluorine-based polymer for use in the present invention is preferably from 0.001 to 1 mass %, more preferably from 0.005 to 0.5 mass %, still more preferably from 0.01 to 0.25 mass %, based on the coating solution. If the amount of the fluorine-containing polymer added is less than 0.001 mass %, the effect is insufficient, whereas if it exceeds 1 mass %, drying of the coating film may not satisfactorily proceed or the performance (e.g., reflectance, scratch resistance) as the coating film may be adversely affected.

Specific structure examples of the fluorine-based polymer comprising the fluoroaliphatic group-containing monomer represented by formula x are set forth below, but the present invention is not limited thereto. The numerals in each formula represent a molar ratio of respective monomer components. Mw represents a mass average molecular weight.

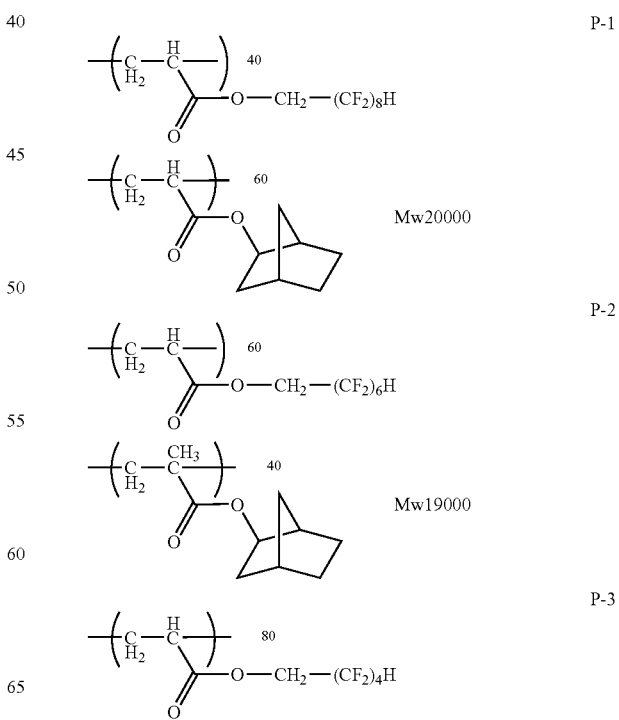

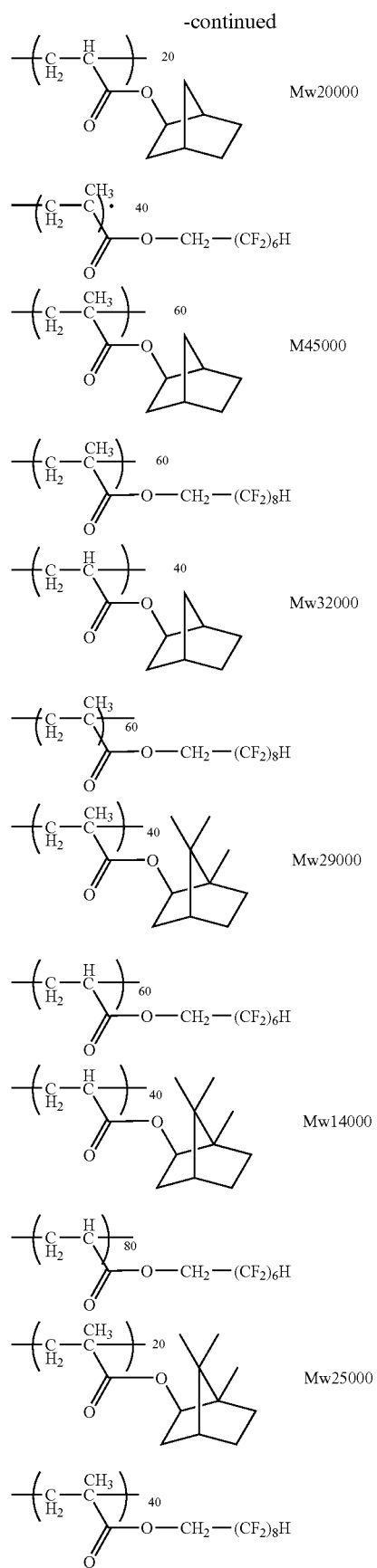
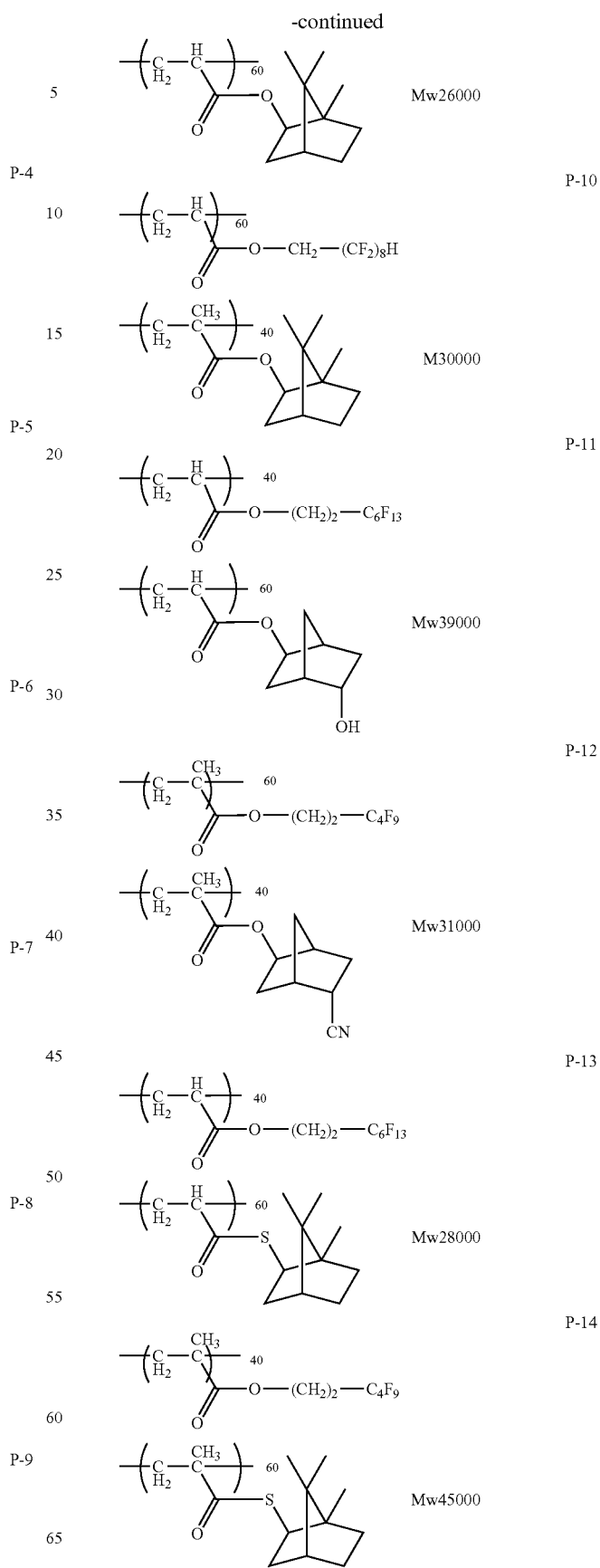

-continued
P-15
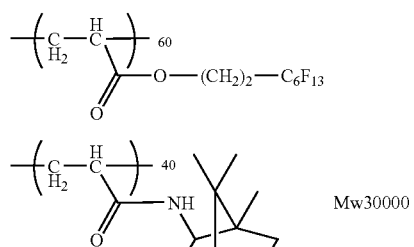 Mw30000
P-16
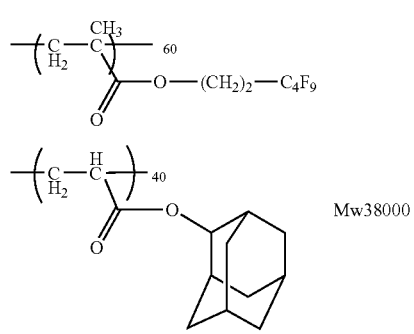 Mw38000
P-17
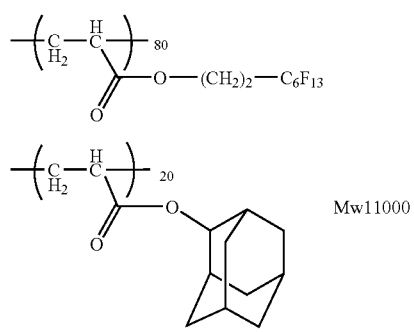 Mw11000
P-18
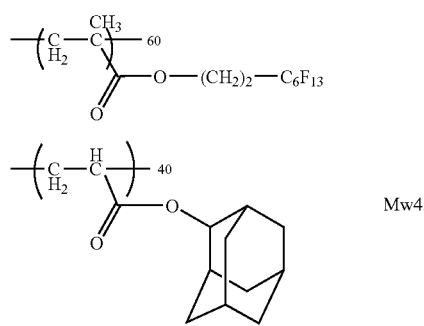 Mw45000
P-19
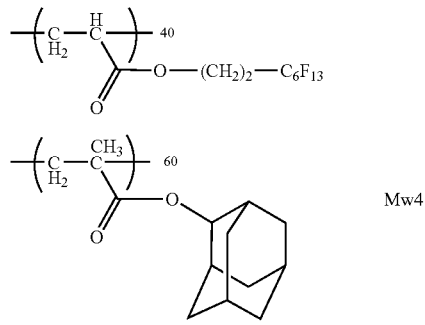 Mw46000
-continued
P-20
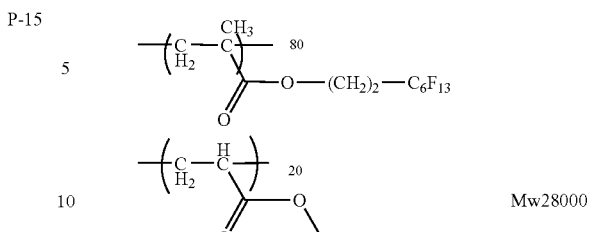 Mw28000
P-21
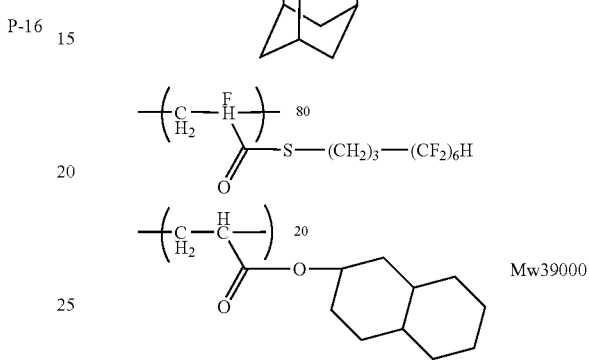 Mw39000
P-22
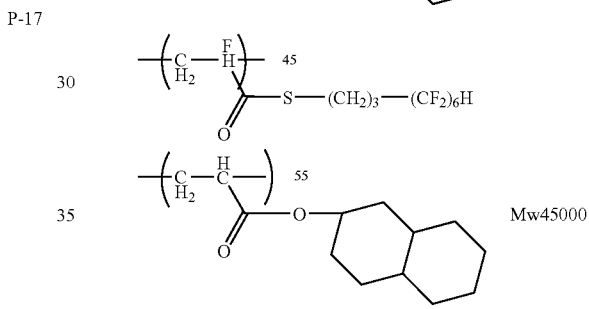 Mw45000
P-23
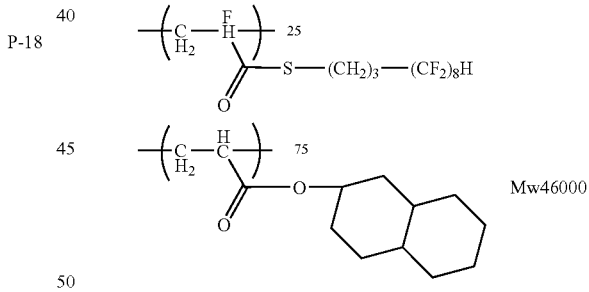 Mw46000
P-24
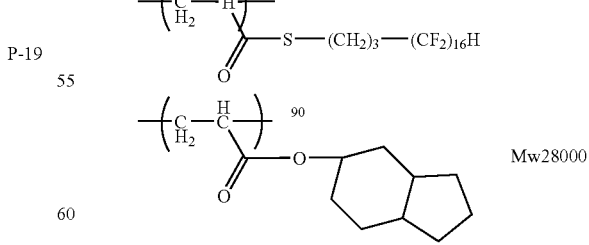 Mw28000
P-25
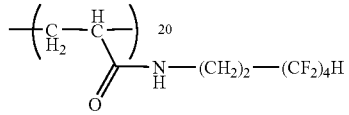

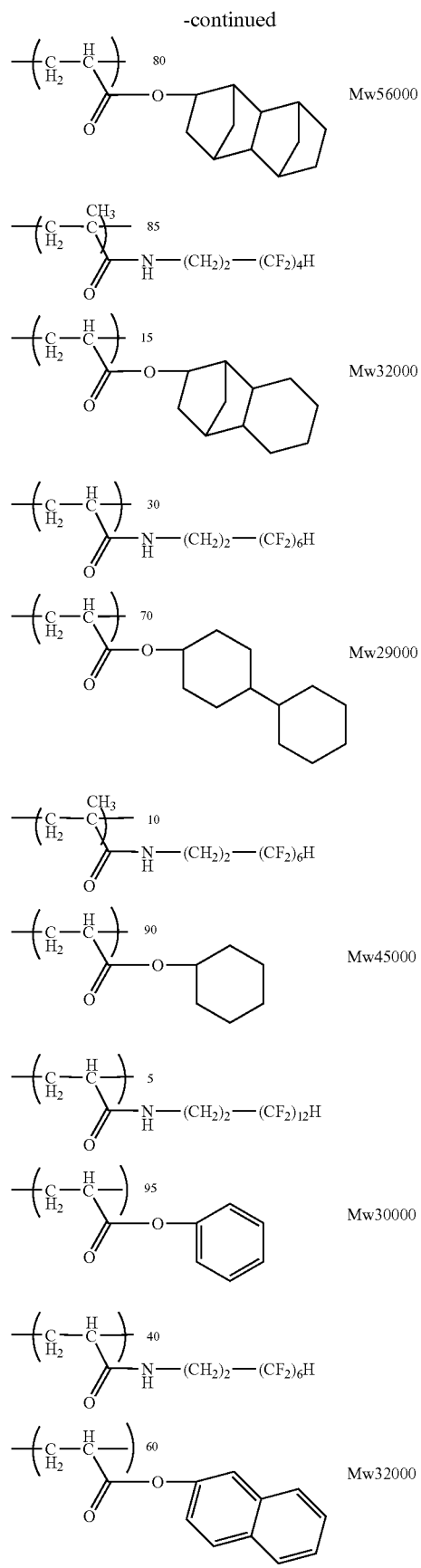
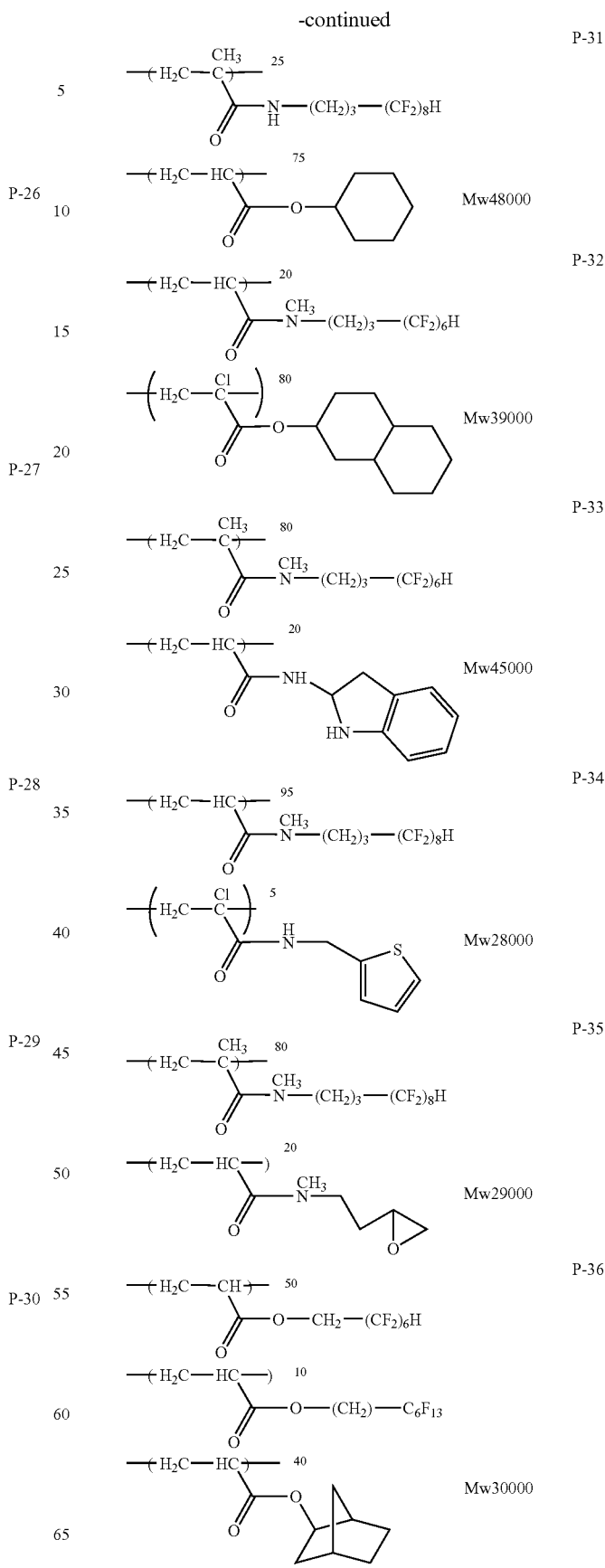

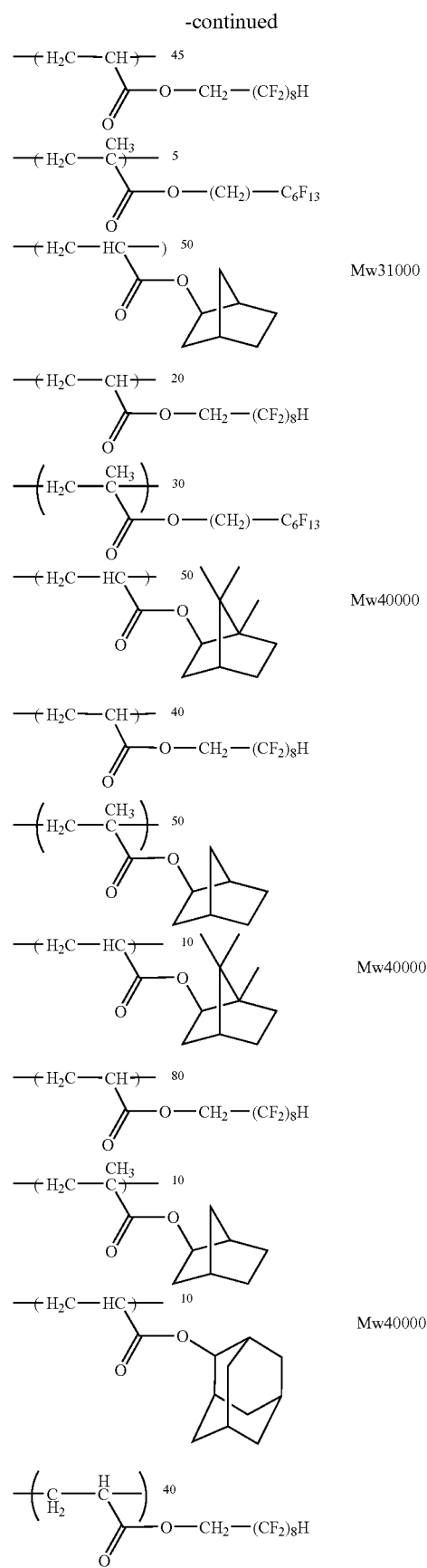
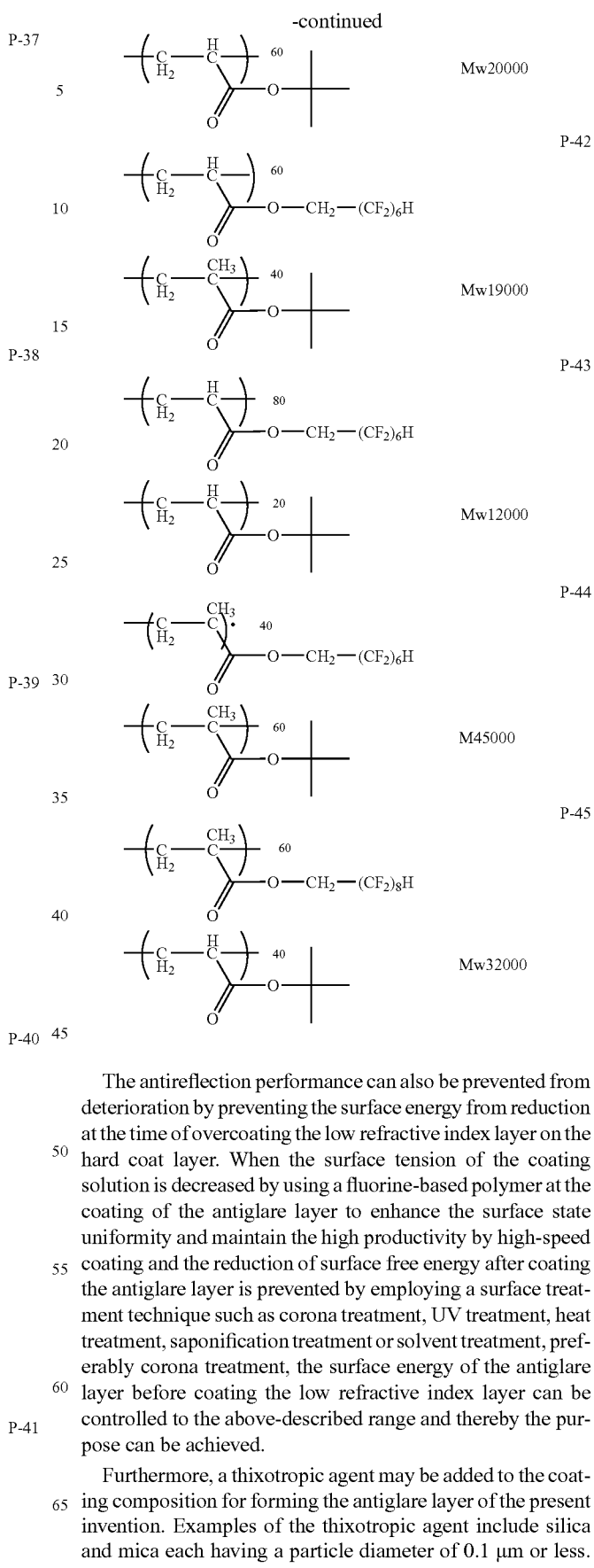

The antireflection performance can also be prevented from deterioration by preventing the surface energy from reduction at the time of overcoating the low refractive index layer on the hard coat layer. When the surface tension of the coating solution is decreased by using a fluorine-based polymer at the coating of the antiglare layer to enhance the surface state uniformity and maintain the high productivity by high-speed coating and the reduction of surface free energy after coating the antiglare layer is prevented by employing a surface treatment technique such as corona treatment, UV treatment, heat treatment, saponification treatment or solvent treatment, preferably corona treatment, the surface energy of the antiglare layer before coating the low refractive index layer can be controlled to the above-described range and thereby the purpose can be achieved.

Furthermore, a thixotropic agent may be added to the coating composition for forming the antiglare layer of the present invention. Examples of the thixotropic agent include silica and mica each having a particle diameter of 0.1 µm or less.

The suitable content of such an additive is usually on the order of 1 to 10 parts by mass per 100 parts by mass of the ultraviolet-curable resin.

The antiglare layer for use in the present invention is wet-coated directly on a transparent support in many cases and therefore, the solvent used for the coating composition is a particularly important factor. The properties required of the solvent are, for example, to satisfactorily dissolve various solutes such as light-transparent resin described above, not to dissolve the above-described light-transparent fine particle, to less generate coating unevenness and drying unevenness in the process from coating to drying, not to dissolve the support (this is necessary for preventing a trouble such as worsening of planarity or whitening) and at the same time, to swell the support to a minimum extent (this is necessary for ensuring adhesive property).

In the case of using a triacetyl cellulose for the support, specific preferred examples of the main solvent include various ketones (e.g., methyl ethyl ketone, acetone, methyl isobutyl ketone, cyclohexanone) and various cellosolves (e.g., ethyl cellosolve, butyl cellosolve, propylene glycol monomethyl ether). By adding a small amount of a solvent having a hydroxyl group based on the main solvent selected from the above, the antiglare property can be adjusted and this is particularly preferred. When the hydroxyl group-containing solvent added in a small amount remains later than the main solvent in the drying step of the coating composition, the antiglare property can be strengthened. Therefore, the vapor pressure of this solvent at a temperature of 20 to 30° C. is preferably lower than that of the main solvent. For example, a combination of methyl isobutyl ketone (vapor pressure at 21.7° C.: 16.5 mmHg) as the main solvent and propylene glycol (vapor pressure at 20.0° C.: 0.08 mmHg) as the hydroxyl group-containing solvent added in a small amount, is preferred. The mixing ratio of the main solvent to the hydroxyl group-containing solvent added in a small amount is, in terms of the weight ratio, preferably from 99:1 to 50:50, more preferably from 95:5 to 70:30. If the ratio exceeds 50:50, the stability of the coating solution or the surface quality in the drying step after coating greatly fluctuates and this is not preferred.

The low refractive index layer is described below.

<Low Refractive Index Layer>

The refractive index of the low refractive index layer in the antireflection film of the present invention is preferably from 1.35 to 1.48.

If the refractive index is less than 1.30, the antireflective function may be enhanced, but the mechanical strength of the film decreases, whereas if it exceeds 1.55, the antireflective performance seriously deteriorates.

Furthermore, in view of reducing the reflectance, the low refractive index layer preferably satisfies the following mathematical formula (I):

$$(m/4) \times 0.7 < n1 \times d1 < (m/4) \times 1.3 \quad \text{Mathematical formula (I):}$$

wherein m is a positive odd number, $n1$ is the refractive index of the low refractive index layer, $d1$ is the film thickness (nm) of the low refractive index layer, and $\lambda$ is the wavelength and is a value in the range of 500 to 550 nm.

Incidentally, when mathematical formula (I) is satisfied, this means that m (a positive odd number, usually 1) satisfying mathematical formula (I) is present within the above-described wavelength range.

The low refractive index layer includes, for example, a low refractive index layer formed by crosslinking of a fluorine-containing resin capable of undergoing crosslinking by the effect of heat or ionizing radiation (hereinafter sometimes referred to as a "fluorine-containining resin before crosslinking") (mode 1), a low refractive index layer formed by a sol-gel method (mode 2), and a low refractive index layer using a particle and a binder polymer and having a void between particles or inside a particle (mode 3).

The material for forming the low refractive index layer formed by crosslinking of a fluorine-containing resin capable of undergoing crosslinking by the effect of heat or ionizing radiation (hereinafter sometimes referred to as a "fluorine-containing resin before crosslinking") (mode 1) is described below.

The low refractive index layer is a cured film formed, for example, by coating a curable composition mainly comprising a fluorine-containing polymer, and drying and curing the coating.

<Fluorine-Containing Polymer for Low Refractive Index Layer>

The fluorine-containing polymer is preferably a polymer capable of giving, when cured, a film having a dynamic friction coefficient of 0.03 to 0.20, a contact angle with water of 90 to 120° and a pure water sliding angle of 70° or less, and undergoing crosslinking by the effect of heat or ionizing radiation, because the productivity is enhanced, for example, in the case of coating and curing the coating solution on a roll film while transporting the film as a web.

Also, in the case of applying the antireflection film of the present invention to an image display device, as the peel force with a commercially available adhesive tape is lower, a seal or a memo attached can be more easily peeled off. Therefore, the peel force is preferably 500 gf or less, more preferably 300 gf or less, and most preferably 100 gf of less. Furthermore, as the surface hardness measured by a microhardness tester is higher, the antireflection film is less scratched. Therefore, the surface hardness is preferably 0.3 GPa or more, more preferably 0.5 GPa or more.

The fluorine-containing polymer for use in the low refractive index layer preferably contains a fluorine atom at a proportion of 30 to 80 mass % and is preferably a fluorine-containing polymer containing a crosslinking or polymerizable functional group. Examples thereof include a hydrolysate or dehydration-condensate of a perfluoroalkyl group-containing silane compound [e.g., (heptadecafluoro-1,1,2,2-tetrahydrodecyl)triethoxysilane], and also include a fluorine-containing copolymer having a fluorine-containing monomer unit and a crosslinking reactivity unit as the constituent units. In other words, this polymer preferably does not contain an oxygen atom, a nitrogen atom or the like in the main chain skeleton.

Specific examples of the fluorine-containing monomer unit include fluoroolefins (e.g., fluoroethylene, vinylidene fluoride, tetrafluoroethylene, perfluorooctyl ethylene, hexafluoropropylene, perfluoro-2,2-dimethyl-1,3-dioxol), partially or completely fluorinated alkyl ester derivatives of (meth)acrylic acid (e.g., Biscote 6FM (produced by Osaka Organic Chemical Industry Ltd.), M-2020 (produced by Daikin Industries, Ltd.)), and completely or partially fluorinated vinyl ethers. Among these, perfluoroolefins are preferred and in view of refractive index, solubility, transparency, easy availability or the like, hexafluoropropylene is more preferred.

Examples of the crosslinking reactivity unit include a constituent unit obtained by the polymerization of a monomer previously having a self-crosslinking functional group within the molecule, such as glycidyl (meth)acrylate and glycidyl vinyl ether; and a constituent unit obtained by polymerizing a monomer having a carboxyl group, a hydroxy group, an amino group, a sulfo group or the like, such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid, to prepare a constituent unit and then introducing a crosslinking reactive group such as (meth)acryloyl group into the prepared constituent unit by a polymer reaction (the crosslinking reactive group can be introduced, for example, by causing an acrylic acid chloride to act on a hydroxy group).

In addition to the fluorine-containing monomer unit and the crosslinking reactivity unit, for example, in view of solubility in a solvent or transparency of the film, another polymerization unit may be introduced by copolymerizing an appropriate monomer not containing a fluorine atom. The monomer unit which can be used in combination is not particularly limited and examples thereof include olefins [e.g., ethylene, propylene, isoprene, vinyl chloride, vinylidene chloride], acrylic acid esters [e.g., methyl acrylate, methyl acrylate, ethyl acrylate, 2-ethylhexyl acrylate], methacrylic acid esters [e.g., methyl methacrylate, ethyl methacrylate, butyl methacrylate, ethylene glycol dimethacrylate], styrene derivatives [e.g., styrene, divinylbenzene, vinyltoluene, α-methylstyrene], vinyl ethers [e.g., methyl vinyl ether, ethyl vinyl ether, cyclohexyl vinyl ether], vinyl esters [e.g., vinyl acetate, vinyl propionate, vinyl cinnamate], acrylamides [e.g., N-tert-butylacrylamide, N-cyclohexylacrylamide], methacrylamides and acrylonitrile derivatives.

In combination with this fluorine-containing polymer, a curing agent may be appropriately used as described in JP-A-10-25388 and JP-A-10-147739.

The fluorine-containing polymer particularly useful in the present invention is a random copolymer of a perfluoroolefin and a vinyl ether or ester. In particular, the fluorine-containing polymer preferably has a group capable of undergoing a crosslinking reaction by itself [for example, a radical reactive group such as (meth)acryloyl group, or a ring-opening polymerizable group such as epoxy group and oxetanyl group].

The crosslinking reactive group-containing polymerization unit preferably occupies from 5 to 70 mol %, more preferably from 30 to 60 mol %, in all polymerization units of the polymer.

In a preferred embodiment, the fluorine-containing polymer for the low refractive index layer used in the present invention includes a copolymer represented by formula 1:

Formula 1:

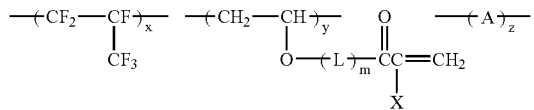

In formula 1, L represents a linking group having a carbon number of 1 to 10, preferably a linking group having a carbon number of 1 to 6, more preferably a linking group having a carbon number of 2 to 4, which may be linear or may have a branched or cyclic structure and which may have a heteroatom selected from O, N and S.

Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—**, *—$CH_2CH_2OCONH(CH_2)_3$—O—** (wherein * denotes a linking site on the polymer main chain side and ** denotes a linking site on the (meth)acryloyl group side). m represents 0 or 1.

In formula 1, X represents a hydrogen atom or a methyl group and in view of curing reactivity, preferably a hydrogen atom.

In formula 1, A represents a repeating unit derived from an arbitrary vinyl monomer. The repeating unit is not particularly limited as long as it is a constituent component of a monomer copolymerizable with hexafluoropropylene, and may be appropriately selected by taking account of various points such as adhesion to substrate, Tg of polymer (contributing to film hardness), solubility in solvent, transparency, slipperiness, dust protection and antifouling property. The repeating unit may comprise a single vinyl monomer or a plurality of vinyl monomers according to the purpose.

Preferred examples thereof include vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl (meth)acrylate, hydroxyethyl (meth) acrylate, glycidyl methacrylate, allyl (meth)acrylate and (meth)acryloyloxypropyltrimethoxysilane; styrene derivatives such as styrene and p-hydroxymethylstyrene; an unsaturated carboxylic acid such as crotonic acid, maleic acid and itaconic acid; and a derivative thereof. Among these, more preferred are a vinyl ether derivative and a vinyl ester derivative, still more preferred is a vinyl ether derivative.

x, y and z represent mol % of respective constituent components and preferably $30 \leq x \leq 60$, $5 \leq y \leq 70$ and $0 \leq z \leq 65$, more preferably $35 \leq x \leq 55$, $30 \leq y \leq 60$ and $0 \leq z \leq 20$, still more preferably $40 \leq x \leq 55$, $40 \leq y \leq 55$ and $0 \leq z \leq 10$, provided that x+y+z=100.

In a more preferred embodiment, the copolymer for use in the present invention includes a compound represented by formula 2:

Formula 2:

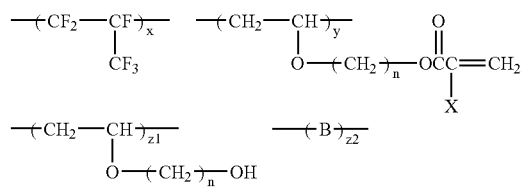

In formula 2, X has the same meaning as in formula 1 and the preferred range is also the same.

n represents an integer of $2 \leq n \leq 10$, preferably $2 \leq n \leq 6$, more preferably $2 \leq n \leq 4$.

B represents a repeating unit derived from an arbitrary vinyl monomer and may comprise a single composition or a plurality of compositions. Examples thereof include those described above as examples of A in formula 1.

x, y, z1 and z2 represent mol % of respective repeating units. x and y each preferably satisfies $30 \leq x \leq 60$ and $5 \leq y \leq 70$, more preferably $35 \leq x \leq 55$ and $30 \leq y \leq 60$, still more preferably $40 \leq x \leq 55$ and $40 \leq y \leq 55$. z1 and z2 each preferably satisfies $0 \leq z1 \leq 65$ and $0 \leq z2 \leq 65$, more preferably $0 \leq z1 \leq 30$ and $0 \leq z2 \leq 10$, still more preferably $0 \leq z1 \leq 10$ and $0 \leq z2 \leq 5$. Here, x+y+z1+z2=100.

The copolymer represented by formula 1 or 2 can be synthesized, for example, by introducing a (meth)acryloyl group into a copolymer comprising a hexafluoropropylene component and a hydroxyalkyl vinyl ether component by any one means described above. The solvent used here for precipitation is preferably isopropanol, hexane, methanol or the like.

Specific preferred examples of the copolymers represented by formulae 1 and 2 include those described in JP-A-2004-45462 (from [0035] to [0047]), and these copolymers may be synthesized by the methods described in this patent publication.

The curable composition preferably comprises (A) the above-described fluorine-containing polymer, (B) an inorganic fine particle and (C) an organosilane compound described later.

<Inorganic Fine Particle for Low Refractive Index Layer>

The blending amount of the inorganic fine particle is preferably from 1 to 100 mg/m$^2$, more preferably from 5 to 80 mg/m$^2$, still more preferably from 10 to 60 mg/m$^2$. If the blending amount is too small, the effect of improving the scratch resistance decreases, whereas if it is excessively large, fine irregularities are generated on the low refractive index layer surface and the appearance (e.g., real black) or the integrated reflectance may deteriorate. Therefore, the blending amount is preferably in the above-described range.

The inorganic fine particle is incorporated into the low refractive index layer and therefore, preferably has a low refractive index. Examples thereof include fine particles of magnesium fluoride and silica. Particularly, in view of refractive index, dispersion stability and cost, a silica fine particle is preferred.

The average particle diameter of the inorganic fine particle is preferably from 30 to 100%, more preferably from 35 to 80%, still more preferably from 40 to 60%, of the thickness of the low refractive index layer. In other words, when the thickness of the low refractive index layer is 100 nm, the particle diameter of the silica fine particle is preferably from 30 to 100 nm, more preferably from 35 to 80 nm, still more preferably from 40 to 60 nm.

If the particle diameter of the inorganic fine particle is too small, the effect of improving scratch resistance is reduced, whereas if the particle diameter is excessively large, fine irregularities are generated on the low refractive index layer surface and the appearance (e.g., real black) or the integrated reflectance may deteriorate. Therefore, the particle diameter is preferably in the above-described range. The inorganic fine particle may be crystalline or amorphous and may be a monodisperse particle or may be even an aggregated particle as long as the predetermined particle diameter is satisfied. The shape is most preferably spherical but even if amorphous, there arises no problem.

The average particle diameter of the inorganic fine particle is measured by a Coulter counter.

In order to more reduce the increase in refractive index of the low refractive index layer, the inorganic fine particle preferably has a hollow structure. Also, the refractive index of the inorganic fine particle is from 1.17 to 1.40, preferably from 1.17 to 1.35, more preferably 1.17 to 1.30. The refractive index used here indicates a refractive index of the particle as a whole and does not indicate a refractive index of only the outer shell mineral in the case of an inorganic fine particle having a hollow structure. At this time, assuming that the radius of the vacancy inside the particle is a and the radius of the outer shell of the particle is b, the porosity x represented by the following mathematical formula (II) is preferably from 10 to 60%, more preferably from 20 to 60%, and most preferably from 30 to 60%. Mathematical formula (II):

$$x=(4\pi a^3/3)/(4\pi b^3/3)\times 100$$

If the hollow inorganic fine particle is rendered to have a lower refractive index and a higher porosity, the thickness of the outer shell becomes small and the strength as a particle decreases. Therefore, in view of scratch resistance, a particle having a refractive index as low as less than 1.17 cannot be used.

Here, the refractive index of the inorganic fine particle was determined by the measurement using an Abbe's refractometer (manufactured by ATAGO K.K.).

Also, at least one kind of an inorganic fine particle having an average particle diameter of less than 25% of the thickness of the low refractive index layer (this particle is referred to as a "small-size inorganic fine particle") may be used in combination with the inorganic fine particle having a particle diameter in the preferred range described above (this particle is referred to as a "large-size inorganic fine particle").

The small-size inorganic fine particle can be present in a gap between large-size inorganic fine particles and therefore, can contribute as a holding agent for the large-size inorganic fine particle.

When the thickness of the low refractive index layer is 100 nm, the average particle diameter of the small-size inorganic fine particle is preferably from 1 to 20 μm, more preferably from 5 to 15 nm, still more preferably from 10 to 15 nm. Use of such an inorganic fine particle is preferred in view of the raw material cost and the holding agent effect.

As for this inorganic fine particle, an inorganic fine particle having an average particle diameter corresponding to 30 to 100% of the thickness of the low refractive index layer, having a hollow structure and having a refractive index of 1.17 to 1.40 is preferably used.

The inorganic fine particle may be subjected to a physical surface treatment such as plasma discharge treatment and corona discharge treatment, or a chemical surface treatment with a surfactant, a coupling agent or the like, so as to stabilize the dispersion in a liquid dispersion or a coating solution or to enhance the affinity for or the binding property with a binder component. Use of a coupling agent is particularly preferred. As for the coupling agent, an alkoxy metal compound (e.g., titanium coupling agent, silane coupling agent) is preferably used. Among these, a silane coupling treatment is more preferred.

The coupling agent is used as a surface treating agent for previously applying a surface treatment to the inorganic fine particle of the low refractive index layer before the coating solution for the layer is prepared, but the coupling agent is preferably further added as an additive at the preparation of the coating solution for the low refractive index layer and incorporated into the layer.

The inorganic fine particle is preferably dispersed in a medium in advance of the surface treatment so as to reduce the load of the surface treatment.

The organosilane compound (C) is described below.

<Organosilane Compound for Low Refractive Index Layer>

In view of scratch resistance, particularly from the standpoint of satisfying both the antireflection ability and the scratch resistance, a hydrolysate and/or a partial condensate of an organosilane compound (hereinafter, the obtained reaction solution is sometimes referred to as a "sol component") is preferably contained in the curable composition.

This sol component is condensed to form a cured product during drying and heating after the coating of the curable composition and thereby functions as a binder of the low refractive index layer. Furthermore, in the present invention, the curable composition contains the above-described fluorine-containing polymer and therefore, a binder having a three-dimensional structure is formed by the irradiation of actinic rays.

The organosilane compound is preferably represented by the following formula [A]:

$(R^{10})_m-Si(X)_{4-m}$  Formula [A]:

In formula [A], $R^{10}$ represents a substituted or unsubstituted alkyl group or a substituted or unsubstituted aryl group. Examples of the alkyl group include methyl, ethyl, propyl, isopropyl, hexyl, decyl and hexadecyl. The alkyl group is preferably an alkyl group having a carbon number of 1 to 30, more preferably from 1 to 16, still more preferably from 1 to 6. Examples of the aryl group include phenyl and naphthyl, with a phenyl group being preferred.

X represents a hydroxyl group or a hydrolyzable group, and examples thereof include an alkoxy group (preferably an alkoxy group having a carbon number of 1 to 5, e.g., methoxy, ethoxy), a halogen atom (e.g., Cl, Br, I) and a group represented by $R^2COO$ (wherein $R^2$ is preferably a hydrogen atom or an alkyl group having a carbon number of 1 to 5, e.g., $CH_3COO$, $C_2H_5COO$). X is preferably an alkoxy group, more preferably a methoxy group or an ethoxy group.

m represents an integer of 1 to 3, preferably 1 or 2, more preferably 1.

When a plurality of $R^{10}$'s or X's are present, multiple $R^{10}$'s or X's may be the same or different.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

When a plurality of $R^{10}$'s are present, at least one is preferably a substituted alkyl group or a substituted aryl group.

Among the organosilane compounds represented by formula [A], the organosilane compound having a vinyl polymerizable substituent represented by the following formula [B] is preferred.

Formula [B]:

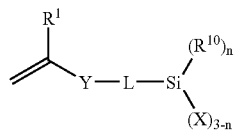

In formula [B], $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, *—COO—**, *—CONH—** or *—O—**, preferably a single bond, *—COO—** or *—CONH—**, more preferably a single bond or *—COO—**, still more preferably *—COO—**. * denotes the position bonded to $=C(R^1)$— and ** denotes the position bonded to L.

L represents a divalent linking chain. Specific examples thereof include a substituted or unsubstituted alkylene group, a substituted or unsubstituted arylene group, a substituted or unsubstituted alkylene group having inside a linking group (e.g., ether, ester, amido), and a substituted or unsubstituted arylene group having inside a linking group. L is preferably a substituted or unsubstituted alkylene group, a substituted or unsubstituted arylene group or an alkylene group having inside a linking group, more preferably an unsubstituted alkylene group, an unsubstituted arylene group or an alkylene group having inside an ether or ester linking group, still more preferably an unsubstituted alkylene group or an alkylene group having inside an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of X's are present, the plurality of X's may be the same or different. n is preferably 0.

$R^{10}$ has the same meaning as in formula [A] and is preferably a substituted or unsubstituted alkyl group or an unsubstituted aryl group, more preferably an unsubstituted alkyl group or an unsubstituted aryl group.

X has the same meaning as in formula [A] and is preferably a halogen atom, a hydroxyl group or an unsubstituted alkoxy group, more preferably a chlorine atom, a hydroxyl group or an unsubstituted alkoxy group having a carbon number of 1 to 6, still more preferably a hydroxyl group or an alkoxy having a carbon number of 1 to 3, and yet still more preferably a methoxy group.

The compounds represented by formulae [A] and [B] may be used in combination of two or more thereof. Specific examples of the compounds represented by formulae [A] and [B] are set forth below, but the present invention is not limited thereto.

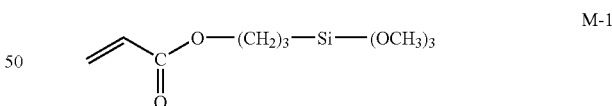

M-1

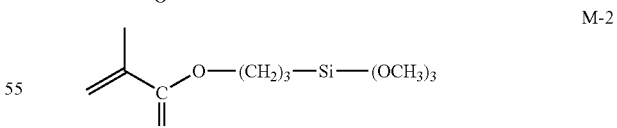

M-2

M-3

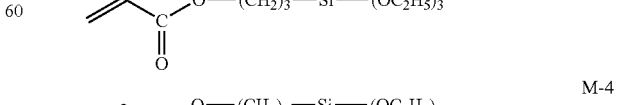

M-4

-continued

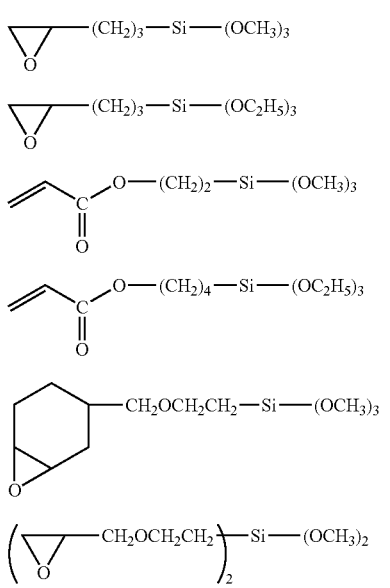

Among these compounds, (M-1), (M-2) and (M-5) are preferred.

The hydrolysate and/or partial condensate of the organosilane compound is generally produced by treating the above-described organosilane compound in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum and tetrabutoxyzirconium; and metal chelate compounds with the center metal being a metal such as Zr, Ti or Al. In the present invention, a metal chelate compound and an acid catalyst of inorganic acids or organic acids are preferred. As for the inorganic acid, a hydrochloric acid and a sulfuric acid are preferred, and as for the organic acid, an organic acid having an acid dissociation constant {pKa value (25° C.)} of 4.5 or less in water is preferred. In particular, a hydrochloric acid, a sulfuric acid and an organic acid having an acid dissociation constant of 3.0 or less in water are preferred, a hydrochloric acid, a sulfuric acid and an organic acid having an acid dissociation constant of 2.5 or less in water are more preferred, and an organic acid having an acid dissociation constant of 2.5 or less in water is still more preferred. Specifically, a methanesulfonic acid, an oxalic acid, a phthalic acid and a malonic acid are preferred, and an oxalic acid is more preferred.

As for the metal chelate compound, any metal chelate compound may be suitably used without particular limitation as long as an alcohol represented by the formula: $R^3OH$ (wherein $R^3$ represents an alkyl group having a carbon number of 1 to 10) and a compound represented by $R^4COCH_2COR^5$ (wherein $R^4$ represents an alkyl group having a carbon number of 1 to 10, and $R^5$ represents an alkyl group having a carbon number of 1 to 10 or an alkoxy group having a carbon number of 1 to 10) are present as ligands and the center metal is a metal selected from Zr, Ti and Al. Within this scope, two or more kinds of metal chelate compounds may be used in combination. The metal chelate compound for use in the present invention is preferably a compound selected from the group consisting of compounds represented by the formulae: $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$, and this compound acts to accelerate a condensation reaction of the hydrolysate and/or partial condensate of the organosilane compound.

In these metal chelate compounds, $R^3$ and $R^4$ may be the same or different and each represents an alkyl group having a carbon number of 1 to 10, such as ethyl group, n-propyl group, i-propyl group, n-butyl group, sec-butyl group, tert-butyl group, n-pentyl group or phenyl group. $R^5$ represents the same alkyl group having a carbon number of 1 to 10 as above or an alkoxy group having a carbon number of 1 to 10, such as methoxy group, ethoxy group, n-propoxy group, i-propoxy group, n-butoxy group, sec-butoxy group or tert-butoxy group. In the metal chelate compounds, p1, p2, q1, q2, r1 and r2 each represents an integer determined to satisfy the relationships of $p1+p2=4$, $q1+q2=4$ and $r1+r2=3$.

Specific examples of the metal chelate compound include a zirconium chelate compound such as zirconium tri-n-butoxyethylacetoacetate, zirconium di-n-butoxy-bis-(ethylacetoacetate), zirconium n-butoxy-tris(ethylacetoacetate), zirconium tetrakis(n-propylacetoacetate), zirconium tetrakis (acetylacetoacetate) and zirconium tetrakis (ethylacetoacetate); a titanium chelate compound such as titanium diisopropoxy.bis(ethylacetoacetate), titanium diisopropoxy.bis(acetylacetate) and titanium diisopropoxy.bis (acetylacetone); and an aluminum chelate compound such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris (acetylacetonate) and aluminum monoacetylacetonato.bis (ethylacetoacetate).

Among these metal chelate compounds, preferred are zirconium tri-n-butoxyethylacetoacetate, titanium diisopropoxybis(acetylacetonate), aluminum diisopropoxyethylacetoacetate and aluminum tris(ethylacetoacetate). One of these meal chelate compounds may be used alone, or two or more thereof may be used as a mixture. A partial hydrolysate of such a metal chelate compound may also be used.

In the present invention, a β-diketone compound and/or a β-ketoester compound is preferably further added to the curable composition. This is described below.

The compound used in the present invention is a β-diketone compound and/or β-ketoester compound represented by the formula: $R^4COCH_2COR^5$, and this compound functions as a stability enhancer for the curable composition used in the present invention. $R^4$ represents an alkyl group having a carbon number of 1 to 10, and $R^5$ represents an alkyl group having a carbon number of 1 to 10 or an alkoxy group having a carbon number of 1 to 10. That is, this compound is considered to coordinate to a metal atom in the metal chelate compound (zirconium, titanium and/or aluminum compound) and inhibit the metal chelate compound from exerting the activity of accelerating the condensation reaction of the hydrolysate and/or partial condensate of the organosilane compound, thereby improving the storage stability of the composition obtained. $R^4$ and $R^5$ constituting the β-diketone compound and/or β-ketoester compound have the same meanings as $R^4$ and $R^5$ constituting the metal chelate compound.

Specific examples of the β-diketone compound and/or β-ketoester compound include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexane-dione, 2,4-heptane-dione, 3,5-heptane-dione, 2,4-octane-dione, 2,4-nonane-dione and 5-methyl-hexane-dione. Among these, ethyl acetoacetate and acetylacetone are preferred, and acetylacetone is more preferred. One of these β-diketone compounds and/or β-ketoester compounds may be used alone, or two or more thereof may be used as a mixture. In the present invention, the β-diketone compound and/or β-ketoester compound is preferably used in an amount of 2 mol or more, more preferably from 3 to 20 mol, per mol of the metal chelate compound. If the amount added is less than 2 mol, the composition obtained may have poor storage stability and this is not preferred.

The blending amount of the organosilane compound is preferably from 0.1 to 50 mass %, more preferably from 0.5 to 20 mass %, and most preferably from 1 to 10 mass %, based on the entire solid content of the low refractive index layer.

The organosilane compound may be added directly to the curable composition (coating solution for antiglare layer, low refractive index layer or the like), but it is preferred to first prepare a hydrolysate and/or a partial condensate of the organosilane compound by previously treating the organosilane compound in the presence of a catalyst, and then prepare the curable composition by using the obtained reaction solution (sol solution. In the present invention, it is preferred to first prepare a composition containing a hydrolysate and/or a partial condensate of the organosilane compound and a metal chelate compound, add a β-diketone compound and/or β-ketoester compound thereto, incorporate the resulting solution into a coating solution for at least one layer of the antiglare layer and the low refractive index layer, and coat the coating solution.

The amount of the sol component of organosilane used in the low refractive index layer is preferably from 5 to 100 mass %, more preferably from 5 to 40 mass %, still more preferably from 8 to 35 mass %, yet still more preferably from 10 to 30 mass %, based on the fluorine-containing polymer. If the amount used is small, the effect of the present invention can be hardly obtained, whereas if it is too large, the refractive index may be increased or the profile or surface state of the film may deteriorate and this is not preferred.

In the curable composition, an inorganic filler except for the above-described inorganic fine particle may also be added in an amount within the range of not impairing the desired effect of the present invention. The inorganic filler is described in detail later.

[Other Substances Contained in Curable Composition for Low Refractive Index Layer]

The curable composition is produced by adding various additives, if desired, and a radical polymerization initiator or a cationic polymerization initiator to the above-described fluorine-containing polymer (A), inorganic fine particle (B) and organosilane compound (C), and dissolving these in an appropriate solvent. At this time, the solid content concentration is appropriately selected according to usage but is generally on the order of 0.01 to 60 mass %, preferably from 0.5 to 50 mass %, more preferably from 1 to 20 mass %.

In the light of interface adhesion to a layer formed to come into, a curing agent such as polyfunctional (meth)acrylate compound, polyfunctional epoxy compound, polyisocyanate compound, aminoplast, polybasic acid or anhydrate thereof may also be added in a small amount. In the case of adding such a curing agent, the amount added thereof is preferably 30 mass % or less, more preferably 20 mass % or less, still more preferably 10 mass % or less, based on the entire solid content of the low refractive index layer film.

For the purpose of imparting properties such as antifouling property, water resistance, chemical resistance and slipperiness, a known silicon-based or fluorine-based compound or the like may be appropriately added as an antifouling agent, a slipping agent or the like. In the case of adding such an additive, the additive is preferably added in an amount of 0.01 to 20 mass %, more preferably from 0.05 to 10 mass %, still more preferably from 0.1 to 5 mass %, based on the entire solid content of the low refractive index layer.

Preferred examples of the silicone-based compound include a compound containing a plurality of dimethylsilyloxy units as the repeating unit and having a substituent at the chain terminal and/or on the side chain. In the chain of the compound containing dimethylsilyloxy as the repeating unit, a structural unit other than dimethylsilyloxy may be contained. A plurality of substituents, which may be the same or different, are preferably present. Preferred examples of the substituent include a group containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. The molecular weight is not particularly limited but is preferably 100,000 or less, more preferably 50,000 or less, and most preferably from 3,000 to 30,000. The silicone atom content of the silicone-based compound is not particularly limited but is preferably 18.0 mass % or more, more preferably from 25.0 to 37.8 mass %, and most preferably from 30.0 to 37.0 mass %. Preferred examples of the silicone-based compound include, but are not limited to, X-22-174DX, X-22-2426, X-22-164B, X22-164C, X-22-170DX, X-22-176D and X-22-1821 (all trade names) produced by Shin-Etsu Chemical Co., Ltd.; FM-0725, FM-7725, FM-4421, FM-5521, FM6621 and FM-1121 (all trade names) produced by Chisso Corporation; and DMS-U22, RMS-033, RMS-083, UMS-182, DMS-H21, DMS-H31, HMS-301, FMS121, FMS123, FMS131, FMS141 and FMS221 (all trade names), produced by Gelest.

The fluorine-based compound is preferably a compound having a fluoroalkyl group. The fluoroalkyl group preferably has a carbon number of 1 to 20, more preferably from 1 to 10, and may be linear (e.g., —$CF_2CF_3$, —$CH_2(CF_2)_4H$, —$CH_2(CF_2)_8CF_3$, —$CH_2CH_2(CF_2)_4H$), may have a branched structure (e.g., —$CH(CF_3)_2$, —$CH_2CF(CF_3)_2$, —$CH(CH_3)CF_2CF_3$, —$CH(CH_3)(CF_2)_5CF_2H$) or an alicyclic structure (preferably a 5- or 6-membered ring, for example, a perfluorocyclohexyl group, a perfluorocyclopentyl group or an alkyl group substituted with such a group), or may have an ether bond (e.g., —$CH_2OCH_2CF_2CF_3$, —$CH_2CH_2OCH_2C_4F_8H$, —$CH_2CH_2OCH_2CH_2C_8F_{17}$, —$CH_2CH_2OCF_2CF_2OCF_2CF_2H$). A plurality of the fluoroalkyl groups may be contained within the same molecule.

The fluorine-based compound preferably further has a substituent which contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-based compound may be a polymer or an oligomer with a compound not containing a fluorine atom, and the molecular weight is not particularly limited. The fluorine atom content of the fluorine-based compound is not particularly limited but is preferably 20 mass % or more, more preferably from 30 to 70 mass %, and most preferably from 40 to 70 mass %. Preferred examples of the fluorine-based compound include, but are not limited to, R-2020, M-2020, R-3833 and M-3833 (all trade names) produced by Daikin Kogyo Co., Ltd.; and Megafac F-171, F-172, F-179A and DYFENSA MCF-300 (all trade names) produced by Dai-Nippon Ink & Chemicals, Inc.

For the purpose of imparting properties such as dust protection and antistatic property, a known cationic surfactant or polyoxyalkylene-based compound may be appropriately added as a dust inhibitor, an antistatic agent or the like. A structural unit of such a dust inhibitor or antistatic agent may be contained as a part of the function in the above-described silicone-based compound or fluorine-based compound. In the case of adding such an additive, the additive is preferably added in an amount of 0.01 to 20 mass %, more preferably from 0.05 to 10 mass %, still more preferably from 0.1 to 5 mass %, based on the entire solid content of the lower refractive index layer. Preferred examples of the compound include, but are not limited to, Megafac F-150 (trade name) produced by Dai-Nippon Ink & Chemicals, Inc.; and SH-3748 (trade name) produced by Toray Dow Corning.

[Solvent for Low Refractive Index Layer]

As for the solvent used in the coating composition for forming the low refractive index layer of the present invention, various solvents selected by taking account, for example, whether the solvent can dissolve or disperse each component, can easily provide a uniform surface state in the coating or drying step, can ensure liquid storability or has an appropriate saturated vapor pressure, may be used. In view of drying load, the solvent preferably comprises a solvent having a boiling point of 100° C. or less at room temperature under atmospheric pressure as the main component and for the adjustment of the drying rate, contains a slight amount of a solvent having a boiling point of 100° C. or more.

Examples of the solvent having a boiling point of 100° C. or less include hydrocarbons such as hexane (boiling point: 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (the same as methyl ethyl ketone, 79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); and carbon disulfide (46.2° C.). Among these, ketones and esters are preferred, and ketones are more preferred. Out of ketones, 2-butanone is particularly preferred.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (the same as MIBK, 115.9° C.), 1-butanol (117.7° C.), N,N-dimethylformamide (153° C.), N,N-dimethylacetamide (166° C.) and dimethyl sulfoxide (189° C.). Among these, cyclohexanone and 2-methyl-4-pentanone are preferred.

The low refractive index layer by a sol-gel method (mode 2) is described below.

Various sol-gel materials can also be used as the material for the low refractive index layer. As for such a sol-gel material, a metal alcoholate (an alcoholate of silane, titanium, aluminum, zirconium or the like), an organoalkoxy metal compound, and a hydrolysate thereof may be used. In particular, an alkoxysilane, an organoalkoxysilane, and a hydrolysate thereof are preferred. Examples thereof include a tetraalkoxysilane (e.g., tetramethoxysilane, tetraethoxysilane), an alkyltrialkoxysilane (e.g., methyltrimethoxysilane, ethyltrimethoxysilane), an aryltrialkoxysilane (e.g., phenyltrimethoxysilane), a dialkyldialkoxysilane and a diaryldialkoxysilane. In addition, an alkoxysilane having various functional groups (e.g., vinyltrialkoxysilane, methylvinylalkoxysilane, γ-glycidyloxypropyltrialkoxysilane, γ-glycidyloxypropylmethyldialkoxysilane, β-(3,4-epoxydicyclohexyl)ethyltrialkoxysilane, γ-methacryloyloxypropyltrialkoxysilane, γ-aminopropyltrialkoxysilane, γ-mercaptopropyltrialkoxysilane, γ-chloropropyltrialkoxysilane), and a perfluoroalkyl group-containing compound (e.g., (heptadecafluoro-1,1,2,2-tetradecyl)triethoxysilane, 3,3,3-trifluoropropyltrimethoxysilane) are also preferably used. Particularly, use of a fluorine-containing silane compound is preferred from the standpoint of reducing the refractive index of the layer and imparting water-repellent oil-repellent property.

A layer where an inorganic or organic fine particle is used and a microvoid is formed between fine particles or inside the fine particle is also preferred as the low refractive layer. The average particle diameter of the fine particle is preferably from 0.5 to 200 mm, more preferably from 1 to 100 nm, still more preferably from 3 to 70 nm, and most preferably from 5 to 40 nm. The particle diameter of the fine particle is preferably as uniform. (monodisperse) as possible.

The inorganic fine particle is preferably amorphous and preferably comprises an oxide, nitride, sulfide or halide of a metal, more preferably a metal oxide or a metal halide, and most preferably a metal oxide or a metal fluoride. The metal atom is preferably Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb or Ni, more preferably Mg, Ca, B or Si. An inorganic compound containing two kinds of metals may also be used. In particular, the inorganic compound is preferably silicon dioxide, that is, silica.

The microvoid inside the inorganic fine particle can be formed, for example, by crosslinking the molecules of silica forming the particle. When the molecules of silica are crosslinked, the volume is reduced and the particle becomes porous. The microvoid-containing (porous) inorganic fine particle can be directly synthesized as a dispersion by a sol-gel method (see, JP-A-53-112732 and JP-B-57-9051 (the term "JP-B" as used herein means an "examined Japanese patent publication")) or a precipitation method (see, *Applied Optics*, 27, page 3356 (1988)).

Also, the dispersion may be obtained by mechanically grinding a powder prepared by a drying-precipitation method. A commercially available porous inorganic fine particle (e.g. silicon dioxide sol) may also be employed. The inorganic fine particle having a microvoid is preferably used as a dispersion in an appropriate medium for forming the low refractive index layer. The dispersion medium is preferably water, an alcohol (e.g., methanol, ethanol, isopropanol) or a ketone (e.g., methyl ethyl ketone, methyl isobutyl ketone).

The organic fine particle is also preferably amorphous. The organic fine particle is preferably a polymer fine particle synthesized by a polymerization reaction (e.g., emulsion polymerization) of a monomer. The polymer as the organic fine polymer preferably contains a fluorine atom, and the proportion of the fluorine atom in the polymer is preferably 35 to 80 mass %, more preferably from 45 to 75 mass %. It is also preferred to form a microvoid inside the organic fine particle, for example, by crosslinking polymers constituting the particle, thereby reducing the volume.

In order to crosslink polymers constituting the particle, 20 mol % or more of the monomer for synthesizing the polymer is preferably a polyfunctional monomer. The proportion of the polyfunctional monomer is more preferably from 30 to 80 mol %, and most preferably from 35 to 50 mol %. As for the monomer used for the synthesis of the organic fine particle, examples of the fluorine atom-containing monomer used for synthesizing a fluorine-containing polymer include fluoroolefins (e.g., fluoroethylene, vinylidene fluoride, tetrafluoroethylene, hexafluoropropylene, perfluoro-2,2-dimethyl-1, 3-dioxole), and fluorinated alkyl esters and fluorinated vinyl ethers of an acrylic acid or a methacrylic acid. A copolymer of a fluorine atom-containing monomer and a monomer containing no fluorine atom may also be used. Examples of the monomer containing no fluorine atom include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate), styrenes (e.g., styrene, vinyltoluene, α-methylstyrene), vinyl ethers (e.g., methylvinyl ether), vinyl esters (e.g., vinyl acetate, vinyl propionate), acrylamides (e.g., N-tert-butylacrylamide, N-cyclohexylacrylamide), methacrylamides and acrylonitriles. Examples of the polyfunctional monomer include dienes (e.g., butadiene, pentadiene), an esters of polyhydric alcohol and an acrylic acid (e.g., ethylene glycol diacrylate, 1,4-cyclohexane diacrylate, dipentaerythritol hexaacrylate), an ester of a polyhydric alcohol and a methacrylic acid (e.g., ethylene glycol dimethacrylate, 1,2,4-cyclohexane tetramethacrylate, pentaerythritol tetramethacrylate), a divinyl compound (e.g., divinylcyclohexane, 1,4-divinylbenzene), a divinyl sulfone, bisacrylamides (e.g., methylenebisacrylamide) and bismethacrylamides.

The microvoid between particles can be formed by piling at least two fine particles. Incidentally, when (completely monodisperse) spherical fine particles having the same particle diameter are filled at a high density, a microvoid between fine particles is formed to yield a porosity of 26 vol %. When spherical fine particles having the same particle diameter are filled in a simple cubic manner, a microvoid between fine particles is formed to yield a porosity of 48 vol %. In the actual low refractive index layer, since the particle diameter of the fine particle has a distribution and a microvoid inside the particle is present, the porosity fairly fluctuated from these theoretical values. When the porosity is increased, the refractive index of the low refractive index layer decreases. When a microvoid is formed by piling up fine particles, the size of the microvoid between particles can also be easily adjusted to an appropriate value (causing neither light scattering nor a problem in the strength of the low refractive index layer) by adjusting the particle diameter of the fine particle. Furthermore, by equalizing the particle diameter of the fine particle, an optically uniform low refractive index layer uniformized in the size of the microvoid between particles can be obtained, as a result, the low refractive index layer can be microscopically a microvoid-containing porous film but optically or macroscopically a uniform film. The microvoid between particles is preferably closed with a fine particle or a polymer in the low refractive index layer. As compared with a void opened to the low refractive index layer surface, the closed void is advantageous in that light scattering less occurs on the low refractive index layer surface.

By virtue of forming a microvoid, the macroscopic refractive index of the low refractive index layer becomes lower than the sum of refractive indices of the components constituting the low refractive index layer. The refractive index of the layer becomes the sum of refractive indices per volume of the constituent elements of the layer. The refractive index value of the constituent component of the low refractive index layer, such as fine particle and polymer, is larger than 1, whereas the refractive index of air is 1.00. Therefore, a low refractive index layer having a very low refractive index can be obtained by forming a microvoid.

The low refractive index layer preferably contains from 5 to 50 mass % of a polymer. The polymer has a function of bonding fine particles together and maintaining the void-containing structure of the low refractive index layer. The amount of the polymer used is adjusted so that the strength of the low refractive index layer can be maintained without allowing for filling of the void. The amount of the polymer is preferably from 10 to 30 wt % based on the entire weight of the low refractive index layer. For bonding fine particles with a polymer, it is preferred (1) to bind a polymer to a surface treating agent for the fine particle, (2) to use the fine particle as a core and form a polymer shell in the periphery thereof, or (3) to use a polymer as the binder between fine particles. The polymer bound to the surface treating agent of (1) is preferably a shell polymer of (2) or a binder polymer of (3). The polymer of (2) is preferably formed in the periphery of the fine particle by a polymerization reaction before preparing the coating solution of the low refractive index layer. The polymer (3) is preferably formed by adding a monomer to the coating solution of the low refractive index layer and causing a polymerization reaction at the same with or after the coating of the low refractive index layer. Preferably, two or all of (1) to (3) are performed in combination. A combination of (1) and (3) and a combination of all of (1) to (3) are preferred. The surface treatment (1), shell (2) and binder (3) are described in sequence below.

(1) Surface Treatment

The fine particle (particularly, inorganic fine particle) is preferably subjected to a surface treatment to improve the affinity for the polymer. The surface treatment can be classified into a physical surface treatment such as plasma discharge treatment and corona discharge treatment, and a chemical surface treatment using a coupling agent. The surface treatment is preferably performed only by a chemical surface treatment or by a combination of a physical surface treatment and a chemical surface treatment. As for the coupling agent, an organoalkoxy metal compound (e.g., titanium coupling agent, silane coupling agent) is preferably used. In the case where the fine particle comprises silicon dioxide, surface treatment with a silane coupling treatment is particularly effective. Specific examples of the silane coupling agent include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane and β-cyanoethyltriethoxysilane.

Examples of the silane coupling agent having an alkyl group disubstituted with respect to silicon include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyl-diacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane and methylvinyldiethoxysilane.

Among these, preferred are those having a double bond within the molecule, such as vinyltrimethoxysilane, vinyltriethoxysilane, vinyltriacetoxysilane, vinyltrimethoxyethoxysilane, γ-acryloyloxypropyltrimethoxysilane and γ-methacryloyloxypropyltrimethoxysilane, and those having a alkyl group disubstituted with respect to silicon, such as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane and methylvinyldiethoxysilane, and more preferred are γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane and γ-methacryloyloxypropylmethyldiethoxysilane.

Two or more kinds of coupling agents may be used in combination. In addition to the silane coupling agent described above, another silane coupling agent may also be used. Examples of another silane coupling agent include an alkyl ester of orthosilicic acid (e.g., methyl orthosilicate, ethyl orthosilicate, n-propyl orthosilicate, i-propyl orthosilicate, n-butyl orthosilicate, sec-butyl orthosilicate, tert-butyl orthosilicate) and a hydrolysate thereof. The surface treatment with a coupling agent may be performed by adding the coupling agent to a dispersion of the fine particle, and leaving the dispersion to stand at a temperature from room temperature to 60° C. for several hours to 10 days. In order to accelerate the surface treatment reaction, an inorganic acid (e.g., sulfuric acid, hydrochloric acid, nitric acid, chromic acid, hypochlorous acid, boric acid, orthosilicic acid, phosphoric acid, carbonic acid), an organic acid (e.g., acetic acid, polyacrylic acid, benzenesulfonic acid, phenol, polyglutamic acid), or a salt thereof (e.g., metal salt, ammonium salt) may be added to the dispersion.

(2) Shell

The polymer forming the shell is preferably a polymer having a saturated hydrocarbon as the main chain. A polymer containing a fluorine atom in the main or side chain is preferred, and a polymer containing a fluorine atom in the side chain is more preferred. A polyacrylic acid ester or a polymethacrylic acid ester is preferred, and an ester of a fluorine-substituted alcohol and a polyacrylic or polymethacrylic acid ester is most preferred. The refractive index of the shell polymer decreases along with the increase of the fluorine atom content in the polymer. In order to decrease the refractive index of the low refractive index layer, the shell polymer preferably contains from 35 to 80 wt %, more preferably from 45 to 75 wt % of a fluorine atom. The fluorine atom-containing polymer is preferably synthesized by a polymerization reaction of an ethylenically unsaturated monomer containing a fluorine atom. Examples of the ethylenically unsaturated monomer containing a fluorine atom include a fluoroolefin (e.g., fluoroethylene, vinylidene fluoride, tetrafluoroethylene, hexafluoropropylene, perfluoro-2,2-dimethyl-1,3-dioxol), a fluorinated vinyl ether and an ester of a fluorine-substituted alcohol and an acrylic or methacrylic acid.

The polymer forming the shell may be a copolymer comprising a repeating unit containing a fluorine atom and a repeating group containing no fluorine atom. The repeating unit containing no fluorine atom is preferably obtained by a polymerization reaction of an ethylenically unsaturated monomer containing no fluorine atom. Examples of the ethylenically unsaturated monomer containing no fluorine atom include an olefin (e.g., ethylene, propylene, isoprene, vinyl chloride, vinylidene chloride), an acrylic acid ester (e.g., methyl acrylate, ethyl acrylate, 2-ethylhexyl acrylate), a methacrylic acid ester (e.g., methyl methacrylate, ethyl methacrylate, butyl methacrylate, ethylene glycol dimethacrylate), a styrene and a derivative thereof (e.g., styrene, divinylbenzene, vinyltoluene, α-methylstyrene), a vinyl ether (e.g., methyl vinyl ether), a vinyl ester (e.g., vinyl acetate, vinyl propionate, vinyl cinnamate), an acrylamide (e.g., N-tert-butylacrylamide, N-cyclohexylacrylamide), a methacrylamide and an acrylonitrile.

In the case where the binder polymer of (3) described later is used in combination, the shell polymer may be chemically bonded to the binder polymer through crosslinking by incorporating a crosslinking functional group into the shell polymer. The shell polymer may have crystallinity. When the glass transition temperature (Tg) of the shell polymer is higher than the temperature at the formation of the low refractive index layer, it is easy to maintain the microvoid in the low refractive index layer. However, if Tg is higher than the temperature at the formation of the low refractive index layer, the fine particles may not be fused together and the low refractive index layer may not be formed as a continuous layer (as a result, the strength decreases). In this case, the binder polymer of (3) described later is preferably used in combination, so that the low refractive index layer can be formed as a continuous layer by virtue of the binder polymer. A polymer shell is formed in the periphery of the fine particle, whereby a core-shell fine particle is obtained. In the core-shell fine particle, a core comprising an inorganic fine particle is preferably contained at a proportion of 5 to 90 vol %, more preferably from 15 to 80 vol %. Two or more kinds of core-shell fine particles may be used in combination. Also, an inorganic fine particle without shell and a core-shell particle may be used in combination.

(3) Binder

The binder polymer is preferably a polymer having a saturated hydrocarbon or a polyether as the main chain, more preferably a polymer having a saturated hydrocarbon as the main chain. The binder polymer is preferably crosslinked. The polymer having a saturated hydrocarbon as the main chain is preferably obtained by a polymerization reaction of an ethylenically unsaturated monomer. In order to obtain a crosslinked binder polymer, a monomer having two or more ethylenically unsaturated groups is preferably used. Examples of the monomer having two or more ethylenically unsaturated groups include an ester of a polyhydric alcohol and a (meth)acrylic acid (e.g., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta (meth)acrylate, pentaerythritol hexa(meth)acrylate, 1,2,3-cyclohexane tetramethacrylate, polyurethane polyacrylate, polyester polyacrylate), a vinylbenzene and a derivative thereof (e.g., 1,4-divinylbenzene, 2-acryloylethyl 4-vinylbenzoate, 1,4-divinylcyclohexanone), a vinylsulfone (e.g., divinylsulfone), an acrylamide (e.g., methylenebisacrylamide) and a methacrylamide. The polymer having a polyether as the main chain is preferably synthesized by a ring-opening polymerization reaction of a polyfunctional epoxy compound.

The crosslinked structure may be introduced into the binder polymer by using a crosslinking functional group-containing monomer in place of or in addition to the monomer having two or more ethylenically unsaturated groups, and reacting the crosslinking group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. In addition, a vinylsulfonic acid, an acid anhydride, a cyanoacrylate derivative, a melamine, an etherified methylol, an ester and a urethane may also be utilized as the monomer for introducing the crosslinked structure. A functional group which exhibits a crosslinking property as a result of decomposition reaction, such as block isocyanate group, may also be used. In the present invention, the crosslinking group is not limited to the above-described compounds but may be a functional group which exhibits reactivity as a result of decomposition.

The polymerization initiator for use in the polymerization reaction and crosslinking reaction of the binder polymer may be a thermal polymerization initiator or a photopolymerization initiator, but a photopolymerization initiator is preferred. Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide.

The binder polymer is preferably formed by adding the monomer to the coating solution for the low refractive index layer, and causing a polymerization reaction (if desired, further a crosslinking reaction) simultaneously with or after the coating of the low refractive index layer. In the coating solution for the low refractive index, a small amount of a polymer (e.g., polyvinyl alcohol, polyoxyethylene, polymethyl methacrylate, polymethyl acrylate, diacetyl cellulose, triacetyl cellulose, nitrocellulose, polyester, alkyd resin) may be added.

The antiglare antireflection film of the present invention may be formed by the following method. but the present invention is not limited thereto.

<Transparent Support>

The transparent support used for the antiglare antireflection film of the present invention is preferably a plastic film and in particular, is preferably formed on the protective film of the polarizing film.

[Preparation of Coating Solution]

First, a coating solution containing components for forming each layer is prepared. At this time, the increase of water content in the coating solution can be suppressed by minimizing the volatilization volume of the solvent. The water content in the coating solution is preferably 5% or less, more preferably 2% or less. The volatilization volume of the solvent can be reduced, for example, by intensifying the closed state at the string after charging respective materials into a tank, or minimizing the contact area of the coating solution with air at the operation of transferring the solution. A device for decreasing the water content in the coating solution may be provided before, during or after coating.

The coating solution for forming the antiglare layer is preferably subjected to filtration capable of removing almost all (90% or more) foreign matters corresponding to the dry thickness (approximately from 50 to 120 nm) of the low refractive index layer formed directly thereon. Since the particle size of the light-transparent fine particle for imparting light diffusibility is equal to or greater than the thickness of the low refractive index layer, the filtration is preferably performed for an intermediate solution after adding all materials except for the light-transparent fine particle. Also, in the case where a filter capable of removing foreign matters having the above-described small particle diameter is not available, filtration capable of removing almost all foreign matters corresponding to the wet thickness (approximately from 1 to 10 µm) of the layer formed directly thereon is preferably performed. By such means, point defects of the layer formed directly thereon can be decreased.

[Coating System]

As for the coating system, various known coating systems may be used. That is, the coating solution is coated on the transparent support by a dip coating method, an air knife coating method, a curtain coating method, a roller coating method, a wire bar coating method, a gravure coating method or a die coating method, and then dried under heating. In view of uniformity of the surface state, a gravure coating method, a wire bar coating method and a die coating method are preferred, and a die coating method is more preferred. The coating is most preferably performed by using a die with a devised construction described in JP-A-2003-200097 and JP-A-2003-211052.

[Drying]

After the coating on a substrate film directly or through another layer, the antiglare layer and the low refractive index layer are transported as a web to a heated zone for drying the solvent. The temperature of the drying zone is preferably from 25 to 140° C. and is preferably set to a relatively low temperature in the first half of the drying zone and to a relatively high temperature in the latter half. However, the temperature is preferably lower than the temperature where the components except for the solvent contained in the coating composition of each layer start volatilizing. For example, some commercially available radical generators used in combination with the ultraviolet-curable resin are volatilized at a ratio of around 10% by number within a few minutes in hot air of 120° C., or some monofunctional or bifunctional acrylate monomers or the like allow for progress of volatilization in hot air at 100° C. In such a case, as described above, the drying temperature is preferably lower than the temperature where components except for the solvent contained in the coating composition of each layer start volatilizing.

After coating the coating composition of each layer on a substrate film, while the coating composition has a solid content concentration of 1 to 50%, the air velocity of the drying air on the coating film surface is preferably from 0.1 to 2 m/sec so as to prevent drying unevenness.

Also, after coating the coating composition for each layer on a substrate film, the difference in the temperature between the substrate film and the transportation roller coming into contact with the substrate film surface opposite the coated surface in the drying zone is preferably from 0 to 20° C., because drying unevenness due to heat transfer unevenness on the transportation roller can be prevented.

[Curing]

The web after the heated zone for drying the solvent is passed through a zone for curing each coating film by the effect of ionizing radiation and/or heat, thereby curing the coating film. For example, when the coating film is ultraviolet-curable, an ultraviolet ray is preferably irradiated at an irradiation dose of 10 to 1,000 $mJ/cm^2$ from an ultraviolet lamp to cure each layer. At this time, the irradiation dose distribution in the width direction of the web including both edges is preferably from 50 to 100%, more preferably from 80 to 100%, based on the maximum irradiation dose in the center. Furthermore, in the case where the oxygen concentration needs to be decreased by the purging with a nitrogen gas or the like so as to accelerate the surface curing, the oxygen concentration is preferably from 0.01 to 5%, and the oxygen concentration distribution in the width direction is preferably 2% or less.

In addition, at the time where the curing ratio (100—residual functional group content) of the antiglare layer reaches a certain value less than 100%, the low refractive index of the present invention is preferably provided thereon, so that when the low refractive index layer is cured by the effect of ionizing radiation and/or heat, the curing ratio of the underlying antiglare layer can become higher than that before providing the low refractive index layer and the adhesion between the antiglare layer and the low refractive index layer can be thereby improved.

The antiglare antireflection film of the present invention produced in this way may be used as a surface film of various known display materials by attaching thereto a known pressure-sensitive adhesive, or may be used in a liquid display device after preparing a polarizing plate by using it. In this case, the antiglare antireflection film is disposed on the outermost surface of a display, for example, by providing a pressure-sensitive adhesive layer on one surface. The antireflection film of the present invention is preferably used for at least one sheet out of two protective films sandwiching a polarizing film of a polarizing plate from both sides.

By arranging the antireflection film of the present invention to serve also as a protective film, the production cost of the polarizing plate can be reduced. Furthermore, by using the antireflection film of the present invention as the outermost surface layer, a polarizing plate prevented from the projection of outside light or the like and assured of excellent properties such as scratch resistance and antifouling property can be obtained.

At the time of producing a polarizing plate by using the light-scattering film or antireflection film of the present invention for one of two surface protective films of a polarizing film, the antireflection film is preferably subjected to a treatment of hydrophilizing the transparent support surface opposite the side having the antireflection structure, that is, the surface on the side to be laminated with the polarizing film, so as to improve the adhesive property on the surface for the adhesion.

[Saponification Treatment]

(1) Method by Dipping in Alkali Solution

This is a technique of dipping the light-scattering film or antireflection film in an alkali solution under appropriate conditions to saponify all the surface having reactivity with an alkali on the entire surface of the film. This method requires no particular equipment and is preferred in view of cost. The alkali solution is preferably an aqueous sodium hydroxide solution. The concentration is preferably from 0.5 to 3 mol/liter, more preferably from 1 to 2 mol/liter. The liquid temperature of the alkali solution is preferably from 30 to 75° C., more preferably from 40 to 60° C.

The combination of the saponification conditions is preferably a combination of relatively mild conditions but may be selected according to the material or construction of the light-scattering film or antireflection film or the objective contact angle.

The film after dipping in an alkali solution is preferably well washed with water or dipped in a dilute acid to neutralize the alkali component so as to prevent the alkali component from remaining in the film.

By the saponification treatment, the transparent support surface opposite the surface having the antiglare layer or antireflection layer is hydrophilized. The protective film for polarizing plate is used by bonding the hydrophilized surface of the transparent support to a polarizing film.

The hydrophilized surface is effective for improving the adhesive property to the adhesive layer mainly comprising a polyvinyl alcohol.

In the saponification treatment, the contact angle with water on the transparent support surface opposite the surface having the antiglare layer or low refractive index layer is preferably lower in view of adhesive property to the polarizing film, but, on the other hand, according to the dipping method, the region from the surface having the antiglare layer or low refractive index layer to the inside is damaged at the same time and therefore, it is important to select minimum necessary reaction conditions. As the index for the damage of each layer by an alkali, particularly in the case where the transparent support is triacetyl cellulose, the contact angle with water of the transparent support surface on the opposite side is preferably from 10 to 50°, more preferably from 30 to 50°, still more preferably from 40 to 50°. If the contact angle exceeds 50°, there arises a problem in the adhesive property to the polarizing film and this is not preferred, whereas if the contact angle is less than 10°, the antireflection film is significantly damaged and the physical strength is disadvantageously impaired.

(2) Method by Coating with Alkali Solution

In order to avoid the damage of each film in the dipping method, an alkali solution coating method of coating an alkali solution only on the surface opposite the surface having the antiglare layer or antireflection film under appropriate conditions, and subjecting the film to heating, water washing and drying, is preferably used. In this case, the "coating" means to contact an alkali solution or the like only with the surface to be saponified and includes spraying and contact with a belt or the like impregnated with the solution, in addition to the coating. This method requires to separately provide equipment and a step for coating the alkali solution and therefore, is inferior to the dipping method of (1) in view of the cost. However, since the alkali solution comes into contact only with the surface to be saponified, the film may have a layer using a material weak to an alkali solution on the opposite surface. For example, the alkali solution causes various effects such as corrosion, dissolution and separation on the vapor deposition film or sol-gel film, and such a film is preferably not provided in the case of dipping method but can be used without problem in this coating method, because the film is not contacted with the solution.

The saponification methods (1) and (2) either can be performed after unrolling a roll-form support and forming respective layers and therefore, may be included in a series of operations by adding the treatment after the production step of the light-scattering film or antireflection film. Also, by continuously performing the step of laminating the film to a polarizing plate comprising a similarly unrolled support, a polarizing plate can be produced with higher efficiency than in the case of performing the same operation in the sheet-fed manner.

(3) Method of Performing Saponification by Protecting Antiglare Layer or Antireflection Layer with Laminate Film Similarly to (2) above, when the antiglare layer and/or the low refractive index layer is insufficient in the resistance against an alkali solution, a method of, after the formation of a final layer, laminating a laminate film on the surface having formed thereon the final layer, dipping the laminate in an alkali solution to hydrophilize only the triacetyl cellulose surface opposite the surface having formed thereon the final layer, and then separating the laminate film, may also be employed. Also in this method, a hydrophilizing treatment enough as a protective film for polarizing plate can be applied only to the surface of the triacetyl cellulose film opposite the surface having formed thereon the final layer, without damaging the antiglare layer or the low refractive index layer. As compared with the method of (2), this method is advantageous in that an apparatus for coating a special alkali solution is not necessary, though the laminate film remains as a waste.

(4) Method by Dipping in Alkali Solution after Formation Up to Antiglare Layer

In the case where the layers up to the antiglare layer have resistance against an alkali solution but the low refractive index layer is insufficient in the resistance against an alkali solution, a method of forming the layers up to the antiglare layer, then dipping the film in an alkali solution to hydrophilize both surfaces, and thereafter forming the low refractive index layer on the antiglare layer, may be employed. The production process becomes cumbersome, but particularly when the low refractive index layer has a hydrophilic group as in a fluorine-containing sol-gel film or the like, the interlayer adhesion between the antiglare layer and the low refractive index layer is advantageously enhanced.

(5) Method of Forming Antiglare Layer or Antireflection Layer on Previously Saponified Triacetyl Cellulose Film After previously saponifying a triacetyl cellulose film, for example, by dipping it in an alkali solution, the antiglare layer or the low refractive index layer may be formed on either one surface directly or through another layer. In the case of performing the saponification by dipping the film in an alkali solution, the interlayer adhesion between the antiglare layer or other layer and the triacetyl cellulose surface hydrophilized by saponification is sometimes worsened. Such a problem can be solved by applying, after saponification, a treatment such as corona discharge or glow discharge only to the surface where the antiglare layer or other layer is afterward formed, thereby removing the hydrophilized surface, and then forming the antiglare layer or other layer. When the antiglare layer or other layer has a hydrophilic group, good interlayer adhesion is sometimes obtained.

EXAMPLES

The characteristic features of the present invention are described below in greater detail by referring to Examples and Comparative Examples. The materials, amounts used, ratios, treatment contents, treatment procedures and the like used in the following Examples can be appropriately changed or modified without departing from the purport of the present invention. Accordingly, the scope of the present invention should not be construed as being limited to these specific examples. Unless otherwise indicated, the "parts" and "%" are on the mass basis.

<Production of IPS-Mode Liquid Crystal Cell 1>

As shown in FIG. 1, electrodes (reference numbers 2 and 3 in FIG. 1) were provided on one glass substrate to give a distance of 20 μm between adjacent electrodes, and a polyimide film is provided thereon as an alignment film and subjected to a rubbing treatment. The rubbing treatment was performed in the direction 4 shown in FIG. 1. A polyimide film was provide on one surface of one separately prepared glass substrate and used as an alignment film by applying a rubbing treatment thereto. Two glass substrates were superposed one on another and laminated with a space (gap, d) of 3.9 μm between substrates by placing the orientation films to oppose each other and arranging the rubbing directions of two glass substrates to run in parallel, and a nematic liquid crystal composition having a refractive index anisotropy ($\Delta n$) of 0.0769 and a positive dielectric anisotropy ($\Delta \epsilon$) of 4.5 was enclosed therebetween. The d·$\Delta n$ value of the liquid crystal layer was 300 nm.

<Production of First Retardation Region 1, First Retardation Region 2 and First Retardation Region 3>

A uniaxially stretched polyester film-made heat-shrinkable film was bonded on both surfaces of a polycarbonate film having a thickness of 80 μm and Re of 120 nm through an acryl-based pressure-sensitive adhesive layer by orthogonally arranging the slow axis and while shrinking the heat-shrinkable film under heat at 160° C., the length in the width direction was reduced to 92%, 88% or 96% of the length before shrinking by using a stretching apparatus. Thereafter, the heat-shrinkable film was removed. In this way, First Retardation Region 1, First Retardation Region 2 and First Retardation Region 3 were obtained.

The dependency of Re on the incident angle of light was measured by using an automatic birefringence meter, KOBRA-21ADH, manufactured by Oji Scientific Instruments, and the optical properties of each retardation region were calculated, as a result, it was confirmed that First Retardation Region 1 had Re of 160 nm, Rth of −40 nm and Nz of 0.25, First Retardation Region 2 had Re of 150 nm, Rth of −60 nm and Nz of 0.10, and First Retardation Region 3 had Re of 140 nm, Rth of −21 nm and Nz of 0.35.

<Production of First Retardation Region 4 and First Retardation Region 5>

The following composition was charged into a mixing tank and respective components were dissolved with stirring under heating to prepare a cellulose acetate solution. The obtained solution was filtered by using a filter paper (No. 63, produced by Advantec Toyo Kaisha, Ltd.) having a holding particle diameter of 4 μm and a filtration time of 35 seconds at 5 kg/cm² or less.

| Composition of Cellulose Acetate Solution | |
|---|---|
| Cellulose acetate having an acetylation degree of 60.9% (polymerization degree: 300, Mn/Mw = 1.5) | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

In a separate mixing tank, 8 parts by mass of Retardation Increasing Agent A shown below, 10 parts by mass of Retardation Increasing Agent B shown below, 0.28 parts by mass of silicon dioxide fine particle (average particle diameter: 0.1 μm), 80 parts by mass of methylene chloride and 20 parts by mass of methanol were charged and stirred under heating to prepare a retardation increasing agent solution (at the same time, a liquid dispersion of fine particles). Subsequently, 40 parts by mass of the obtained retardation increasing agent solution was mixed with 474 parts by mass of the cellulose acetate solution and thoroughly stirred to prepare a dope.

Retardation Increasing Agent A:

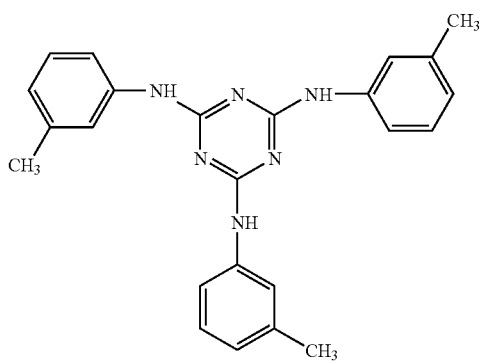

Retardation Increasing Agent B:

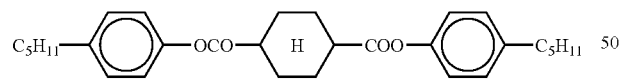

The obtained dope was cast by using a band casting machine, and the film still having a residual solvent amount of 15 mass % was transversely stretched at a stretching ratio of 20% by using a tenter under the condition of 130° C. After holding the film at 50° C. for 30 seconds while keeping the width after stretching, the clips were removed to produce a cellulose acetate film. The residual solvent amount at the completion of stretching was 5 mass %, and the film was further dried to reduce the residual solvent amount to less than 0.1 mass %.

The thus-obtained film (First Retardation Region 4) had a thickness of 80 μm. The dependency of Re on the incident angle of light was measured by using an automatic birefringence meter, KOBRA-21ADH, manufactured by Oji Scientific Instruments, as a result, First Retardation Region 4 produced was found to have Re of 70 nm, Rth of 175 nm and Nz of 3.0.

In a separate mixing tank, 16 parts by mass of Retardation Increasing Agent A, 8 parts by mass of Retardation Increasing Agent B, 0.28 parts by mass of silicon dioxide fine particle (average particle diameter: 0.1 μm), 80 parts by mass of methylene chloride and 20 parts by mass of methanol were charged and stirred under heating to prepare a retardation increasing agent solution (at the same time, a liquid dispersion of fine particles). Subsequently, 45 parts by mass of the obtained retardation increasing agent solution was mixed with 474 parts by mass of the cellulose acetate solution and thoroughly stirred to prepare a dope, and the film formation was performed in the same manner as in First Retardation Region 4. The thus-obtained film (First Retardation Region 5) had a thickness of 80 μm. The dependency of Re on the incident angle of light was measured by using an automatic birefringence meter, KOBRA-21ADH, manufactured by Oji Scientific Instruments, as a result, First Retardation Region 5 produced was found to have Re of 60 nm, Rth of 210 nm and Nz of 4.0.

<Production of Second Retardation Region 1>

The following composition was charged into a mixing tank and respective components were dissolved with stirring under heating to prepare a cellulose acetate solution having the following formulation.

Composition of Cellulose Acetate Solution:

| Cellulose acetate having an acetylation degree of 60.9% | 100 parts by mass |
|---|---|
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

In a separate mixing tank, 16 parts by mass of a retardation increasing agent shown below, 80 parts by mass of methylene chloride and 20 parts by mass of methanol were charged and stirred under heating to prepare a retardation increasing agent solution. Subsequently, 6 parts by mass of the obtained retardation increasing agent solution was mixed with 487 parts by mass of the cellulose acetate solution and thoroughly stirred to prepare a dope.

Retardation Increasing Agent:

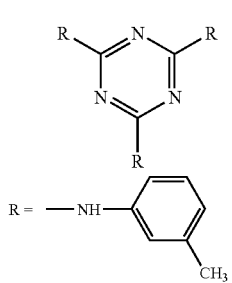

The obtained dope was cast by using a band casting machine and when the film surface temperature on the band reached 40° C., the film was dried with hot air at 60° C. for 1 minute and then separated from the band. This film was dried with drying air at 140° C. for 10 minutes to produce a film having a thickness of 80 μm.

The optical properties of this film was determined by measuring the dependency of Re on the incident angle of light with use of an automatic birefringence meter (KOBRA-21ADH, manufactured by Oji Scientific Instruments), as a result, nx and ny were substantially equal and Re=5 nm and Rth=80 nm. This film was designated as Second Retardation Region 1.

<Production of Second Retardation Region 2 and Second Retardation Region 3>

First Retardation Region 4 and First Retardation Region 5 each was surface-treated by saponification and on each film, a commercially available vertical alignment film (JALS-204R, produced by Japan Synthetic Rubber Co., Ltd.) diluted with methyl ethyl ketone at 1:1 was coated in an amount of 2.4 ml/m² by a wire bar coater and immediately dried with hot air at 120° C. for 120 seconds.

Subsequently, a solution obtained by dissolving 3.8 g of a rod-like liquid crystal compound shown below, 0.06 g of a photopolymerization initiator (Irgacure 907, produced by Ciba-Geigy), 0.02 g of a sensitizer (Kayacure DETX, produced by Nippon Kayaku Co., Ltd.) and 0.002 g of an air-interface vertically aligning agent shown below in 9.2 g of methyl ethyl ketone was prepared.

The obtained solution was coated on the alignment film side of the film having formed thereon an alignment film by a wire bar in the following count, and the resulting film was attached to a metal frame and heated in a constant temperature bath at 100° C. for 2 hours to align the rod-like liquid crystal compound. Thereafter, UV was irradiated at 80° C. for 20 seconds by using a high-pressure mercury lamp of 120 W/cm to crosslink the rod-like liquid crystal compound and then, the film was allowed to cool to room temperature, thereby producing the retardation layer.

Rod-Like Liquid Crystal Compound:

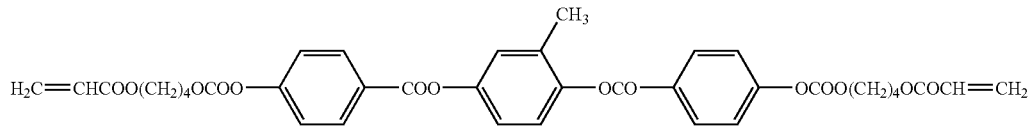

Air-Interface Vertically Aligning Agent (Compound (II-4) described in JP-A-2004-139015):

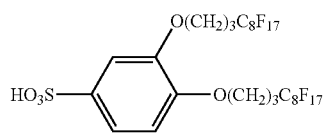

TABLE 1

| Film No. | Retardation Layer Comprising Rod-Like Liquid Crystal Second Retardation Region | Substrate First Retardation Region | Count of Wire Bar |
|---|---|---|---|
| Retardation 1 | Second Retardation Region 2 | First Retardation Region 4 | #4.5 |
| Retardation 2 | Second Retardation Region 3 | First Retardation Region 5 | #5.0 |

The dependency of Re on the incident angle of light of the produced film was measured by using an automatic birefringence meter (KOBRA-21ADH, manufactured by Oji Scientific Instruments), and the optical properties of only the second retardation region were calculated by subtracting the previously measured contributory share of the support, as a result, it was confirmed that Second Retardation Region 2 had Re of 0 nm and Rth of −225 nm, Second Retardation Region 3 had Re of 0 nm and Rth of −295 nm, and in all films, the rod-like liquid crystal was oriented nearly in the vertical alignment.

<Preparation of Retardation 3>

The cellulose acylate film corresponding to the first retardation region 5 prepared above was passed through dielectrically heated rolls kept at 60° C. to elevate the film surface temperature to 40° C. Thereafter, the alkaline solution of the composition shown below was coated in 14 ml/m² by means of a bar coater, and the coated film was allowed to stay for 10 sec under a steam-type far-infrared ray heater (a product of Noritake Co., Ltd.) heated at 110° C., and then coated with pure water in 3 ml/m² again by means of a bar coater. The film temperature during this coating was 40° C. Next, after water rinsing with a fountain coater and water drainage with an air knife were repeated three times, the film was allowed to stay for 2 sec in a drying zone kept at 70° C. for drying.

| (Alkaline solution composition) | |
|---|---|
| Potassium hydroxide | 4.7 parts by mass |
| Water | 15.7 parts by mass |
| Isopropanol | 64.8 parts by mass |
| Propylene glycol | 14.9 parts by mass |
| $C_{16}H_{33}O(CH_2CH_2O)_{10}H$ (Surfactant) | 1.0 part by mass |

<Production of Second Retardation Region>

On the saponified surface of the cellulose acylate film in the form of long web which had been prepared above and corresponds to the first retardation region 5, the coating solution for alignment layer of the following composition was continuously coated with a #14 wire bar. By drying the coated film with 60° C. hot air for 60 sec, and further with 100° C. hot air for 120 sec, an alignment film was formed.

| Composition of the coating solution for alignment film | |
|---|---|
| The modified poly(vinyl alcohol) shown below | 10 parts by mass |
| Water | 371 parts by mass |
| Methanol | 119 parts by mass |
| Glutaradehyde | 0.5 parts by mass |

Modified poly(vinyl alcohol)

$-(CH_2-CH)_{\overline{86.3}}(CH_2-CH)_{\overline{12}}(CH_2-CH)_{\overline{1.7}}$
$\quad\quad\quad |\quad\quad\quad\quad\quad |\quad\quad\quad\quad\quad |\quad\quad\quad\quad CH_3$
$\quad\quad OH\quad\quad\quad OCOCH_3\quad\quad OCONHCH_2CH_2OCOC=CH_2$ The coating solution containing a rod-like liquid crystal compound and having the composition shown below was continuously coated on the alignment film prepared above with a #5.0 wire bar. The transport speed of the film was set at 20 m/min. The solvent was dried off during the process of elevating the temperature from room temperature to 80° C. Thereafter, the film was heated for 90 sec in a drying zone kept at 80° C. to align the rod-like liquid crystal compound. Successively, along with keeping the film temperature at 60° C., the alignment of the liquid crystal compound was fixed by UV radiation to provide Second Retardation 4.

In succession, after the film thus formed was immersed in a 1.5 mol/L sodium hydroxide aqueous solution kept at 55° C. for 2 min, the film was immersed in water to rinse off the sodium hydroxide to a sufficient degree. Thereafter, after in a 5 mmol/L sulfuric acid aqueous solution for 1 min at 35° C., the film was immersed in water to rinse off the dilute sulfuric acid aqueous solution to a sufficient degree. Finally, the sample was completely dried at 120° C. In this manner, Retardation 3 in which First Retardation Region 5 and Second Retardation Region 4 were laminated was fabricated.

| Composition of a coating solution containing a rod-like liquid crystal (S1) | |
|---|---|
| Rod-like liquid crystal compound (I) shown below | 100 parts by mass |
| Photo-polymerization initiator (Ilgacure 907, a product of Ciba-Geigy Corp.) | 3 parts by mass |
| Sensitizer (Kayacure DETX, a product of Nihon Kayaku Co., Ltd.) | 1 part by mass |
| Fluorine-containing polymer shown below | 0.4 parts by mass |
| Pyridinium salt shown below | 1 part by mass |
| Methyl ethyl ketone | 172 parts by mass |

Rod-like liquid crystal compound (I)

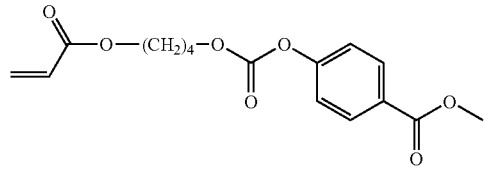

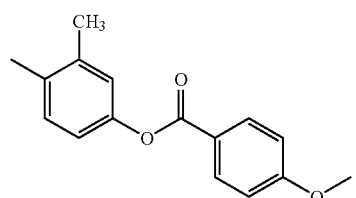

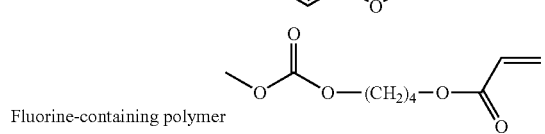

Fluorine-containing polymer

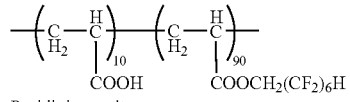

Pyridinium salt

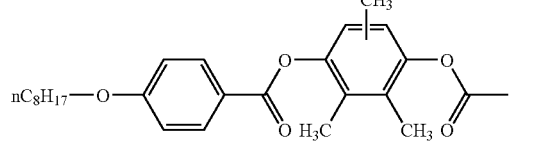

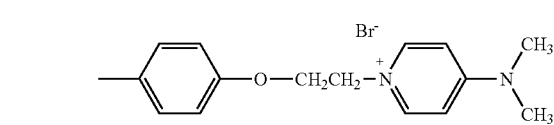

From Retardation 3 thus fabricated, only the optically anisotropic layer (Second Retardation Region 4) containing the rod-like liquid crystal compound was peeled off, and subjected to optical property measurement with an automatic birefringence meter (KOBRA-21ADH, manufactured by Oji Scientific Instruments). The Re of the optically anisotropic layer alone measured at 590 nm wavelength was 0 nm, and the Rth was −260 nm. It was further confirmed that an optically anisotropic layer in which the rod-like liquid crystal molecules are aligned substantially vertical to the film plane was formed.

<Production of Retardation 4>

By biaxially stretching a polycarbonate film, Retardation 4 was produced having Re of 268 nm, Rth of 1 nm, Nz of 0.50 and a thickness of 60 μm.

<Production of Retardation 5>

By biaxially stretching a piece of Arton film (a product of JSR Corp.), First Retardation Region 6 was produced having Re of 195 nm, Rth of −20 nm, Nz of 0.40 and a thickness of 135 μm. By combining this piece with Fujitac T40UZ with Re of 1 nm and Rth of 35 nm which corresponds to a second retardation region, Retardation 5 was produced.

<Production of Retardation 6>

By uniaxially stretching a piece of Arton film (a product of JSR Corp.), First Retardation Region 7 was produced having Re of 170 nm, Rth of 85 nm, Nz of 1.00 and a thickness of 70 μm.

Corona discharge treatment was applied onto the surface of the film corresponding to First Retardation Region 7, and on the treated film an aligned film was formed in the same manner as described in retardation 3. Further, an optically anisotropic layer (Second Retardation 5) was formed by using a coating solution (S1) containing the rod-like liquid crystal compound used in the retardation 3. The Re of Second Retardation 5 alone was 0 nm and the Rth thereof was −135 nm. Moreover, it was confirmed that an optically anisotropic layer in which the rod-like liquid crystal molecules are aligned substantially vertical to the film plane was formed. In this manner, Retardation 6 in which Second Retardation Region 5 is laminated on First Retardation Region 7 was fabricated.

<Production of Polarizing Plate Protective Film 1 and Polarizing Plate Protective Film 2>

(Polarizing Plate Protective Film 1)

The following composition was charged into a mixing tank and respective components were dissolved with stirring under heating to prepare Cellulose Acetate Solution A.

| <Composition of Cellulose Acetate Solution A> | |
|---|---|
| Cellulose acetate having a substitution degree of 2.86 | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-Butanol (third solvent) | 11 parts by mass |

In a separate mixing tank, the following composition was charged and respective components were dissolved with stirring under heating to prepare Additive Solution B-1.

| <Composition of Additive Solution B-1> | |
|---|---|
| Methylene chloride | 80 parts by mass |
| Methanol | 20 parts by mass |
| Optical anisotropy reducing agent shown below | 40 parts by mass |

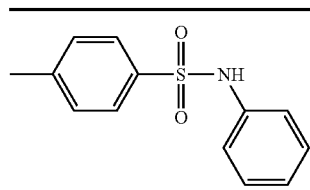

40 Parts by mass of Additive Solution B-1 was added to 477 parts by mass of Cellulose Acetate Solution A and thoroughly stirred to prepare a dope. The dope was cast from the casting port on a drum cooled to 0° C., and the film still having a solvent content of 70 mass % was separated and after fixing the both ends in the width direction of the film with a pin tenter (a pin tenter described in FIG. 3 of JP-A-4-1009), dried in the state of the solvent content being from 3 to 5 mass % while keeping the distance to give a stretching ratio of 3% in the transverse direction (direction perpendicular to the machine direction). Thereafter, the film was transported between rolls of a heat-treatment apparatus and thereby further dried to produce Polarizing Plate Protective Film 1 having a thickness of 80 μm.

The dependency of Re on the incident angle of light was measured by using an automatic birefringence meter (KOBRA-21ADH, manufactured by Oji Scientific Instruments), and the optical properties were calculated, as a result, it was confirmed that Re was 1 nm and Rth was 6 nm.

(Polarizing Plate Protective Film 2)

A commercially available cellulose acetate film (FUJITAC TD80UF, produced by Fuji Photo Film Co., Ltd., Re=2 nm, Rth=48 nm) was surface-treated by saponification and on this film, a commercially available vertical alignment film (JALS-204R, produced by Japan Synthetic Rubber Co., Ltd.) diluted with methyl ethyl ketone at 1:1 was coated in an amount of 2.4 ml/m$^2$ by a wire bar coater and immediately dried with hot air at 120° C. for 120 seconds.

Subsequently, a solution obtained by dissolving 1.8 g of a rod-like liquid crystal compound shown below, 0.06 g of a photopolymerization initiator (Irgacure 907, produced by Ciba-Geigy), 0.02 g of a sensitizer (Kayacure DETX, produced by Nippon Kayaku Co., Ltd.) and 0.002 g of an air-interface vertically aligning agent shown below in 9.2 g of methyl ethyl ketone was coated on the alignment film by a #2.3 wire bar, and the resulting film was attached to a metal frame and heated in a constant temperature bath at 100° C. for 2 hours to align the rod-like liquid crystal compound. Thereafter, UV was irradiated at 100° C. for 30 seconds by using a high-pressure mercury lamp of 120 W/cm to crosslink the rod-like liquid crystal compound and then, the film was allowed to cool to room temperature, thereby producing Polarizing Plate Protective Film 2.

a saponification treatment was laminated on one surface of the polarizing film by using a polyvinyl alcohol-based adhesive. Furthermore, Polarizing Plate Protective Film 2 subjected to a saponification treatment was laminated on another side of the polarizing film by using a polyvinyl alcohol-based adhesive such that the cellulose acetate film side came to the polarizing film side. In this way, Polarizing Plate A was produced.

<Production of Polarizing Plate B>

A polarizing film was produced in the same manner, and a commercially available cellulose acetate film (FUJITAC TD80UF, produced by Fuji Photo Film Co., Ltd.) subjected to a saponification treatment was laminated on one surface of the polarizing film by using a polyvinyl alcohol-based adhesive. Furthermore, Polarizing Plate Protective Film 1 subjected to a saponification treatment as above was laminated on another surface of the polarizing film in the same manner to produce Polarizing Plate B.

<Production of Polarizing Plate C>

A polarizing film was produced in the same manner, and a commercially available cellulose acetate film (FUJITAC TD80UF, produced by Fuji Photo Film Co., Ltd.) subjected to a saponification treatment was laminated on one surface of the polarizing film by using a polyvinyl alcohol-based adhesive. Furthermore, a commercially available cellulose acetate film (FUJITAC T40UZ, produced by Fuji Photo Film Co., Ltd., Re=1 nm, Rth=35 nm, thickness: 40 μm) subjected to a saponification treatment was laminated on another surface of the polarizing film by using a polyvinyl alcohol-based adhesive in the same manner to produce Polarizing Plate C.

<Production of Polarizing Plate D>

A polarizing film was produced in the same manner, and a commercially available cellulose acetate film (FUJITAC TD80UF, produced by Fuji Photo Film Co., Ltd.) subjected to a saponification treatment was laminated on both surfaces of the polarizing film by using a polyvinyl alcohol-based adhesive to produce Polarizing Plate D.

<Production of Polarizing Plate E>

A polarizing film was produced by adsorbing iodine to a stretched polyvinyl alcohol film, and a commercially available cellulose acetate film (FUJITAC TD80UF, produced by

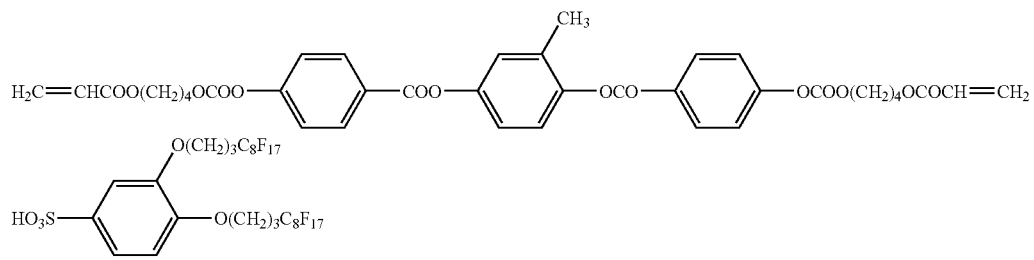

The dependency of Re on the incident angle of light of Polarizing Plate Protective Film 2 was measured by using an automatic birefringence meter (KOBRA-21ADH, manufactured by Oji Scientific Instruments), as a result, Re was 2 nm and Rth was −15 nm. The thickness of Polarizing Plate Protective Film 2 as a whole was 83 μm.

<Production of Polarizing Plate A>

A polarizing film was produced by adsorbing iodine to a stretched polyvinyl alcohol film, and a commercially available cellulose acetate film (FUJITAC TD80UF, produced by Fuji Photo Film Co., Ltd., Re=2 nm, Rth=48 nm) subjected to Fuji Photo Film Co., Ltd., Re=3 nm, Rth=45 nm) subjected to a saponification treatment was laminated on one surface of the polarizing film by using a polyvinyl alcohol-based adhesive to produce Polarizing Plate E.

(Synthesis of Perfluoroolefin Copolymer (1))

Perfluoroolefin Copolymer (1):

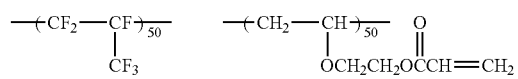

(50:50 is the ratio by mol)

Ethyl acetate (40 ml), 14.7 g of hydroxyethyl vinyl ether and 0.55 g of dilauroyl peroxide were charged into a stainless steel-made autoclave with a stirrer having an internal volume of 100 ml, and the system was evacuated and purged with a nitrogen gas. Furthermore, 25 g of hexafluoropropylene (HFP) was introduced into the autoclave and the system was heated to 65° C. When the temperature in the autoclave reached 65° C., the pressure was 0.53 MPa (5.4 kg/cm$^2$). The reaction was continued for 8 hours while keeping the temperature and when the pressure reached 0.31 MPa (3.2 kg/cm$^2$), the heating was stopped and the system was allowed to cool. At the time where the inner temperature dropped to room temperature, the unreacted monomer was expelled and after opening the autoclave, the reaction solution was taken out. The reaction solution obtained was poured in a large excess of hexane and the precipitated polymer was taken out by removing the solvent by means of decantation. This polymer was dissolved in a small amount of ethyl acetate, and reprecipitation from hexane was performed twice to completely remove the residual monomer. After drying, 28 g of a polymer was obtained. Subsequently, 20 g of this polymer was dissolved in 100 ml of N,N-dimethylacetamide, and 11.4 g of acrylic acid chloride was added dropwise thereto under ice cooling, followed by stirring at room temperature for 10 hours. After adding ethyl acetate, the reaction solution was washed with water, and the organic layer was extracted and then concentrated. The obtained polymer was reprecipitated with hexane to obtain 19 g of Perfluoroolefin Copolymer (1). The refractive index of the obtained polymer was 1.421.

(Preparation of Sol Solution)

In a reactor equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethylacetate were added and mixed. Thereafter, 30 parts of ion exchanged water was added thereto, and the resulting mixture was reacted at 60° C. for 4 hours and then cooled to room temperature to obtain Sol Solution a. The mass average molecular weight was 1,600, and the proportion of a component having a molecular weight of 1,000 to 20,000 in the oligomer or greater components was 100%. Also, the analysis by gas chromatography revealed that the raw material acryloyloxypropyltrimethoxysilane did not remain at all.

(Preparation of Coating Solution A for Antiglare Layer)

A mixture (25.4 g) of dipentaerythritol pentaacrylate and dipentaerythritol hexaacrylate (DPHA, produced by Nippon Kayaku Co., Ltd.) was diluted with 46.3 g of methyl isobutyl ketone. Furthermore, 1.3 g of a polymerization initiator (Irgacure 184, produced by Ciba Specialty Chemicals) was added and mixed, followed by stirring. Subsequently, 0.04 g of a fluorine-based surface modifier (P-7), 5.2 g of a silane coupling agent (KBM-5103, produced by Shin-Etsu Chemical Co., Ltd.) and 0.50 g of a cellulose acetate butyrate having a molecular weight of 40,000 (CAB-531-1, produced by Eastman Chemical) were added thereto, and the resulting mixture was stirred in an air disper for 120 minutes to completely dissolve the solute. The refractive index of the coating film obtained by coating this solution and UV-curing it was 1.520.

Finally, 21.0 g of a 30% methyl isobutyl ketone liquid dispersion of crosslinked poly(acryl-styrene) particles (copolymerization compositional ratio=50/50, refractive index: 1.530) having an average particle diameter 3.5 µm, prepared by dispersion in a polytron dispersing machine at 10,000 rpm for 20 minutes, was added to the solution obtained above, followed by stirring in an air disper for 10 minutes.

The resulting mixed solution was filtered through a polypropylene-made filter having a pore size of 30 µm to prepare Coating Solution A for Antiglare Layer.

(Preparation of Coating Solution B for Antiglare Layer)

Coating Solution B for Antiglare Layer was prepared in the same manner as Coating Solution A for Antiglare Layer except that the amount of methyl isobutyl ketone (vapor pressure at 21.7° C.: 16.5 mmHg) used as the main solvent was changed from 46.3 g to 40.0 g and 6.3 g of propylene glycol (vapor pressure at 20.0° C.: 0.08 mmHg) was further added as a small amount of a solvent having a hydroxyl group.

(Preparation of Coating Solution C for Antiglare Layer)

A mixture (12.7 g) of dipentaerythritol pentaacrylate and dipentaerythritol hexaacrylate (DPHA, produced by Nippon Kayaku Co., Ltd.) was diluted with 16.7 g of methyl isobutyl ketone, and 42.3 g of a liquid dispersion of colloidal silica, MiBK-ST (trade name, average particle diameter: 15 nm, solid content concentration: 30%, produced by Nissan Chemicals Industries, Ltd.), was added thereto. Furthermore, 1.3 g of a polymerization initiator (Irgacure 184, produced by Ciba Specialty Chemicals) was added and mixed, followed by stirring. Subsequently, 0.04 g of a fluorine-based surface modifier (P-7), 5.2 g of a silane coupling agent (KBM-5103, produced by Shin-Etsu Chemical Co., Ltd.) and 0.50 g of a cellulose acetate butyrate having a molecular weight of 40,000 (CAB-531-1, produced by Eastman Chemical) were added thereto, and the resulting mixture was stirred in an air disper for 120 minutes to completely dissolve the solute. The refractive index of the coating film obtained by coating this solution and UV-curing it was 1.500.

Finally, 21.0 g of a 30% methyl isobutyl ketone liquid dispersion of crosslinked poly(acryl-styrene) particles (containing 10% of ethylene glycol dimethacrylate (=crosslinking agent), refractive index: 1.492) having an average particle diameter 3.0 µm, prepared by dispersion in a polytron dispersing machine at 10,000 rpm for 20 minutes, was added to the solution obtained above, followed by stirring in an air disper for 10 minutes.

The resulting mixed solution was filtered through a polypropylene-made filter having a pore size of 30 µm to prepare Coating Solution B for Antiglare Layer.

(Preparation of Coating Solution D for Antiglare Layer)

Coating Solution D for Antiglare Layer was prepared in the same manner as Coating Solution A for Antiglare Layer except that the crosslinked poly(acryl-styrene) particle (copolymerization compositional ratio=50/50, refractive index: 1.530) having an average particle diameter 3.5 µm was changed to a crosslinked polystyrene particle (refractive index: 1.607).

(Preparation of Coating Solution E for Antiglare Layer)

Coating Solution E for Antiglare Layer was prepared in the same manner as Coating Solution A for Antiglare Layer except that the crosslinked poly(acryl-styrene) particle (copolymerization compositional ratio=50/50, refractive index: 1.530) having an average particle diameter 3.5 µm was changed to a crosslinked poly(acryl-styrene) particle (copolymerization compositional ratio=60/40, refractive index: 1.525.

(Preparation of Coating Solution F for Antiglare Layer)

Coating Solution F for Antiglare Layer was prepared in the same manner as Coating Solution A for Antiglare Layer except that the crosslinked poly(acryl-styrene) particle (copolymerization compositional ratio=50/50, refractive index: 1.530) having an average particle diameter 3.5 µm was not added.

(Preparation of Coating Solution G for Antiglare Layer)

Coating Solution G for Antiglare Layer was prepared in the same manner as Coating Solution A for Antiglare Layer except that the copolymerization compositional ratio of the crosslinked poly(acryl-styrene) particle (copolymerization compositional ratio=50/50, refractive index: 1.530) having an average particle diameter 3.5 μm was changed to 40/60 (refractive index: 1.540) and the amount added of the particle was changed to 39.0 g in terms of a 30% methyl isobutyl ketone liquid dispersion.

(Preparation of Coating Solution H for Antiglare Layer)

Coating Solution H for Antiglare Layer was prepared in the same manner as Coating Solution A for Antiglare Layer except that the copolymerization compositional ratio of the crosslinked poly(acryl-styrene) particle (copolymerization compositional ratio=50/50, refractive index: 1.530) having an average particle diameter 3.5 μm was changed to 40/60 (refractive index: 1.540) and the amount added of the particle was changed to 26.0 g in terms of a 30% methyl isobutyl ketone liquid dispersion.

(Preparation of Coating Solution I for Antiglare Layer)

Coating Solution I for Antiglare Layer was prepared in the same manner as Coating Solution A for Antiglare Layer except that the copolymerization compositional ratio of the crosslinked poly(acryl-styrene) particle (copolymerization compositional ratio=50/50, refractive index: 1.530) having an average particle diameter 3.5 μm was changed to 30/70 (refractive index: 1.570) and the amount added of the particle was changed to 39.0 g in terms of a 30% methyl isobutyl ketone liquid dispersion.

(Preparation of Coating Solution A for Low Refractive Index Layer)

A thermal crosslinking fluorine-containing polymer (13 g) containing a polysiloxane and a hydroxyl group and having a refractive index of 1.44 (JTA113, solid content concentration: 6%, produced by JSR Corp.), 1.3 g of a liquid dispersion of colloidal silica, MEK-ST-L (trade name, average particle diameter: 45 nm, solid content concentration 30%, produced by Nissan Chemicals Industries, Ltd.), 0.6 g of the sol solution prepared above, 5 g of methyl ethyl ketone and 0.6 g of cyclohexanone were added and stirred, and the resulting solution was filtered through a polypropylene-made filter having a pore size of 1 μm to prepare Coating Solution A for Low Refractive Index Layer. The refractive index of the layer formed from this coating solution was 1.45.

(Preparation of Coating Solution B for Low Refractive Index Layer)

(Preparation of Liquid Dispersion A-1)

Acryloyloxypropyltrimethoxysilane (produced by Shin-Etsu Chemical Co., Ltd.) (30 g) and 1.5 g of diisopropoxy-aluminum ethylacetate were added and mixed to 500 g of a hollow silica fine particle sol (isopropyl alcohol silica sol, average particle diameter: 60 nm, shell thickness: 10 nm, silica concentration: 20 mass %, refractive index of silica particle: 1.31, prepared by changing the size according to Preparation Example 4 of JP-A-2002-79616). Furthermore, 9 g of ion exchanged water was added thereto and after the reaction at 60° C. for 8 hours, the system was cooled to room temperature and 1.8 g of acetylacetone was then added. While adding cyclohexanone to 500 g of the resulting liquid dispersion to keep an almost constant silica content, the solvent was displaced by reduced-pressure distillation at a pressure of 20 kPa. Foreign matters were not generated in the liquid dispersion and when the solid content concentration was adjusted to 20 mass % with cyclohexanone, the viscosity was 5 mPa·s at 25° C. The residual isopropyl alcohol amount in the obtained Liquid Dispersion A-1 was analyzed by gas chromatography and found to be 1.5%.

(Preparation of Coating Solution B)

195 Parts by mass (39.0 parts by mass as a solid content of silica+surface treating agent) of Liquid Dispersion A-1, 30.0 parts by mass (9.0 parts by mass as a solid content) of a colloidal silica dispersion (silica, a product differing in the particle diameter from MEK-ST, average particle diameter: 45 nm, solid content concentration: 30%, produced by Nissan Chemicals Industries, Ltd.) and 17.2 parts by mass (5.0 parts by mass as a solid content) of Sol Solution a were added to 783.3 parts by mass (47.0 parts by mass as a solid content) of Opstar JTA113 (a thermal crosslinking fluorine-containing polymer composition solution (solid content: 6%), produced by JSR Corp.). The resulting solution was diluted with cyclohexane and methyl ethyl ketone such that the coating solution as a whole had a solid content concentration of 6 mass % and the ratio of cyclohexane and methyl ethyl ketone became 10:90. In this way, Coating Solution B for Low Refractive Index Layer was prepared. The refractive index of the layer formed from this coating solution was 1.39.

(Preparation of Coating Solution C for Low Refractive Index layer)

Perfluoroolefin Copolymer (1) (15.2 g), 2.1 g of a hollow silica sol (refractive index: 1.31, average particle diameter: 60 nm, solid content concentration: 20%), 0.3 g of reactive silicone X-22-164B (trade name, produced by Shin-Etsu Chemical Co., Ltd.), 7.3 g of Sol Solution a, 0.76 g of a photopolymerization initiator (Irgacure 907 (trade name, produced by Ciba Specialty Chemicals), 301 g of methyl ethyl ketone and 9.0 g of cyclohexanone were added and stirred, and the resulting solution was filtered through a polypropylene-made filter having a pore size of 5 μm to prepare Coating Solution C for Low Refractive Index Layer. The refractive index of the layer formed from this coating solution was 1.40.

<Production of Antiglare Antireflection Film>

(1) Coating of Antiglare Layer

A 80 μm-thick triacetyl cellulose film (FUJITAC TD80UF, produced by Fuji Photo Film Co., Ltd., Re=2 nm, Rth=48 nm) in a roll form was unrolled, and Coating Solution A for Antiglare Layer was coated thereon by a die coating method using an apparatus having a construction described in JP-A-2003-211052 under the coating conditions shown below. After drying at 30° C. for 15 seconds and at 90° C. for 20 seconds, the coating layer was cured by irradiating an ultraviolet ray at an irradiation dose of 90 mJ/cm² with use of an air-cooled metal halide lamp of 160 W/cm (manufactured by Eyegraphics Co., Ltd.) under nitrogen purging to form an antiglare layer having a thickness of 6 μm and having an antiglare property. The resulting film was taken up.

Basic Conditions:

In the slot die 13 used, the upstream lip land length $I_{UP}$ was 0.5 mm, the downstream lip land length $I_{LO}$ was 50 μm, the opening length of the slot 16 in the web running direction was 150 μm, and the length of the slot 16 was 50 mm. The gap between the upstream lip land 18a and the web W was made 50 μm longer than the gap between the downstream lip land 18b and the web W, and the gap $G_L$ between the downstream lip land 18b and the web W was set to 80 μm at the time of coating the coating solution for antiglare layer and to 50 μm at the time of coating the coating solution for low refractive index layer. Also, the gap $G_S$ between the side plate 40b of the low-pressure chamber 40 and the web W and the gap $G_B$ between the back plate 40a and the web W both were set to 200 μm. According to the liquid physical properties of each coating solution, the coating was performed for the antiglare layer: at a coating speed of 20 m/min to a wet coated amount of 17.5 ml/m² in the case of Coating Solutions A and C for Antiglare Layer and at a coating speed of 40 m/min to a wet coated amount of 17.5 ml/m² in the case of Coating Solution B for Antiglare Layer; and for the low refractive index layer: at a coating speed of 40 m/min to a wet coated amount of 5.0 ml/m². Incidentally, the coating width was 1,300 mm and the effective width was 1,280 mm.

(2) Coating of Low Refractive Index Layer

The triacetyl cellulose film having provided thereon an antiglare layer by applying Coating Solution A for Antiglare Layer was again unrolled, and Coating Solution A for Low Refractive Index Layer was coated thereon under the above-described basic conditions and after drying at 120° C. for 150 seconds and further at 140° C. for 8 minutes, irradiated with an ultraviolet ray at an irradiation dose of 300 mJ/cm² by using an air-cooled metal halide lamp of 240 W/cm (manufactured by Eyegraphics Co., Ltd.) in an atmosphere adjusted to an oxygen concentration of 0.1% by nitrogen purging, to form a low refractive index layer having a thickness of 100 nm. The resulting film was taken up.

(3) Saponification Treatment of Antiglare Antireflection Film

After the film formation of the low refractive index layer above, the sample was subjected to the following treatment.

An aqueous 1.5 mol/liter sodium hydroxide solution was prepared and kept at 55° C. Separately, an aqueous 0.01 mol/liter dilute sulfuric acid solution was prepared and kept at 35° C. The produced antireflection film was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C. In this way, an antiglare antireflection film subjected to saponification treatment was produced. This was designated as AGF 11-1.

An antiglare layer was formed in the same manner as in AGF 11-1 except for changing Coating Solution A for Antiglare Layer to Coating Solution B, C or E for Antiglare Layer, furthermore, a low refractive index layer was provided by coating in the same manner as in AGF 11-1, and each film was subjected to a saponification treatment. The film coated with Coating Solution B for Antiglare Layer was designated as AGF 11-2, the film coated with Coating Solution C for Antiglare Layer was designated as AGF 11-3, and the film coated with Coating Solution E for Antiglare Layer was designated as AGF 11-4. Also, an antiglare layer was formed in the same manner as in AGF 11-1 except for changing Coating Solution A for Antiglare Layer to Coating Solution G, H or I for Antiglare Layer and changing the wet coated amount to 21.0 ml/m², furthermore, a low refractive index layer was provided by coating in the same manner as in AGF 11-1, and each film was subjected to a saponification treatment. The film coated with Coating Solution G for Antiglare Layer was designated as AGF 11-5, the film coated with Coating Solution H for Antiglare Layer was designated as AGF 11-6, and the film coated with Coating Solution I for Antiglare Layer was designated as AGF 11-7.

Also, an antiglare layer was formed in the same manner as in AGF 11-1 except for changing Coating Solution A for Antiglare Layer to Coating Solution D for Antiglare Layer, furthermore, a low refractive index layer was provided by coating in the same manner as in AGF 11-1, and each film was subjected to a saponification treatment. The film coated with Coating Solution D for Antiglare Layer was designated as AGF 6-1, and the film coated with Coating Solution F for Antiglare Layer was designated as AGF 6-2.

(Evaluation of Antiglare Antireflection Film)

The films obtained each was evaluated on the following items. The results are shown in Table 2.

(1) Average Reflectance

The back surface of the film was roughened with sand paper and then treated with black ink to eliminate the back surface reflection and in this state, the spectral specular reflectance on the front surface side was measured at an incident angle of 5° in the wavelength region of 380 to 780 nm by using a spectrophotometer (manufactured by JASCO Corporation). The result is shown by the arithmetic mean value of specular reflectances at 450 to 650 nm.

(2) Haze

The entire haze (H), internal haze (Hi) and surface haze (Hs) of the film obtained were determined by the following measurements.

1) The entire haze value of the film obtained was measured according to JIS-K7136.

2) After adding several silicone oil drops to the front surface on the low refractive index layer side and the back surface of the obtained film, the film was sandwiched from the front and the back by two 1 mm-thick glass plates (Microslide Glass No. S9111, produced by Matsunami K.K.) and put into optically complete contact with two glass plates to provide a surface haze-removed state, and the haze was measured. From the haze value obtained, the haze separately measured by interposing only a silicone oil between two glass plates was subtracted, thereby calculating the internal haze (Hi) of the film.

3) The surface haze (Hs) of the film was calculated by subtracting the internal haze (Hi) calculated in 2) above from the entire haze (H) measured in 1) above.

(3) Image Clarity

The transmitted image clarity was measured according to JIS K7105 by using a 0.5 mm-width optical comb.

(4) Centerline Average Roughness

The centerline average roughness Ra of the film obtained was measured according to JIS-B0601.

(5) Antiglare Property

A bare fluorescent lamp (8,000 cd/m²) without louver was projected on the film obtained from an angle of 45°, and the degree of blurring of the reflected image when observed from the direction of −45' was evaluated according to the following criteria.

◎: The contour of the fluorescent lamp was not recognized at all.

○: The contour of the fluorescent lamp was slightly recognized.

Δ: The fluorescent lamp was blurred but the contour could be recognized.

X: The fluorescent lamp was not substantially blurred.

TABLE 2

| Sample No. | Average Reflectance (%) | Internal Haze (%) | Surface Haze (%) | Entire Haze (%) | Ra (μm) | Image Clarity (%) | Antiglare Property |
|---|---|---|---|---|---|---|---|
| AGF 11-1 | 1.8 | 10.0 | 5.2 | 15.2 | 0.18 | 15.3 | ◎ |
| AGF 11-2 | 1.7 | 10.2 | 4.9 | 15.1 | 0.18 | 16.2 | ◎ |
| AGF 11-3 | 1.9 | 5.1 | 6.2 | 11.3 | 0.13 | 28.0 | ◎ |
| AGF 11-4 | 1.8 | 1.8 | 12.3 | 14.1 | 0.21 | 15.8 | ◎ |
| AGF 11-5 | 1.8 | 28.0 | 5.5 | 33.5 | 0.17 | 10.2 | ◎ |
| AGF 11-6 | 1.7 | 23.0 | 3.9 | 26.9 | 0.15 | 12.5 | ◎ |
| AGF 11-7 | 1.8 | 34.0 | 2.5 | 36.5 | 0.20 | 10.5 | ◎ |
| AGF 6-1 | 1.7 | 38.5 | 8.5 | 37.0 | 0.20 | 11.5 | ◎ |
| AGF 6-2 | 1.7 | 0.1 | 0.1 | 0.2 | 0.01 | 91.4 | X |

Also, when an antiglare antireflection film was produced in the same manner except for changing Coating Solution A for Low Refractive Index layer of AGF 11-1 to Coating Solution B for Low Refractive Index Layer, the average reflectance was improved to 1.2%.

Furthermore, when an antiglare antireflection film was produced in the same manner except for changing Coating Solution A for Low Refractive Index layer of AGF 11-1 to Coating Solution C for Low Refractive Index Layer and changing the irradiation dose of an ultraviolet ray after coating to 900 mJ/cm$^2$, the average reflectance was improved to 1.5%. In addition, since Coating Solution C for Low Refractive Index Layer was used in combination with heat curing, the scratch resistance could be enhanced.

<Production of Polarizing Plate H>

Next, a polarizing film was fabricated by allowing iodine to be absorbed on a stretched poly(vinyl alcohol) film, and Antiglare Antireflective Film AGF11-2 was laminated to one surface of this polarizing film with use of a poly(vinyl alcohol)-based adhesive. Further, saponification treatment was carried out on Polarizing Plate Protective Film 1, which was attached to the other surface of the polarizing film to fabricate Polarizing Plate H.

<Production of Polarizing Plate I>

A polarizing film was produced by adsorbing iodine to a stretched polyvinyl alcohol film, and the antiglare antireflection film AGF11-2 was laminated on one surface of the polarizing film by using a polyvinyl alcohol-based adhesive. Furthermore, Polarizing Plate Protective Film 2 subjected to a saponification treatment was laminated on another side of the polarizing film by using a polyvinyl alcohol-based adhesive such that the cellulose acetate film side came to the polarizing film side. In this way, Polarizing Plate I was produced.

<Production of Polarizing Plate J>

A polarizing film was produced in the same manner, and the antiglare antireflection film AGF 11-2 was laminated on one surface of the polarizing film by using a polyvinyl alcohol-based adhesive. Furthermore, a commercially available cellulose acetate film (FUJITAC TD80UF, produced by Fuji Photo Film Co., Ltd., Re=2 nm, Rth=48 nm) subjected to a saponification treatment was laminated on another surface of the polarizing film by using a polyvinyl alcohol-based adhesive in the same manner. In this way, Polarizing Plate J was produced.

<Production of Polarizing Plate K>

A polarizing film was produced by adsorbing iodine to a stretched polyvinyl alcohol film, and the antiglare antireflection film AGF 11-2 was laminated on one surface of the polarizing film by using a polyvinyl alcohol-based adhesive.

Furthermore, Film Retardation 1 subjected to a saponification treatment was laminated on another side of the polarizing film by using a polyvinyl alcohol-based adhesive such that the First Retardation Region 4 side came to the polarizing film side and at the same time, the transmission axis of the polarizing film became parallel to the slow axis of First Retardation Region 4. In this way, Polarizing Plate K was produced.

<Production of Polarizing Plate L1>

A polarizing film was fabricated by allowing iodine to be absorbed on a stretched poly(vinyl alcohol) film, and, on one surface of the polarizing film thus prepared, Antiglare Antireflective Film AGF 11-2 was laminated with use of a poly (vinyl alcohol)-based adhesive. Further, in a similar manner, Polarizing Plate L1 was fabricated by laminating Retardation 3 on the other surface of the polarizing film with a poly(vinyl alcohol)-based adhesive in such a manner that the cellulose acylate film (First Retardation Region 5) side lies at the polarizing film side and, at the same time, the transmission axis of the polarizing film is parallel to the slow axis of the cellulose acylate film.

<Production of Polarizing Plate L2>

A polarizing film was produced by allowing iodine to be absorbed onto a stretched poly(vinyl alcohol) film. Commercially available cellulose acetate film (Fujitac TD80UF, a product of Fuji Photo Film Co., Ltd.) was subjected to saponification treatment, and the resulting film was laminated on one surface of the polarizing film by using a poly(vinyl alcohol)-based adhesive. Further, in a similar manner, polarizing plate L2 was fabricated by Pasting Retardation 3 on the other surface of the polarizing film with a poly(vinyl alcohol)-based adhesive in such a manner that the cellulose acylate film (First Retardation Region 5) side lies at the polarizing film side and, at the same time, the transmission axis of the polarizing film is parallel to the slow axis of the cellulose acylate film.

<Production of Polarizing Plate L3>

A polarizing film was produced by allowing iodine to be absorbed onto a stretched poly(vinyl alcohol) film. Antiglare Antireflective Film AGF6-1 was laminated on one surface of the polarizing film by using a poly(vinyl alcohol)-based adhesive. Further, in a similar manner, Polarizing Plate L3 was fabricated by laminating Retardation 3 on the other surface of the polarizing film with a poly(vinyl alcohol)-based adhesive in such a manner that the cellulose acylate film (first retardation region 5) side lies at the polarizing film side and, at the same time, the transmission axis of the polarizing film is parallel to the slow axis of the cellulose acylate film.

<Production of Polarizing Plate M1>

A polarizing film was produced by adsorbing iodine to a stretched polyvinyl alcohol film, and the antiglare antireflection film AGF 6-1 was laminated on one surface of the polarizing film by using a polyvinyl alcohol-based adhesive. Furthermore, Polarizing Plate Protective Film 2 subjected to a saponification treatment was laminated on another side of the polarizing film by using a polyvinyl alcohol-based adhesive such that the cellulose acetate film side came to the polarizing film side. In this way, Polarizing Plate M1 was produced.

<Production of Polarizing Plate M2>

Next, a polarizing film was produced by allowing iodine to be absorbed on a stretched poly(vinyl alcohol) film. Antiglare Antireflective Film AGF6-1 was laminated onto one surface of the polarizing film with use of a poly(vinyl alcohol)-based adhesive. Further, on the other surface of the polarizing film, a commercially available cellulose acetate film (Fujitac TD80UF, a product of Fuji Photo Film Co., Ltd.), which had been subjected to saponification treatment, was laminated with use of a poly(vinyl alcohol)-based adhesive to fabricate Polarizing Plate M2.

<Production of Polarizing Plate N>

A polarizing film was produced by adsorbing iodine to a stretched polyvinyl alcohol film, and the antiglare antireflection film produced in AGF 6-1 was laminated on one surface of the polarizing film by using a polyvinyl alcohol-based adhesive. Furthermore, Film Retardation 1 subjected to a saponification treatment was laminated on another side of the polarizing film by using a polyvinyl alcohol-based adhesive such that the First Retardation Region 4 side came to the polarizing film side and at the same time, the transmission axis of the polarizing film became parallel to the slow axis of First Retardation Region 4. In this way, Polarizing Plate N was produced.

<Production of Polarizing Plates O, P, Q, R, S and T>

Polarizing Plates O, P, Q, R, S and T were produced in the same manner as Polarizing Plate I except for using the antiglare antireflection films AGF11-1, AGF11-3, AGF11-4, AGF11-5, AGF11-6 and AGF11-7 in place of the antiglare antireflection film AGF11-2.

<Fabrication of Liquid Crystal Display Device LR1>

First Retardation Region 1 produced was laminated on the Polarizing Plate Protective Film 2 side of Polarizing Plate A by using an acryl-based adhesive such that the transmission axis of the polarizing film became orthogonal to the slow axis of First Retardation Region 1. Furthermore, Second Retardation Region 1 was laminated therewith by using an acryl-based adhesive.

The resulting plate was laminated on one the viewing side (the side of the glass support on which no electrode is provided) of IPS-Mode Liquid Crystal Cell 1 produced above such that the transmission axis of the polarizing plate ran in parallel with the rubbing direction of the liquid crystal cell (that is, the slow axis of First Retardation Region 1 became orthogonal to the slow axis of the liquid crystal molecule in the liquid crystal cell at the black display) and at the same time, the Second Retardation Region 1 surface side came to the liquid crystal cell side.

Subsequently, Polarizing Plate C was laminated on the rear side (the side of the glass support on which an electrode is provided) of IPS-Mode Liquid Crystal Cell 1 such that the FUJITAC T40UZ side came to the liquid crystal cell side and at the same time, a cross-Nicol arrangement was formed with Polarizing Plate A.

<Fabrication of Liquid Crystal Display Device L11>

First Retardation Region 1 produced was laminated on the Polarizing Plate Protective Film 2 side of Polarizing Plate I by using an acryl-based adhesive such that the transmission axis of the polarizing film became orthogonal to the slow axis of First Retardation Region 1. Furthermore, Second Retardation Region 1 was laminated therewith by using an acryl-based adhesive.

The resulting plate was laminated on the viewing side of IPS-Mode Liquid Crystal Cell 1 produced above such that the transmission axis of the polarizing plate ran in parallel with the rubbing direction of the liquid crystal cell (that is, the slow axis of First Retardation Region 1 became orthogonal to the slow axis of the liquid crystal molecule in the liquid crystal cell at the black display) and at the same time, the Second Retardation Region 1 surface side came to the liquid crystal cell side.

Subsequently, Polarizing Plate C was laminated on the rear side of IPS-Mode Liquid Crystal Cell 1 such that the FUJITAC T40UZ side came to the liquid crystal cell side and at the same time, a cross-Nicol arrangement was formed with Polarizing Plate I. In this way, a liquid crystal display device L11 was produced. The leaked light was 0.08% when the liquid crystal device was observed from the left oblique direction at 60°.

<Fabrication of Liquid Crystal Display Device L12>

On the side of Polarizing Plate Protective Film 1 of Polarizing Plate H, the produced First Retardation Region 2 was laminated with use of an acrylic adhesive in such a manner that the transmission axis of the polarizing film is orthogonally crossed with the slow axis of First Retardation Region 2. Further, Second Retardation Region 1 was laminated with an acrylic adhesive.

On the viewing side of IPS-mode Liquid Crystal Cell 1 fabricated above, the laminated product prepared above was laminated so that the transmission axis of the polarizing plate becomes parallel to the rubbing direction of the liquid crystal cell (that is, the slow axis of First Retardation Region 2 is orthogonal to the slow axis of the liquid crystal molecule in the liquid crystal cell at the black display), and that, at the same time, the side of Second Retardation Region 1 comes to the liquid crystal cell side.

In succession, on the rear side of this IPS-mode Liquid Crystal Cell 1, Polarizing Plate B was laminated so that the side of Polarizing Plate Protective Film 1 comes to the liquid crystal cell side and, at the same time, forms a cross-Nicol arrangement with Polarizing Plate H to fabricate Liquid Crystal Display Device L12.

<Fabrication of Liquid Crystal Display Device L13>

First Retardation Region 3 produced was laminated on the side of FUJITAC TD80UF of Polarizing Plate J by using an acryl-based adhesive such that the transmission axis of the polarizing film became parallel to the slow axis of First Retardation Region 3. In this configuration, FUJITAC TD80UF (Re=2 nm, Rth=48 nm) as the protective film of Polarizing Plate J corresponds to the second retardation region.

The resulting plate was laminated on the viewing side of IPS-Mode Liquid Crystal Cell 1 produced above such that the transmission axis of the polarizing plate ran in parallel with the rubbing direction of the liquid crystal cell (that is, the slow axis of First Retardation Region 3 became parallel to the slow axis of the liquid crystal molecule in the liquid crystal cell at the black display) and at the same time, the First Retardation Region 3 surface side came to the liquid crystal cell side.

Subsequently, Polarizing Plate C was laminated on the rear side of IPS-Mode Liquid Crystal Cell 1 such that the Polarizing Plate Protective Film 1 side came to the liquid crystal cell side and at the same time, a cross-Nicol arrangement was formed with Polarizing Plate J. In this way, a liquid crystal display device L13 was produced. The leaked light of the thus-produced liquid crystal display device was measured.

<Fabrication of Liquid Crystal Display Device L14>

Polarizing Plate K was laminated on the viewing side of IPS-Mode Liquid Crystal Cell 1 produced above such that the slow axis of First Retardation Region 4 ran in parallel with the rubbing direction of the liquid crystal cell (that is, the slow axis of First Retardation Region 4 became parallel to the slow axis of the liquid crystal molecule in the liquid crystal cell at the black display) and at the same time, the Second Retardation Region 2 surface side came to the liquid crystal cell side.

Subsequently, Polarizing Plate B was laminated on the rear side of IPS-Mode Liquid Crystal Cell 1 such that the Polarizing Plate Protective Film 1 side came to the liquid crystal cell side and at the same time, a cross-Nicol arrangement was formed with Polarizing Plate K. In this way, a liquid crystal display device L14 was produced.

<Fabrication of Liquid Crystal Display Device L15>

Film Retardation 2 was laminated on the side of TD80UF of Polarizing Plate J by using an acrylic resin-based adhesive such that the Second Retardation Region 3 side came to the polarizing film side and at the same time, the transmission axis of the polarizing film became orthogonal to the slow axis of First Retardation Region 5, thereby producing Polarizing Plate 6.

Polarizing Plate 6 produced was laminated on the viewing side of IPS-Mode Liquid Crystal Cell 1 produced above such that the slow axis of First Retardation Region 5 ran orthogonally to the rubbing direction of the liquid crystal cell (that is, the slow axis of First Retardation Region 5 became orthogonal to the slow axis of the liquid crystal molecule in the liquid crystal cell at the black display) and at the same time, the First Retardation Region 5 surface side came to the liquid crystal cell side.

Subsequently, Polarizing Plate E was laminated on the rear side of IPS-Mode Liquid Crystal Cell 1 such that the Polarizing Plate Protective Film 1 side came to the liquid crystal cell side and at the same time, a cross-Nicol arrangement was formed with Polarizing Plate 6. In this way, a liquid crystal display device L15 was produced.

<Fabrication of Liquid Crystal Display Devices L16 to L21>

Liquid crystal display devices L16 to L21 were produced in the same manner as in Liquid Crystal Display Device L1 except for using Polarizing Plates O, P, Q, R, S and T, respectively, in place of Polarizing Plate I.

<Fabrication of Liquid Crystal Display Device LR8>

First Retardation Region 1 produced was laminated on the Polarizing Plate Protective Film 2 side of Polarizing Plate M1 by using an acryl-based adhesive such that the transmission axis of the polarizing film became orthogonal to the slow axis of First Retardation Region 1. Furthermore, Second Retardation Region 1 was laminated therewith by using an acryl-based adhesive.

The resulting plate was laminated on the viewing side of IPS-Mode Liquid Crystal Cell 1 produced above such that the transmission axis of the polarizing plate ran in parallel with the rubbing direction of the liquid crystal cell (that is, the slow axis of First Retardation Region 1 became orthogonal to the slow axis of the liquid crystal molecule in the liquid crystal cell at the black display) and at the same time, the Second Retardation Region 1 surface side came to the liquid crystal cell side.

Subsequently, Polarizing Plate C was laminated on the rear side of IPS-Mode Liquid Crystal Cell 1 such that the FUJI-TAC T40UZ side came to the liquid crystal cell side and at the same time, a cross-Nicol arrangement was formed with Polarizing Plate M. In this way, a liquid crystal display device LR8 was produced.

<Fabrication of Liquid Crystal Display Device LR9>

Polarizing Plate N was laminated on the viewing side of IPS-Mode Liquid Crystal Cell 1 produced above such that the slow axis of First Retardation Region 4 ran in parallel with the rubbing direction of the liquid crystal cell (that is, the slow axis of First Retardation Region 4 became parallel to the slow axis of the liquid crystal molecule in the liquid crystal cell at the black display) and at the same time, the Second Retardation Region 2 surface side came to the liquid crystal cell side.

Subsequently, Polarizing Plate B was laminated on the rear side of IPS-Mode Liquid Crystal Cell 1 such that the Polarizing Plate Protective Film 1 side came to the liquid crystal cell side and at the same time, a cross-Nicol arrangement was formed with Polarizing Plate N. In this way, a liquid crystal display device LR9 was produced.

For Liquid Crystal Display Devices L11 to L21 all corresponding to the examples of the invention and Liquid Crystal Display Devices LR1, and LR8 to LR9 all corresponding to the comparative examples, leaked light from oblique direction, dark room contrast and antiglare property were evaluated according to the following methods. The results are summarized in Table 3.

Meanwhile, in each of the aforementioned liquid crystal display devices, the optical compensation region is always disposed between the polarizing plate at the viewing side and the liquid crystal layer, and the antiglare film corresponds to the first protective film.

(1) Leaked Light from Oblique Direction

On a backlit table placed in a dark room, Liquid Cell 1 in the state without lamination of a polarizing plate was placed with the support provided with an electrode facing the backlit, Luminance 1 was measured with a spectral radiation brightness meter, CS-1000 (manufactured by Minolta Co., Ltd.) arranged in the direction at 45° to the left relative to the rubbing direction of the liquid crystal cell as a reference, and, at the same time, 1 m apart from the liquid crystal cell in the direction at 60° from the normal direction of the liquid crystal cell.

Then, by placing each liquid crystal display device laminated with a polarizing plate on the same backlit table as above, Luminance 2 was measured in the same manner as above, whereby luminance 2 was represented by percentage fraction for luminance 1 to give a leak lighted from oblique direction.

(2) Dark Room Contrast

On a backlit table placed in a dark room, each liquid crystal display device with a polarizing plate laminated thereon was placed with the support provided with an electrode facing the table, and contrast ratio (white display/black display) was measured with a spectral radiation brightness meter, CS-1000 (manufactured by Minolta Co., Ltd.) arranged 1 m apart from the liquid crystal display device in the normal direction of the liquid crystal cell.

(3) Antiglare Property

A bare fluorescent lamp (8,000 cd/m$^2$) was projected on the viewer side of the liquid crystal display device fabricated above from an angle of 45° and the degree of blur of the reflected image observed from the direction of −45° was evaluated according to the following criteria.

The contour of the fluorescent lamp was not recognized at all: ◎

The contour of the fluorescent lamp was slightly recognized: ○

The fluorescent lamp was blurred but the contour could be recognized: Δ

The fluorescent lamp was not substantially blurred: x liquid crystal cell at the black display), and at the same time lie at the liquid crystal cell side.

In succession, on the rear side of this IPS-mode Liquid Crystal Cell 1, Polarizing Plate B was laminated so that the polarizing plate protective film lies at the liquid crystal cell

TABLE 3

| Liquid crystal Display Device | Viewing Side (1st) Polarizing plate | | | | Rear Side (2nd) Polarizing plate | | | Leaked Light from Oblique Direction | Dark Room Contrast | Anti-glare Property | |
|---|---|---|---|---|---|---|---|---|---|---|---|
| | Type | 1st Protect. Film | Cell-side Protect. Film | Optical Compensation Region | Type | Cell Side Protect. Film | 2nd Protect. Film | | | | |
| L11 | I | AGF11-2 | Protect. Film 2 | 1st Ret. 1 + 2nd Ret. 1 | C | T40UZ | TD80UF | 0.08% | 446 | ◎ | The Invention |
| L12 | H | AGF11-2 | Protect. Film. 1 | 1st Ret. 2 + 2nd Ret. 1 | B | Protec. Film 1 | TD80UF | 0.08% | 448 | ◎ | The Invention |
| L13 | J | AGF11-2 | — | TD80UF + 1st Ret. 3 | C | T40UZ | TD80UF | 0.09% | 453 | ◎ | The Invention |
| L14 | K | AGF11-2 | — | 1st Ret. 4 + 2nd Ret. 2 | B | Protec. Film 1 | TD80UF | 0.06% | 448 | ◎ | The Invention |
| L15 | 6 | AGF11-2 | TD80UF | 2nd Ret. 3 + 1st Ret. 5 | B | Protec. Film 1 | TD80UF | 0.08% | 450 | ◎ | The Invention |
| L16 | O | AGF11-1 | Protect. Film 2 | 1st Ret. 1 + 2nd Ret. 1 | C | T40UZ | TD80UF | 0.08% | 450 | ◎ | The Invention |
| L17 | P | AGF11-3 | Protect. Film 2 | 1st Ret. 1 + 2nd Ret. 1 | C | T40UZ | TD80UF | 0.08% | 448 | ◎ | The Invention |
| L18 | Q | AGF11-4 | Protect. Film 2 | 1st Ret. 1 + 2nd Ret. 1 | C | T40UZ | TD80UF | 0.08% | 447 | ◎ | The Invention |
| L19 | R | AGF11-5 | Protect. Film 2 | 1st Ret. 1 + 2nd Ret. 1 | C | T40UZ | TD80UF | 0.12% | 425 | ◎ | The Invention |
| L20 | S | AGF11-6 | Protect. Film 2 | 1st Ret. 1 + 2nd Ret. 1 | C | T40UZ | TD80UF | 0.10% | 432 | ◎ | The Invention |
| L21 | T | AGF11-7 | Protect. Film 2 | 1st Ret. 1 + 2nd Ret. 1 | C | T40UZ | TD80UF | 0.12% | 420 | ◎ | The Invention |
| LR1 | A | TD80UF | Protect. Film 2 | 1st Ret. 1 + 2nd Ret. 1 | C | T40UZ | TD80UF | 0.08% | 450 | X | Comparative Example |
| LR8 | M1 | AGF6-1 | Protect. Film 2 | 1st Ret. 1 + 2nd Ret. 1 | C | T40UZ | TD80UF | 0.20% | 380 | ◎ | Comparative Example |
| LR9 | N | AGF6-1 | — | 1st Ret. 4 + 1st Ret. 2 | B | Protec. Film 1 | TD80UF | 0.18% | 390 | ◎ | Comparative Example |

* The notation (A + B) set forth in the column 'Optical Compensation Region' above means that retardation regions A and B are mounted in this order from the side closer to the cell-side protective film of the viewing-side polarizing plate. The notation 'Xth Ret. Y' means 'Xth Retardation Y'.

The following facts are seen from the results in Table 3.

The liquid crystal display device according to the invention, which mounted the antiglare layer having (i) a haze value due to internal scattering of 5 to 35% and a haze value due to surface scattering of 1 to 10% or (ii) a haze value due to internal scattering of 0 to 5% and a haze value due to surface scattering of 1 to 30%, was excellent exhibiting scarce leaked light from oblique direction, a high dark room contrast and high antiglare property.

In particular, Liquid Crystal Display Devices L12 to L18 mounted with Antiglare Films AGF 11-1 to 11-4 having (i) a haze value due to internal scattering of 5 to 20% and a haze value due to surface scattering of 1 to 10% or (ii) a haze value due to internal scattering of 0 to 5% and a haze value due to surface scattering of 1 to 20% are preferred since a right front contrast equivalent to Liquid Crystal Display Device LR1 not mounting any antiglare film is attained.

<Fabrication of Liquid Crystal Display Device L22>

On the viewing side of IPS-mode liquid crystal cell 1 produced above, Polarizing Plate L1 was laminated so that the transmission axis of the polarizing plate be parallel to the rubbing direction of the liquid crystal cell (that is, the slow axis of the cellulose acylate film (First Retardation Region 5) be parallel to the slow axis of the liquid crystal molecule in the side, and at the same time be in a cross-Nicol arrangement to Polarizing Plate L1 to fabricate Liquid Crystal Display Device L22.

<Fabrication of Liquid Crystal Display Device L23>

Polarizing Plate L2 was laminated on the rear side of IPS-Mode Liquid Crystal Cell 1 produced above such that the transmission axis of the polarizing plate be parallel with the rubbing axis of the liquid crystal cell (that is, the slow axis of the cellulose acylate film (First Retardation Region 5) be parallel to the slow axis of the liquid crystal molecules in the liquid crystal cell at the black display) and at the same time, Second Retardation Region 4 comes to the liquid crystal cell side.

Subsequently, Polarizing Plate H was laminated on the viewer side of this IPS-Mode Liquid Crystal Cell 1 such that the Polarizing Plate Protective Film 1 came to the liquid crystal cell side and at the same time, forms a cross-Nicol arrangement with Polarizing Plate L2 to fabricate a Liquid Crystal Display Device L23.

<Fabrication of Liquid Crystal Display Device L24>

Retardation 4 was laminated on the Polarizing Plate Protective Film 1 side of Polarizing Plate B with an acrylic adhesive, whereby the transmission axis of the polarizing film is orthogonal to the slow axis of the optical compensation film. In this way, Polarizing Plate 7 was produced.

Polarizing Plate 7 was laminated onto the rear side of IPS-mode Liquid Crystal Cell 1 produced above so that the transmission axis of the polarizing plate ran parallel to the rubbing direction of the liquid crystal cell (that is, the slow axis of Retardation 4 became perpendicular to the slow axis of the liquid crystal molecule in the liquid crystal cell at the black display), and at the same time Retardation 4 lies at the liquid crystal cell side.

In succession, Polarizing Plate H was laminated on the viewer side of this IPS-mode Liquid Crystal Cell 1 so that Polarizing Plate Protective Film 1 comes to the liquid crystal cell side and, at the same time, forms a cross-Nicol arrangement with Polarizing Plate 7 to fabricate liquid crystal display device L24.

<Fabrication of Liquid Crystal Display Device L25>

First retardation region 6 was laminated on the Fujitac T40UZ side of Polarizing Plate C with an acrylic adhesive, so that the transmission axis of the polarizing plate runs parallel to the slow axis of the optical compensation film. In this way, Polarizing Plate 8 was produced. In this constitution T40UZ corresponds to the second retardation region.

Polarizing Plate 8 was laminated on the rear side of IPS-mode liquid crystal cell 1 produced above so that the transmission axis of the polarizing plate ran parallel to the rubbing direction of the liquid crystal cell (that is, the slow axis of First Retardation Region 6 becomes parallel to the slow axis of the liquid crystal molecule in the liquid crystal cell at the black display), and, at the same time, First Retardation Region 6 comes to the liquid crystal cell side.

In succession, polarizing plate H was laminated onto the viewing side of this IPS-mode Liquid Crystal Cell 1 so that the polarizing plate protective film comes to the liquid crystal cell side and at the same time forms a cross-Nicol arrangement with polarizing plate 8 to fabricate Liquid Crystal Display Device L25.

<Fabrication of Liquid Crystal Display Device L26>

Retardation region 6 produced above was laminated on the Polarizing Plate Protective Film 1 side of Polarizing Plate B with an acrylic adhesive, whereby Second Retardation Region 5 included in Retardation 6 came to the Polarizing Plate B side, and, at the same time, the transmission axis of the polarizing plate is orthogonal to the slow axis of First Retardation Region 7. In this way, Polarizing Plate 9 was produced.

Polarizing Plate 9 was laminated on the rear side of IPS-mode Liquid Crystal Cell 1 produced above so that the transmission axis of the polarizing plate is parallel to the rubbing direction of the liquid crystal cell (that is, the slow axis of First Retardation Region 7 is orthogonal to the slow axis of the liquid crystal molecules in the liquid crystal cell at the black display), and, at the same time, Retardation 6 comes to the liquid crystal cell side.

In succession, Polarizing Plate H was laminated on the viewing side of this IPS-mode Liquid Crystal Cell 1 so that the polarizing plate protective film comes to the liquid crystal cell side, and, at the same time, forms a cross-Nicol arrangement with Polarizing Plate 9 to fabricate Liquid Crystal Display Device L26.

<Fabrication of Liquid Crystal Display Device LR10>

On the viewing side of IPS-mode liquid crystal cell 1 produced above, Polarizing Plate D was laminated so that the transmission axis of the polarizing plate be parallel to the rubbing direction of the liquid crystal cell.

In succession, on the rear side of this IPS-mode Liquid Crystal Cell 1, Polarizing Plate C was laminated so that the T40UZ lies at the liquid crystal cell side, and at the same time be in a cross-Nicol arrangement to Polarizing Plate D to fabricate Liquid Crystal Display Device LR 10.

<Fabrication of Liquid Crystal Display Device LR11>

Liquid Crystal Display Device LR11 was fabricated by changing Polarizing Plate L1 at the viewing side to Polarizing Plate L2 in comparison with the aforementioned Liquid Crystal Display Device L22.

<Fabrication of Liquid Crystal Display Device LR12>

Liquid Crystal Display Device LR12 was fabricated by changing Polarizing Plate L1 in the viewing side to Polarizing Plate J and changing Polarizing Plate B in the rear side to Polarizing Plate D in comparison with the aforementioned Liquid Crystal Display Device L22.

<Fabrication of Liquid Crystal Display Device LR13>

Liquid Crystal Display Device LR13 was fabricated by changing Polarizing Plate L1 at the viewing side to Polarizing Plate M2 and changing Polarizing Plate B in the rear side to Polarizing Plate D in comparison with the aforementioned Liquid Crystal Display Device L22.

<Fabrication of Liquid Crystal Display Device LR14>

Liquid Crystal Display Device LR14 was fabricated by changing Polarizing Plate L1 at the viewing side to Polarizing Plate L3 in comparison with the aforementioned Liquid Crystal Display Device L22.

With respect to Liquid Crystal Display Devices L22 to L26 corresponding the examples of the invention, and Liquid Crystal Display Devices LR10 to LR14 corresponding the comparative examples of the invention, leaked light from oblique direction, dark room contrast and antiglare property were evaluated. The results are summarized in Tables 4 and 5.

By way of precaution, in Liquid Crystal Display Devices L22, LR11 and LR14, the optical compensation region is disposed between the polarizing plate at the viewing side and the liquid crystal layer, and the antiglare film corresponds to the first protective film of the invention. Moreover, in Liquid Crystal Display Devices L23 to L26 set forth in Table 5, the optical compensation region is disposed between the polarizing plate at the viewer side and the liquid crystal layer, and the antiglare film corresponds to the second protective film of the invention.

TABLE 4

| Liquid crystal Display Device | Viewing Side (1st) Polarizing plate | | | | Rear Side (2nd) Polarizing plate | | | Leaked Light from Oblique Direction | Dark Room Contrast | Anti-glare Property | |
|---|---|---|---|---|---|---|---|---|---|---|---|
| | Type | 1st Protect. Film | Cell Side Protect. Film | Optical Compensation Region | Type | Cell Side Protect. Film | 2nd Protect. Film | | | | |
| L22 | L1 | AGF11-2 | — | 1st Ret. 5 + 2nd Ret. 4 | B | Protec. Film 1 | TD80UF | 0.06% | 450 | ◎ | The Invention |
| LR10 | D | TD80UF | TD80UF | — | C | T40UZ | TD80UF | 0.55% | 455 | X | Comparative Example |

TABLE 4-continued

| Liquid crystal Display Device | Viewing Side (1st) Polarizing plate | | | | Rear Side (2nd) Polarizing plate | | | Leaked Light from Oblique Direction | Dark Room Contrast | Anti-glare Property | |
|---|---|---|---|---|---|---|---|---|---|---|---|
| | Type | 1st Protect. Film | Cell Side Protect. Film | Optical Compensation Region | Type | Cell Side Protect. Film | 2nd Protect. Film | | | | |
| LR11 | L2 | TD80UF | — | 1st Ret 5 + 2nd Ret. 4 | B | Protec. Film 1 | TD80UF | 0.05% | 460 | X | Comparative Example |
| LR12 | J | AGF11-2 | TD80UF | — | D | TD80UF | TD80UF | 0.75% | 370 | ◎ | Comparative Example |
| LR13 | M2 | AGF6-1 | TD80UF | — | D | TD80UF | TD80UF | 0.80% | 360 | ◎ | Comparative Example |
| LR14 | L3 | AGF6-1 | — | 1st Ret. 5 + 2nd Ret. 4 | B | Protec. Film 1 | TD80UF | 0.20% | 395 | ◎ | Comparative Example |

TABLE 5

| Liquid crystal Display Device | Viewing Side (1st) Polarizing plate | | | | Rear Side (2nd) Polarizing plate | | | Leaked Light from Oblique Direction | Dark Room Contrast | Anti-glare Property | |
|---|---|---|---|---|---|---|---|---|---|---|---|
| | Type | 1st Protect. Film | Cell Side Protect. Film | Optical Compensation Region | Type | Cell Side Protect. Film | 2nd Protect. Film | | | | |
| L23 | L2 | TD80UF | — | 1st Ret. 5 + 2nd Ret. 4 | H | Protec. Film 1 | AGF11-2 | 0.06% | 450 | ◎ | The Invention |
| L24 | 7 | TD80UF | Protect. Film. 1 | Ret. 4 | H | Protec. Film 1 | AGF11-2 | 0.08% | 445 | ◎ | The Invention |
| L25 | 8 | TD80UF | — | T40UZ + 1st Ret. 6 | H | Protec. Film 1 | AGF11-2 | 0.07% | 447 | ◎ | The Invention |
| L26 | 9 | TD80UF | Protect. Film. 1 | 1st Ret. 7 + 2nd Ret. 5 | H | Protec. Film 1 | AGF11-2 | 0.08% | 445 | ◎ | The Invention |

* The optical compensation region of L24 is of mono-layer structure consisting of Retardation 4.

The following facts are evident from the aforementioned results.

To the IPS-type liquid crystal display device in which the liquid crystal molecules in the liquid crystal layer at the black display is aligned parallel to the support plane, antiglare property can be imparted, along with suppression of the deterioration of right front contrast, by installing, in addition to the provision of an optical compensation region, an antiglare layer with the haze due to internal scattering of 5 to 35% and the haze due to surface scattering of 1 to 10%.

Meanwhile, comparison with the IPS-mode liquid crystal display devices without any optical compensation region revealed that the differences in leaked light from oblique direction and dark room contrast were so little as to be hardly recognizable between those installed with AGF11-2 falling under the aforementioned range and those installed with AGF6-1 falling outside of the aforementioned range.

In addition, the optical properties of the embodiments for L22 and L23, in both of which the aforementioned optical compensation film also acts as a polarization plate protective film, were particularly good.

The light leakage, particularly, the light leakage from the 45° oblique direction, which is caused due to projection of outside light onto the liquid crystal display surface or deviation of absorption axes of two polarizing plates from 90° when viewed from the oblique azimuth direction can be improved while the reduction of dark room contrast is minimized.

The entire disclosure of each and every foreign patent application from which the benefit of foreign priority has been claimed in the present application is incorporated herein by reference, as if fully set forth.

What is claimed is:

1. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the antiglare layer is formed from a coating composition comprising a light-transparent resin, a light-transparent fine particle and multiple kinds of solvents, and
the multiple kinds of solvents comprises a main solvent incapable of dissolving the transparent support and a small amount of a solvent having a hydroxyl group.

2. The liquid crystal display device as claimed in claim 1, wherein the light-transparent resin mainly comprises a tri-functional or higher functional (meth)acrylate monomer, and
the light-transparent particle is a crosslinked poly(meth)acrylate-based polymer having an acryl content of 50 to 100 mass %.

3. The liquid crystal display device as claimed in claim 1,
wherein the light-transparent resin mainly comprises a trifunctional or higher functional (meth)acrylate monomer, and
the light-transparent particle is a crosslinked poly(styrene-acryl) copolymer having an acryl content of 50 to 100 mass %.

4. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer,
at least one of the first and second protective films having the antiglare layer is an antiglare antireflection film comprising a transparent support, the antiglare layer and a low refractive index layer having a refractive index lower than that of the antiglare layer,
the antiglare antireflection film has a haze value attributable to internal scattering of from 5 to 35%, and a haze value attributable to surface scattering of from 1 to 10%,
wherein the antiglare layer is formed from a coating composition comprising a light-transparent resin, a light-transparent fine particle and multiple kinds of solvents, and
the multiple kinds of solvents comprises a main solvent incapable of dissolving the transparent support and a small amount of a solvent having a hydroxyl group.

5. The liquid crystal display device as claimed in claim 4,
wherein the light-transparent resin mainly comprises a trifunctional or higher functional (meth)acrylate monomer, and
the light-transparent particle is a crosslinked poly(meth) acrylate-based polymer having an acryl content of 50 to 100 mass %.

6. The liquid crystal display device as claimed in claim 4,
wherein the light-transparent resin mainly comprises a trifunctional or higher functional (meth)acrylate monomer, and
the light-transparent particle is a crosslinked poly(styrene-acryl) copolymer having an acryl content of 50 to 100 mass %.

7. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
one(s) having the antiglare layer of the first protective film and the second protective layer has a haze value attributable to internal scattering of from 0 to 5%, and a haze value attributable to surface scattering is from 1 to 30%,
wherein the antiglare layer is formed from a coating composition comprising a light-transparent resin, a light-transparent fine particle and multiple kinds of solvents, and
the multiple kinds of solvents comprises a main solvent incapable of dissolving the transparent support and a small amount of a solvent having a hydroxyl group.

8. The liquid crystal display device as claimed in claim 7,
wherein the light-transparent resin mainly comprises a trifunctional or higher functional (meth)acrylate monomer, and
the light-transparent particle is a crosslinked poly(styrene-acryl) copolymer having an acryl content of 50 to 100 mass %.

9. The liquid crystal display device as claimed in claim 7,
wherein the light-transparent resin mainly comprises a trifunctional or higher functional (meth)acrylate monomer, and
the light-transparent particle is a crosslinked poly(styrene-acryl) copolymer having an acryl content of 50 to 100 mass %.

10. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and
the antiglare antireflection film has a haze value attributable to internal scattering of from 0 to 5%, and a haze value attributable to surface scattering of from 1 to 30%,
wherein the antiglare layer is formed from a coating composition comprising a light-transparent resin, a light-transparent fine particle and multiple kinds of solvents, and
the multiple kinds of solvents comprises a main solvent incapable of dissolving the transparent support and a small amount of a solvent having a hydroxyl group.

11. The liquid crystal display device as claimed in claim 10,
wherein the light-transparent resin mainly comprises a trifunctional or higher functional (meth)acrylate monomer, and
the light-transparent particle is a crosslinked poly(styrene-acryl) copolymer having an acryl content of 50 to 100 mass %.

12. The liquid crystal display device as claimed in claim 10,
wherein the light-transparent resin mainly comprises a trifunctional or higher functional (meth)acrylate monomer, and
the light-transparent particle is a crosslinked poly(styrene-acryl) copolymer having an acryl content of 50 to 100 mass %.

13. A liquid crystal display device comprising:
a first protective film;
a first polarizing film;
an optical compensation region;

a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the haze value attributable to internal scattering of the antiglare layer is from 5 to 20% and the haze value attributable to surface scattering of the antiglare layer is from 1 to 10%,
wherein the refractive index of the low refractive index layer is from 1.30 to 1.48, the low refractive index layer comprises a fluorine-containing polymer, and the fluorine-containing polymer comprises from 30 to 80 mass % of a fluorine atom.

14. The liquid crystal display device as claimed in claim 13,
wherein the low refractive index layer is a cured film formed by coating and curing a curable composition comprising (A) at least one said fluorine-containing polymer, (B) at least one inorganic fine particle having an layerage particle diameter corresponding to 30 to 100% of thickness of the low refractive index layer, and (C) at least one hydrolysate and/or partial condensate of an organosilane represented by formula (1), which is produced in the presence of an acid catalyst:

    Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

15. The liquid crystal display device as claimed in claim 14,
wherein the inorganic fine particle (B) has a hollow structure.

16. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and
the antiglare antireflection film has a haze value attributable to internal scattering of from 0 to 5%, and a haze value attributable to surface scattering of from 1 to 30%,
wherein the refractive index of the low refractive index layer is from 1.30 to 1.48, the low refractive index layer comprises a fluorine-containing polymer, and the fluorine-containing polymer comprises from 30 to 80 mass % of a fluorine atom.

17. The liquid crystal display device as claimed in claim 16,
wherein the low refractive index layer is a cured film formed by coating and curing a curable composition comprising (A) at least one said fluorine-containing polymer, (B) at least one inorganic fine particle having an average particle diameter corresponding to 30 to 100% of thickness of the low refractive index layer, and (C) at least one hydrolysate and/or partial condensate of an organosilane represented by formula (1), which is produced in the presence of an acid catalyst:

    Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

18. The liquid crystal display device as claimed in claim 17,
wherein the inorganic fine particle (B) has a hollow structure.

19. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the haze value attributable to internal scattering of the antiglare layer is from 5 to 20% and the haze value attributable to surface scattering of the antiglare layer is from 1 to 10%,
wherein the low refractive index layer is formed by coating a composition having heat curability and/or photocurability, the composition mainly comprising a fluorine-containing polymer containing a crosslinking or polymerizable functional group,
wherein the low refractive index layer is a cured film formed by coating and curing a curable composition comprising (A) at least one said fluorine-containing polymer, (B) at least one inorganic fine particle having an average particle diameter corresponding to 30 to 100% of thickness of the low refractive index layer, and (C) at least one hydrolysate and/or partial condensate of an organosilane represented by formula (1), which is produced in the presence of an acid catalyst:

    Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

20. The liquid crystal display device as claimed in claim 19,
wherein the inorganic fine particle (B) has a hollow structure.

21. A liquid crystal display device comprising:
a first protective film;

a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and
the antiglare antireflection film has a haze value attributable to internal scattering of from 0 to 5%, and a haze value attributable to surface scattering of from 1 to 30%,
wherein the low refractive index layer is formed by coating a composition having heat curability and/or photocurability, the composition mainly comprising a fluorine-containing polymer containing a crosslinking or polymerizable functional group,
wherein the low refractive index layer is a cured film formed by coating and curing a curable composition comprising (A) at least one said fluorine-containing polymer, (B) at least one inorganic fine particle having an average particle diameter corresponding to 30 to 100% of thickness of the low refractive index layer, and (C) at least one hydrolysate and/or partial condensate of an organosilane represented by formula (1), which is produced in the presence of an acid catalyst:

Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

22. The liquid crystal display device as claimed in claim 21, wherein the inorganic fine particle (B) has a hollow structure.

23. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the antiglare layer is a cured film formed by coating and curing a curable coating composition comprising a hydrolysate and/or a partial condensate of an organosilane represented by formula (1):

Formula (1)

wherein $R^{10}$ represents a substituted or unsubstituted alkyl group or a substituted or unsubstituted aryl group, X represents a hydroxyl group or a hydrolyzable group, and m represents an integer of 1to 3.

24. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer,
at least one of the first and second protective films having the antiglare layer is an antiglare antireflection film comprising a transparent support, the antiglare layer and a low refractive index layer having a refractive index lower than that of the antiglare layer,
the antiglare antireflection film has a haze value attributable to internal scattering of from 5 to 35%, and a haze value attributable to surface scattering of from 1 to 10%,
wherein the antiglare layer and the low refractive index layer each is a cured film formed by coating and curing a curable coating composition comprising a hydrolysate and/or a partial condensate of an organosilane represented by formula (1):

Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

25. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
one(s) having the antiglare layer of the first protective film and the second protective layer has a haze value attributable to internal scattering of from 0 to 5%, and a haze value attributable to surface scattering is from 1 to 30%,
wherein the antiglare layer is a cured film formed by coating and curing a curable coating composition comprising a hydrolysate and/or a partial condensate of an organosilane represented by formula (1):

Formula (1)

wherein $R^{10}$ represents a substituted or unsubstituted alkyl group or a substituted or unsubstituted aryl group, X represents a hydroxyl group or a hydrolyzable group, and m represents an integer of 1 to 3.

26. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order, wherein at a black display, liquid crystal molecules in the liquid crystal layer are aligned in parallel with surfaces of said pair of substrates, at least one of the first and second protective films is an antiglare antireflection film comprising a transparent support, the antiglare layer and a low refractive index layer having a refractive index lower than that of the antiglare layer, and the antiglare antireflection film has a haze value attributable to internal scattering of from 0 to 5%, and a haze value attributable to surface scattering of from 1 to 30%, wherein the antiglare layer and the low refractive index layer each is a cured film formed by coating and curing a curable coating composition comprising a hydrolysate and/or a partial condensate of an organosilane represented by formula (1):

$(R^{10})_m$—Si(X)$_{4-m}$    Formula (1)

wherein $R^{10}$ represents a substituted or unsubstituted alkyl group or a substituted or unsubstituted aryl group, X represents a hydroxyl group or a hydrolyzable group, and m represents an integer of 1to 3.

27. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer,
at least one of the first and second protective films having the antiglare layer is an antiglare antireflection film comprising a transparent support, the antiglare layer and a low refractive index layer having a refractive index lower than that of the antiglare layer,
the antiglare antireflection film has a haze value attributable to internal scattering of from 5 to 35%, and a haze value attributable to surface scattering of from 1 to 10%,
wherein the low refractive index layer is a cured film formed by coating and curing a curable composition comprising (A) a fluorine-free polymer and (B) an inorganic fine particle having an average particle diameter corresponding to 30 to 100% of thickness of the low refractive index layer and having a hollow structure.

28. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and the antiglare antireflection film has a haze value attributable to internal scattering of from 0 to 5%, and a haze value attributable to surface scattering of from 1 to 30%, wherein the low refractive index layer is a cured film formed by coating and curing a curable composition comprising (A) a fluorine-free polymer and (B) an inorganic fine particle having an average particle diameter corresponding to 30 to 100% of thickness of the low refractive index layer and having a hollow structure.

29. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the optical compensation region comprises at least one retardation region satisfying any one of the following relations (A) to (D):
(A) 100 nm$\leq$Re$\leq$400 nm, and −50 nm $\leq$Rth$\leq$50 nm
(B) 60 nm $\leq$Re$\leq$200 nm, and 30 nm $\leq$Rth$\leq$100 nm
(C) 0 nm $\leq$Re$\leq$20 nm, and −400 nm $\leq$Rth$\leq$−50 nm
(D) 30 nm $\leq$Re$\leq$150 nm, and 100 nm $\leq$Rth$\leq$400 nm
wherein Re designates the in-plane retardation and Rth designates the retardation in the thickness direction.

30. The liquid crystal display device as claimed in claim 29,
wherein the liquid crystal display device comprises a protective film between the second polarizing film and the substrate, and
the protective film has a retardation Rth of 40 to −50 nm in thickness direction.

31. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer,
at least one of the first and second protective films having the antiglare layer is an antiglare antireflection film comprising a transparent support, the antiglare layer and a low refractive index layer having a refractive index lower than that of the antiglare layer,
the antiglare antireflection film has a haze value attributable to internal scattering of from 5 to 35%, and a haze value attributable to surface scattering of from 1 to 10%,
wherein the optical compensation region comprises at least one retardation region satisfying any one of the following relations (A) to (D):
(A) 100 nm$\leq$Re$\leq$400 nm, and −50 nm $\leq$Rth$\leq$50 nm
(B) 60 nm $\leq$Re$\leq$200 nm, and 30 nm $\leq$Rth$\leq$100 nm (C) 0 nm ≦Re≦20 nm, and −400 nm ≦Rth≦−50 nm
(D) 30 nm ≦Re≦150 nm, and 100 nm ≦Rth≦400 nm
wherein Re designates the in-plane retardation and Rth designates the retardation in the thickness direction.

32. The liquid crystal display device as claimed in claim 31,
wherein the liquid crystal display device comprises a protective film between the second polarizing film and the substrate, and
the protective film has a retardation Rth of 40 to −50 nm in thickness direction.

33. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
one(s) having the antiglare layer of the first protective film and the second protective layer has a haze value attributable to internal scattering of from 0 to 5%, and a haze value attributable to surface scattering is from 1 to 30%,
wherein the optical compensation region comprises at least one retardation region satisfying any one of the following relations (A) to (D):
(A) 100 nm≦Re≦400 nm, and −50 nm ≦Rth≦50 nm
(B) 60 nm ≦Re≦200 nm, and 30 nm ≦Rth≦100 nm
(C) 0 nm ≦Re≦20 nm, and −400 nm ≦Rth≦−50 nm
(D) 30 nm ≦Re≦150 nm, and 100 nm ≦Rth≦400 nm
wherein Re designates the in-plane retardation and Rth designates the retardation in the thickness direction.

34. The liquid crystal display device as claimed in claim 33,
wherein the liquid crystal display device comprises a protective film between the second polarizing film and the substrate, and
the protective film has a retardation Rth of 40 to −50 nm in thickness direction.

35. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and
the antiglare antireflection film has a haze value attributable to internal scattering of from 0 to 5%, and a haze value attributable to surface scattering of from 1 to 30%,
wherein the optical compensation region comprises at least one retardation region satisfying any one of the following relations (A) to (D):
(A) 100 nm≦Re≦400 nm, and −50 nm ≦Rth≦50 nm
(B) 60 nm ≦Re≦200 nm, and 30 nm ≦Rth≦100 nm
(C) 0 nm ≦Re≦20 nm, and −400 nm ≦Rth≦−50 nm
(D) 30 nm ≦Re≦150 nm, and 100 nm ≦Rth≦400 nm
wherein Re designates the in-plane retardation and Rth designates the retardation in the thickness direction.

36. The liquid crystal display device as claimed in claim 35,
wherein the liquid crystal display device comprises a protective film between the second polarizing film and the substrate, and
the protective film has a retardation Rth of 40 to −50 nm in thickness direction.

37. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the optical compensation region comprises a first retardation region and a second retardation region,
the first retardation region has an in-plane retardation Re of from 70 to 330 nm,
the first retardation region has a value Nz of from more than 0 to less than 0.5,
the second retardation region has an in-plane retardation Re of from 0 to 100 nm,
the second retardation region has a retardation Rth in thickness direction of from 10 to 140 nm, and
a transmission axis of the first polarizing film is parallel to a slow axis direction of the liquid crystal molecules at the black display.

38. The liquid crystal display device as claimed in claim 37,
wherein the first polarizing film, the first retardation region, the second retardation region and the liquid crystal cell are disposed in this order, and
a slow axis of the first retardation region is substantially orthogonal to the transmission axis of the first polarizing film.

39. The liquid crystal display device as claimed in claim 37,
wherein the first polarizing film, the second retardation region, the first retardation region and the liquid crystal cell are disposed in this order, and
a slow axis of the first retardation region is substantially parallel to the transmission axis of the first polarizing film.

40. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates, an antiglare layer is provided to at least one of the first protective film and the second protective layer, at least one of the first and second protective films having the antiglare layer is an antiglare antireflection film comprising a transparent support, the antiglare layer and a low refractive index layer having a refractive index lower than that of the antiglare layer, the antiglare antireflection film has a haze value attributable to internal scattering of from 5 to 35%, and a haze value attributable to surface scattering of from 1 to 10%, wherein the optical compensation region comprises a first retardation region and a second retardation region, the first retardation region has an in-plane retardation Re of from 70 to 330 nm, the first retardation region has a value Nz of from more than 0 to less than 0.5, the second retardation region has an in-plane retardation Re of from 0 to 100 nm, the second retardation region has a retardation Rth in thickness direction of from 10 to 140 nm, and a transmission axis of the first polarizing film is parallel to a slow axis direction of the liquid crystal molecules at the black display.

41. The liquid crystal display device as claimed in claim 40, wherein the first polarizing film, the first retardation region, the second retardation region and the liquid crystal cell are disposed in this order, and a slow axis of the first retardation region is substantially orthogonal to the transmission axis of the first polarizing film.

42. The liquid crystal display device as claimed in claim 40, wherein the first polarizing film, the second retardation region, the first retardation region and the liquid crystal cell are disposed in this order, and a slow axis of the first retardation region is substantially parallel to the transmission axis of the first polarizing film.

43. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
one(s) having the antiglare layer of the first protective film and the second protective layer has a haze value attributable to internal scattering of from 0 to 5%, and a haze value attributable to surface scattering is from 1 to 30%,
wherein the optical compensation region comprises a first retardation region and a second retardation region,
the first retardation region has an in-plane retardation Re of from 70 to 330 nm,
the first retardation region has a value Nz of from more than 0 to less than 0.5,
the second retardation region has an in-plane retardation Re of from 0 to 100 nm,
the second retardation region has a retardation Rth in thickness direction of from 10 to 140 nm, and
a transmission axis of the first polarizing film is parallel to a slow axis direction of the liquid crystal molecules at the black display.

44. The liquid crystal display device as claimed in claim 43,
wherein the first polarizing film, the first retardation region, the second retardation region and the liquid crystal cell are disposed in this order, and
a slow axis of the first retardation region is substantially orthogonal to the transmission axis of the first polarizing film.

45. The liquid crystal display device as claimed in claim 43,
wherein the first polarizing film, the second retardation region, the first retardation region and the liquid crystal cell are disposed in this order, and
a slow axis of the first retardation region is substantially parallel to the transmission axis of the first polarizing film.

46. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and
the antiglare antireflection film has a haze value attributable to internal scattering of from 0 to 5%, and a haze value attributable to surface scattering of from 1 to 30%,
wherein the optical compensation region comprises a first retardation region and a second retardation region,
the first retardation region has an in-plane retardation Re of from 70 to 330 nm,
the first retardation region has a value Nz of from more than 0 to less than 0.5,
the second retardation region has an in-plane retardation Re of from 0 to 100 nm,
the second retardation region has a retardation Rth in thickness direction of from 10 to 140 nm, and
a transmission axis of the first polarizing film is parallel to a slow axis direction of the liquid crystal molecules at the black display.

47. The liquid crystal display device as claimed in claim 46,
wherein the first polarizing film, the first retardation region, the second retardation region and the liquid crystal cell are disposed in this order, and
a slow axis of the first retardation region is substantially orthogonal to the transmission axis of the first polarizing film.

48. The liquid crystal display device as claimed in claim 46,
wherein the first polarizing film, the second retardation region, the first retardation region and the liquid crystal cell are disposed in this order, and
a slow axis of the first retardation region is substantially parallel to the transmission axis of the first polarizing film.

49. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
the antiglare layer has a haze value attributable to internal scattering of from 5 to 35%, and a haze value attributable to surface scattering of from 1 to 10%,
wherein the optical compensation region comprises a first retardation region and a second retardation region,
the first retardation region has an in-plane retardation Re of from 20 to 150 nm,
the first retardation region has a value Nz of from 1.5 to 7,
the second retardation region has an in-plane retardation Re of from 0 to 50 nm,
the second retardation region has a retardation Rth in thickness direction of from −80 to −400 nm, and
a transmission axis of the first polarizing film is parallel to a slow axis direction of the liquid crystal molecules at the black display.

50. The liquid crystal display device as claimed in claim 49,
wherein the first polarizing film, the first retardation region, the second retardation region and the liquid crystal cell are disposed in this order, and
a slow axis of the first retardation region is substantially parallel to the transmission axis of the first polarizing film.

51. The liquid crystal display device as claimed in claim 49,
wherein the first polarizing film, the second retardation region, the first retardation region and the liquid crystal cell are disposed in this order, and
a slow axis of the first retardation region is substantially orthogonal to the transmission axis of the first polarizing film.

52. The liquid crystal display device as claimed in claim 49,
wherein the second retardation region comprises a retardation layer comprising a rod-like liquid crystal compound oriented substantially in vertical alignment.

53. A liquid crystal display device comprising:
a first protective film;
a first polarizing film;
the second retardation region has a retardation Rth in thickness direction of from −80 to −400 nm, and
a transmission axis of the first polarizing film is parallel to a slow axis direction of the liquid crystal molecules at the black display.

54. The liquid crystal display device as claimed in claim 53,
wherein the first polarizing film, the first retardation region, the second retardation region and the liquid crystal cell are disposed in this order, and
a slow axis of the first retardation region is substantially parallel to the transmission axis of the first polarizing film.

55. The liquid crystal display device as claimed in claim 53,
wherein the first polarizing film, the second retardation region, the first retardation region and the liquid crystal cell are disposed in this order, and
a slow axis of the first retardation region is substantially orthogonal to the transmission axis of the first polarizing film.

56. The liquid crystal display device as claimed in claim 53,
wherein the second retardation region comprises a retardation layer comprising a rod-like liquid crystal compound oriented substantially in vertical alignment.

57. A liquid crystal display device comprising:
a first protective film;
a first polarizing film;
an optical compensation region;
a liquid crystal cell comprising a liquid crystal layer and a pair of substrates sandwiching the liquid crystal layer;
a second polarizing film; and
a second protective layer, in this order,
wherein at a black display, liquid crystal molecules in the liquid crystal layer are aligned in parallel with surfaces of said pair of substrates,
an antiglare layer is provided to at least one of the first protective film and the second protective layer, and
one(s) having the antiglare layer of the first protective film and the second protective layer has a haze value attributable to internal scattering of from 0 to 5%, and a haze value attributable to surface scattering is from 1 to 30%,
wherein the optical compensation region comprises a first retardation region and a second retardation region,
the first retardation region has an in-plane retardation Re of from 20 to 150 nm,
the first retardation region has a value Nz of from 1.5 to 7,
the second retardation region has an in-plane retardation Re of from 0 to 50 nm,
the second retardation region has a retardation Rth in thickness direction of from −80 to −400 nm, and
a transmission axis of the first polarizing film is parallel to a slow axis direction of the liquid crystal molecules at the black display.

58. The liquid crystal display device as claimed in claim 57,
wherein the first polarizing film, the first retardation region, the second retardation region and the liquid crystal cell are disposed in this order, and
a slow axis of the first retardation region is substantially parallel to the transmission axis of the first polarizing film.

59. The liquid crystal display device as claimed in claim 57,
wherein the first polarizing film, the second retardation region, the first retardation region and the liquid crystal cell are disposed in this order, and
a slow axis of the first retardation region is substantially orthogonal to the transmission axis of the first polarizing film.

60. The liquid crystal display device as claimed in claim 57,
wherein the second retardation region comprises a retardation layer comprising a rod-like liquid crystal compound oriented substantially in vertical alignment.

61. A liquid crystal display device comprising:
a first protective film;
a first polarizing film;
an optical compensation region;
a liquid crystal cell comprising a liquid crystal layer and a pair of substrates sandwiching the liquid crystal layer;

a second polarizing film; and
a second protective layer, in this order,
wherein at a black display, liquid crystal molecules in the liquid crystal layer are aligned in parallel with surfaces of said pair of substrates,
at least one of the first and second protective films is an antiglare antireflection film comprising a transparent support, the antiglare layer and a low refractive index layer having a refractive index lower than that of the antiglare layer, and
the antiglare antireflection film has a haze value attributable to internal scattering of from 0 to 5%, and a haze value attributable to surface scattering of from 1 to 30%,
wherein the optical compensation region comprises a first retardation region and a second retardation region,
the first retardation region has an in-plane retardation Re of from 20 to 150 nm,
the first retardation region has a value Nz of from 1.5 to 7,
the second retardation region has an in-plane retardation Re of from 0 to 50 nm,
the second retardation region has a retardation Rth in thickness direction of from −80 to −400 nm, and
a transmission axis of the first polarizing film is parallel to a slow axis direction of the liquid crystal molecules at the black display.

62. The liquid crystal display device as claimed in claim 61,
wherein the first polarizing film, the first retardation region, the second retardation region and the liquid crystal cell are disposed in this order, and
a slow axis of the first retardation region is substantially parallel to the transmission axis of the first polarizing film.

63. The liquid crystal display device as claimed in claim 61,
wherein the first polarizing film, the second retardation region, the first retardation region and the liquid crystal cell are disposed in this order, and
a slow axis of the first retardation region is substantially orthogonal to the transmission axis of the first polarizing film.

64. The liquid crystal display device as claimed in claim 61,
wherein the second retardation region comprises a retardation layer comprising a rod-like liquid crystal compound oriented substantially in vertical alignment.

* * * * *